US008843586B2

(12) United States Patent
Pantos et al.

(10) Patent No.: US 8,843,586 B2
(45) Date of Patent: Sep. 23, 2014

(54) PLAYLISTS FOR REAL-TIME OR NEAR REAL-TIME STREAMING

(75) Inventors: Roger Pantos, Sunnyvale, CA (US);
David Biderman, San Jose, CA (US);
William May, Jr., Sunnyvale, CA (US);
Christopher Flick, San Jose, CA (US);
John Samuel Bushell, San Jose, CA (US); John Kevin Calhoun, Sonoma, CA (US)

(73) Assignee: Apple Inc., Cupertino, CA (US)

( * ) Notice: Subject to any disclaimer, the term of this patent is extended or adjusted under 35 U.S.C. 154(b) by 211 days.

(21) Appl. No.: 13/225,037

(22) Filed: Sep. 2, 2011

(65) Prior Publication Data

US 2012/0311075 A1 Dec. 6, 2012

Related U.S. Application Data

(60) Provisional application No. 61/493,324, filed on Jun. 3, 2011.

(51) Int. Cl.
| | |
|---|---|
| *G06F 15/16* | (2006.01) |
| *G06F 15/173* | (2006.01) |
| *H04N 21/81* | (2011.01) |
| *H04N 21/61* | (2011.01) |
| *H04N 21/44* | (2011.01) |
| *H04N 21/485* | (2011.01) |
| *H04N 21/443* | (2011.01) |
| *H04N 21/845* | (2011.01) |
| *H04N 21/482* | (2011.01) |
| *H04N 21/262* | (2011.01) |
| *H04N 21/439* | (2011.01) |
| *H04N 21/472* | (2011.01) |

(52) U.S. Cl.
CPC ........ *H04N 21/8106* (2013.01); *H04N 21/4394* (2013.01); *H04N 21/6125* (2013.01); *H04N 21/44016* (2013.01); *H04N 21/4856* (2013.01); *H04N 21/4431* (2013.01); *H04N 21/8456* (2013.01); *H04N 21/4825* (2013.01); *H04N 21/26258* (2013.01); *H04N 21/47217* (2013.01)
USPC ........... 709/217; 709/203; 709/227; 709/231; 709/237

(58) Field of Classification Search
CPC .............. G06F 3/165; G06F 17/30017; G06F 17/30026; G06F 17/30053; G06F 17/30772; G06F 17/3074; G06F 17/30752; G06F 17/30778; H04L 12/2494; H04L 12/2498; H04L 12/28; H04L 25/14; H04L 29/06476; H04L 29/06482; H04L 29/12764; H04L 41/509; H04L 61/309; H04L 65/60; H04L 65/601; H04L 67/2823; H04N 7/00
USPC ....................................................... 709/217
See application file for complete search history.

(56) References Cited

U.S. PATENT DOCUMENTS

| | | | |
|---|---|---|---|
| 5,065,396 | A | 11/1991 | Castellano et al. |
| 5,361,259 | A | 11/1994 | Hunt et al. |

(Continued)

FOREIGN PATENT DOCUMENTS

| | | |
|---|---|---|
| CA | 2 247 588 C | 9/1998 |
| DE | 102007041143 A1 | 3/2009 |

(Continued)

OTHER PUBLICATIONS

"HTTP Live Streaming," Wikipedia, Jun. 2, 2013.*

(Continued)

*Primary Examiner* — Melvin H Pollack
(74) *Attorney, Agent, or Firm* — Blakely, Sokoloff, Taylor & Zafman LLP

(57) ABSTRACT

A content streaming system, such as an HTTP streaming system, can use a variant audio playlist that identifies different audio playlists, such as one playlist in English and one playlist in Spanish, for the same program such as a video program which is specified by a video playlist which can be separate from the variant audio playlist. A client can use the variant audio playlist to select a particular audio content for the same program, and the particular audio content can be referred to by one URL in the variant audio playlist, among a set of alternative URLs, in the variant audio playlist, for alternative audio content.

27 Claims, 21 Drawing Sheets

(56) References Cited

U.S. PATENT DOCUMENTS

| | | |
|---|---|---|
| 5,493,514 A | 2/1996 | Keith et al. |
| 5,550,982 A | 8/1996 | Long et al. |
| 5,579,239 A | 11/1996 | Freeman et al. |
| 5,583,859 A | 12/1996 | Feldmeier |
| 5,610,841 A | 3/1997 | Tanaka et al. |
| 5,613,032 A | 3/1997 | Cruz et al. |
| 5,627,936 A | 5/1997 | Prasad et al. |
| 5,663,951 A | 9/1997 | Danneels et al. |
| 5,668,948 A | 9/1997 | Belknap et al. |
| 5,719,786 A | 2/1998 | Nelson et al. |
| 5,751,951 A | 5/1998 | Osborne et al. |
| 5,751,968 A | 5/1998 | Cohen |
| 5,778,374 A | 7/1998 | Dang et al. |
| 5,805,823 A | 9/1998 | Seitz |
| 5,819,160 A | 10/1998 | Foladare et al. |
| 5,821,986 A | 10/1998 | Yuan et al. |
| 5,835,495 A | 11/1998 | Ferriere |
| 5,867,230 A | 2/1999 | Wang et al. |
| 5,892,915 A | 4/1999 | Duso et al. |
| 5,928,330 A | 7/1999 | Goetz et al. |
| 5,933,603 A | 8/1999 | Vahalia et al. |
| 5,938,734 A | 8/1999 | Yao et al. |
| 5,956,716 A | 9/1999 | Kenner et al. |
| 5,974,503 A | 10/1999 | Venkatesh et al. |
| 5,987,510 A | 11/1999 | Imai et al. |
| 5,996,015 A | 11/1999 | Day et al. |
| 6,014,694 A | 1/2000 | Aharoni et al. |
| 6,032,193 A | 2/2000 | Sullivan |
| 6,151,632 A | 11/2000 | Chaddha et al. |
| 6,173,328 B1 | 1/2001 | Sato |
| 6,292,834 B1 | 9/2001 | Ravi et al. |
| 6,377,995 B2 | 4/2002 | Agraharam et al. |
| 6,385,596 B1 | 5/2002 | Wiser et al. |
| 6,389,473 B1 | 5/2002 | Carmel et al. |
| 6,625,750 B1 | 9/2003 | Duso et al. |
| 6,847,778 B1 | 1/2005 | Vallone et al. |
| 6,925,495 B2 | 8/2005 | Hegde et al. |
| 6,990,497 B2 | 1/2006 | O'Rourke et al. |
| 7,020,710 B2 | 3/2006 | Weber et al. |
| 7,039,784 B1 | 5/2006 | Chen et al. |
| 7,113,983 B1 | 9/2006 | Terada et al. |
| 7,260,564 B1 | 8/2007 | Lynn et al. |
| 7,272,296 B2 | 9/2007 | Mears et al. |
| 7,287,083 B1 | 10/2007 | Nay et al. |
| 7,308,717 B2 | 12/2007 | Koved et al. |
| 7,318,017 B2 | 1/2008 | Swoboda |
| 7,334,016 B2 | 2/2008 | Fishhaut et al. |
| 7,349,663 B1 | 3/2008 | Joseph |
| 7,434,154 B2 | 10/2008 | Konetski |
| 7,471,834 B2 | 12/2008 | Sull et al. |
| 7,484,103 B2 | 1/2009 | Woo et al. |
| 7,496,643 B2 | 2/2009 | O'Rourke et al. |
| 7,590,656 B2 | 9/2009 | Plastina et al. |
| 7,647,297 B2 | 1/2010 | LaChapelle et al. |
| 7,664,872 B2 | 2/2010 | Osborne et al. |
| 7,680,824 B2 | 3/2010 | Plastina et al. |
| 7,721,103 B2 | 5/2010 | Risan et al. |
| 7,730,420 B1 | 6/2010 | Miller et al. |
| 7,769,829 B1 | 8/2010 | Riggs et al. |
| 7,917,557 B2 | 3/2011 | Shteyn et al. |
| 7,987,490 B2 | 7/2011 | Ansari et al. |
| 8,099,473 B2 | 1/2012 | Biderman et al. |
| 8,099,476 B2 | 1/2012 | Biderman et al. |
| 8,156,089 B2 | 4/2012 | Pantos et al. |
| 8,176,058 B2* | 5/2012 | Ott, IV ........................ 707/752 |
| 8,180,645 B2* | 5/2012 | Johnson et al. ............... 704/270 |
| 8,275,709 B2 | 9/2012 | Wang et al. |
| 8,275,880 B2* | 9/2012 | Allard et al. .................. 709/224 |
| 8,321,042 B2* | 11/2012 | Nagayama ...................... 700/94 |
| 8,327,013 B2* | 12/2012 | McGowan et al. ........... 709/231 |
| 8,341,662 B1* | 12/2012 | Bassett et al. .................... 725/32 |
| 8,359,007 B2* | 1/2013 | White et al. ................... 455/410 |
| 8,364,296 B2* | 1/2013 | Wilhelm ........................ 700/94 |
| 8,375,137 B2* | 2/2013 | Bowman ...................... 709/231 |
| 8,386,306 B2* | 2/2013 | Lapcevic ...................... 705/14.1 |
| 8,392,600 B2* | 3/2013 | Outlaw ......................... 709/233 |
| 8,452,855 B2* | 5/2013 | Higgins et al. ................ 709/219 |
| 8,510,555 B2* | 8/2013 | Tam .............................. 713/168 |
| 8,527,877 B2* | 9/2013 | Wohlert ........................ 715/716 |
| 8,532,464 B2* | 9/2013 | Randall ......................... 386/248 |
| 8,544,050 B2* | 9/2013 | Brown et al. ................. 725/110 |
| 8,554,880 B2* | 10/2013 | Shishido et al. .............. 709/219 |
| 8,584,175 B2* | 11/2013 | Nathan et al. ................... 725/61 |
| 8,588,680 B2* | 11/2013 | White et al. .................. 455/3.06 |
| 8,589,332 B2* | 11/2013 | Brooks et al. ................... 706/52 |
| 2002/0007418 A1 | 1/2002 | Hegde et al. |
| 2002/0029166 A1 | 3/2002 | Jacobs et al. |
| 2002/0037151 A1 | 3/2002 | Goto et al. |
| 2002/0046315 A1 | 4/2002 | Miller et al. |
| 2002/0057287 A1 | 5/2002 | Crow et al. |
| 2002/0069218 A1 | 6/2002 | Sull et al. |
| 2002/0083182 A1 | 6/2002 | Alvarado et al. |
| 2002/0120675 A1 | 8/2002 | Everett et al. |
| 2002/0147634 A1 | 10/2002 | Jacoby et al. |
| 2002/0177914 A1 | 11/2002 | Chase |
| 2003/0061305 A1 | 3/2003 | Copley et al. |
| 2003/0068046 A1 | 4/2003 | Lindqvist et al. |
| 2003/0093790 A1 | 5/2003 | Logan et al. |
| 2003/0186645 A1 | 10/2003 | Mori |
| 2003/0195940 A1 | 10/2003 | Basu et al. |
| 2004/0003268 A1 | 1/2004 | Bourne et al. |
| 2004/0078812 A1 | 4/2004 | Calvert |
| 2004/0083273 A1 | 4/2004 | Madison et al. |
| 2004/0086120 A1 | 5/2004 | Akins et al. |
| 2004/0123725 A1 | 7/2004 | Kim |
| 2004/0231004 A1 | 11/2004 | Seo |
| 2004/0250293 A1 | 12/2004 | Ryal et al. |
| 2004/0254887 A1 | 12/2004 | Jacoby |
| 2004/0260835 A1 | 12/2004 | Welk et al. |
| 2004/0268224 A1 | 12/2004 | Balkus et al. |
| 2005/0005025 A1 | 1/2005 | Harville et al. |
| 2005/0080876 A1 | 4/2005 | Peiffer et al. |
| 2005/0097057 A1 | 5/2005 | DeMello et al. |
| 2005/0105894 A1 | 5/2005 | Jung et al. |
| 2005/0108320 A1 | 5/2005 | Lord et al. |
| 2005/0203917 A1 | 9/2005 | Freeberg et al. |
| 2005/0262251 A1 | 11/2005 | Klemets et al. |
| 2006/0020609 A1 | 1/2006 | LaChapelle et al. |
| 2006/0093318 A1 | 5/2006 | Cohen et al. |
| 2006/0143667 A1 | 6/2006 | Kurosawa |
| 2006/0153537 A1 | 7/2006 | Kaneko et al. |
| 2006/0195479 A1 | 8/2006 | Spiegelman et al. |
| 2006/0265503 A1 | 11/2006 | Jones et al. |
| 2007/0005428 A1 | 1/2007 | Jacobs et al. |
| 2007/0016865 A1 | 1/2007 | Johnson et al. |
| 2007/0038728 A1 | 2/2007 | Jacobs et al. |
| 2007/0081669 A1 | 4/2007 | Takashima et al. |
| 2007/0088804 A1 | 4/2007 | Qureshey et al. |
| 2007/0101163 A1 | 5/2007 | Ando et al. |
| 2007/0136679 A1 | 6/2007 | Yang |
| 2007/0162611 A1 | 7/2007 | Yu et al. |
| 2007/0198515 A1 | 8/2007 | Ando et al. |
| 2007/0214182 A1 | 9/2007 | Rosenberg |
| 2007/0233784 A1 | 10/2007 | O'Rourke et al. |
| 2007/0274672 A1 | 11/2007 | Itoi |
| 2007/0282905 A1 | 12/2007 | Karlberg |
| 2008/0008439 A1 | 1/2008 | Liu et al. |
| 2008/0008447 A1 | 1/2008 | Iwase et al. |
| 2008/0010648 A1 | 1/2008 | Ando et al. |
| 2008/0045804 A1 | 2/2008 | Williams |
| 2008/0056075 A1 | 3/2008 | Kalis |
| 2008/0059532 A1 | 3/2008 | Kazmi et al. |
| 2008/0060029 A1 | 3/2008 | Park et al. |
| 2008/0075437 A1 | 3/2008 | Hamada et al. |
| 2008/0091717 A1 | 4/2008 | Garbow et al. |
| 2008/0101762 A1 | 5/2008 | Kellock et al. |
| 2008/0109888 A1 | 5/2008 | Ullah |
| 2008/0133603 A1 | 6/2008 | Fischer et al. |
| 2008/0133701 A1 | 6/2008 | Kazmi et al. |
| 2008/0140720 A1 | 6/2008 | Six et al. |
| 2008/0147826 A1 | 6/2008 | Velusamy et al. |
| 2008/0159715 A1 | 7/2008 | Fuasaro et al. |
| 2008/0195743 A1 | 8/2008 | Brueck et al. |
| 2008/0209066 A1 | 8/2008 | Spio et al. |

(56) References Cited

U.S. PATENT DOCUMENTS

| | | |
|---|---|---|
| 2008/0235566 A1 | 9/2008 | Carlson et al. |
| 2008/0250319 A1 | 10/2008 | Lee et al. |
| 2008/0256129 A1 | 10/2008 | Salinas et al. |
| 2008/0270308 A1 | 10/2008 | Peterka et al. |
| 2008/0301317 A1 | 12/2008 | Lee et al. |
| 2009/0106202 A1 | 4/2009 | Mizrahi |
| 2009/0138513 A1 | 5/2009 | Wen et al. |
| 2009/0144258 A1 | 6/2009 | Taylor |
| 2009/0157731 A1 | 6/2009 | Zigler et al. |
| 2009/0157899 A1 | 6/2009 | Gagliardi et al. |
| 2009/0249222 A1 | 10/2009 | Schmidt et al. |
| 2009/0287841 A1 | 11/2009 | Chapweske et al. |
| 2009/0319899 A1 | 12/2009 | Moon et al. |
| 2010/0030908 A1 | 2/2010 | Courtemanche et al. |
| 2010/0040349 A1 | 2/2010 | Landy |
| 2010/0057928 A1 | 3/2010 | Kapoor et al. |
| 2010/0077095 A1 | 3/2010 | Wong et al. |
| 2010/0115123 A1 | 5/2010 | Airamo |
| 2010/0119208 A1 | 5/2010 | Davis et al. |
| 2010/0135637 A1 | 6/2010 | McDermott et al. |
| 2010/0161825 A1 | 6/2010 | Ronca et al. |
| 2010/0169303 A1 | 7/2010 | Biderman et al. |
| 2010/0169453 A1 | 7/2010 | Biderman et al. |
| 2010/0169458 A1 | 7/2010 | Biderman et al. |
| 2010/0169459 A1 | 7/2010 | Biderman et al. |
| 2010/0185891 A1 | 7/2010 | Basso |
| 2010/0235472 A1 | 9/2010 | Sood et al. |
| 2010/0274674 A1 | 10/2010 | Roberts et al. |
| 2010/0281042 A1 | 11/2010 | Windes et al. |
| 2010/0281178 A1 | 11/2010 | Sullivan |
| 2011/0022471 A1 | 1/2011 | Brueck et al. |
| 2011/0072105 A1 | 3/2011 | Biderman et al. |
| 2011/0080940 A1 | 4/2011 | Bocharov et al. |
| 2011/0082924 A1 | 4/2011 | Gopalakrishnan |
| 2011/0082946 A1 | 4/2011 | Gopalakrishnan |
| 2011/0096828 A1 | 4/2011 | Chen et al. |
| 2011/0116764 A1* | 5/2011 | Ramamurthy et al. ..... 386/245 |
| 2011/0116772 A1 | 5/2011 | Kwon et al. |
| 2011/0119394 A1 | 5/2011 | Wang et al. |
| 2011/0125918 A1 | 5/2011 | Ha et al. |
| 2011/0173345 A1 | 7/2011 | Knox et al. |
| 2011/0202641 A1 | 8/2011 | Kahn et al. |
| 2011/0214061 A1 | 9/2011 | King et al. |
| 2011/0231660 A1* | 9/2011 | Kanungo ..................... 713/168 |
| 2011/0246616 A1* | 10/2011 | Ronca et al. ................. 709/219 |
| 2011/0246621 A1 | 10/2011 | May et al. |
| 2011/0246623 A1 | 10/2011 | Pantos et al. |
| 2011/0246661 A1 | 10/2011 | Manzari et al. |
| 2011/0295974 A1 | 12/2011 | Kashef et al. |
| 2011/0307623 A1* | 12/2011 | George et al. ................. 709/231 |
| 2012/0110120 A1 | 5/2012 | Willig et al. |
| 2012/0124179 A1* | 5/2012 | Cappio et al. ................. 709/219 |
| 2012/0144195 A1 | 6/2012 | Nair et al. |
| 2012/0144445 A1 | 6/2012 | Bonta et al. |
| 2012/0173751 A1* | 7/2012 | Braness et al. .............. 709/231 |
| 2012/0232681 A1* | 9/2012 | Mundy et al. ................... 700/94 |
| 2012/0233345 A1* | 9/2012 | Hannuksela ................. 709/231 |
| 2012/0239661 A1 | 9/2012 | Giblin |
| 2012/0259946 A1* | 10/2012 | Stockhammer et al. ...... 709/217 |
| 2012/0271688 A1* | 10/2012 | Jaouen et al. ................. 705/14.4 |
| 2012/0278459 A1* | 11/2012 | Wu et al. ....................... 709/219 |
| 2012/0284804 A1 | 11/2012 | Lindquist et al. |
| 2012/0290644 A1* | 11/2012 | Gabin et al. ................. 709/203 |
| 2012/0297423 A1 | 11/2012 | Kanojia et al. |
| 2012/0315009 A1 | 12/2012 | Evans et al. |
| 2012/0317303 A1* | 12/2012 | Wang ............................ 709/231 |
| 2012/0323917 A1* | 12/2012 | Mercer et al. ................. 707/737 |
| 2012/0324058 A1* | 12/2012 | Biderman et al. ............ 709/219 |
| 2013/0024539 A9* | 1/2013 | Khedouri et al. ............. 709/217 |
| 2013/0031165 A1* | 1/2013 | Pantos et al. ................. 709/203 |
| 2013/0117335 A1* | 5/2013 | Jellison et al. ................. 707/821 |
| 2013/0124994 A1* | 5/2013 | Chen et al. ................... 715/716 |
| 2013/0173745 A1* | 7/2013 | Biderman ..................... 709/217 |
| 2013/0216053 A1 | 8/2013 | Disch |
| 2013/0297652 A1* | 11/2013 | Higgins et al. ................. 707/770 |
| 2013/0325628 A1* | 12/2013 | White et al. ................. 705/14.66 |
| 2013/0336635 A1* | 12/2013 | Randall ........................ 386/248 |

FOREIGN PATENT DOCUMENTS

| | | |
|---|---|---|
| EP | 0 614 317 A2 | 2/1994 |
| EP | 0 720 374 A1 | 12/1994 |
| EP | 0 680 185 A2 | 4/1995 |
| EP | 0 762 300 A2 | 9/1996 |
| EP | 0 827 336 A2 | 8/1997 |
| EP | 0 859 535 A2 | 2/1998 |
| EP | 0984584 A1 | 3/2000 |
| EP | 1 056 093 A1 | 11/2000 |
| EP | 1 117 047 A1 | 7/2001 |
| EP | 1113642 A2 | 7/2001 |
| EP | 1 158 799 A1 | 11/2001 |
| EP | 1427218 A2 | 6/2004 |
| EP | 1 737 182 A2 | 12/2006 |
| GB | 2 400 531 A | 10/2004 |
| JP | 2000151595 | 5/2000 |
| JP | 2006-352663 | 12/2006 |
| JP | 2007-158414 | 6/2007 |
| JP | 2008-507746 | 3/2008 |
| KR | 1020080038655 | 5/2008 |
| RU | 2 272 318 C2 | 3/2006 |
| WO | WO 97/12447 | 4/1997 |
| WO | WO 97/17775 | 5/1997 |
| WO | WO 97/30551 | 8/1997 |
| WO | WO 98/44733 | 3/1998 |
| WO | WO 01/38993 A1 | 5/2001 |
| WO | WO01/67753 A | 9/2001 |
| WO | WO 02/057943 A1 | 7/2002 |
| WO | WO 03/023781 A1 | 3/2003 |
| WO | WO 03/025933 A1 | 3/2003 |
| WO | WO 2005/004485 | 1/2005 |
| WO | WO 2005/091161 A1 | 9/2005 |
| WO | WO2006/007651 A1 | 1/2006 |
| WO | WO 2007/028081 A2 | 3/2007 |
| WO | WO 2007/078394 A2 | 7/2007 |
| WO | WO2007/111312 A1 | 10/2007 |
| WO | WO 2008/058257 A2 | 5/2008 |
| WO | WO 2008/058259 A2 | 5/2008 |
| WO | WO 2008/081415 A2 | 7/2008 |
| WO | WO 2010/078281 A2 | 7/2010 |

OTHER PUBLICATIONS

"Adaptive Bitrate Streaming," Wikipedia, Jun. 2, 2013.*
Pantos, R. and May, W. "HTTP Live Streaming draft-pantos-http-live-streaming-07" Sep. 30, 2011.*
Muller, Christopher and Timmerer, Christian. "A VLC Media Player Plugin Enabling Dynamic Adaptive Streaming over HTTP," ACM, Dec. 1, 2011.*
PCT International Preliminary Report on Patentability for PCT/US2011/031000, mailed Oct. 11, 2012.
Combined Search and Examination Report under Sections 17 & 18(3) for application No. GB1105581.1, date of search Jul. 14, 2011, date of report Jul. 15, 2011, 4 pages.
Combined Search and Examination Report under Sections 17 & 18(3) for application No. GB1105900.3, date of search Jul. 28, 2011, date of report Aug. 1, 2011, 6 pages.
Pantos, R.: "HTTP Live Streaming", May 1, 2009; available at: http://tools.ietf.org/pdf/draft-pantos-http-live-streaming-00.pdf.
Pantos, R.: "HTTP Live Streaming" [online], published Apr. 2, 2010, IETF. Available at http://tools.ietf.org/pdf/draft-pantos-http-live-streaming-03.pdf.
PCT International Preliminary Report on Patentability for PCT/US2009/069624 filed Dec. 28, 2009, mailed Jul. 14, 2011, 27 pages.
HTML, Living Standard, last updated dated May 16, 2011, http://www.whatwg.org/specs/web-apps/current-work/ downloaded May 17, 2011, 484 pages.
Web Based Programming Tutorials, Web Programming Unleashed, Bob Breedlove, et al., 1996.
Antonio Miguel Ferreira, VDOlive Technology, Chapter 31, http://www.podgoretsky.com/ftp/docs/Internet/Web%20Programming%20Unleashed/ch31.htm#CONTENTS, downloaded Sep. 13, 2011.

(56) References Cited

OTHER PUBLICATIONS

Fabio Kon et al., "A Component-Based Architecture for Scalable Distributed Multimedia", In Proceedings of the 14th International Conference on Advanced Science and Technology (ICAST'98), pp. 121-135, Lucent Technologies, Naperville, Apr. 1998.
Codec Central, VDOLive, 1995-98 Terran Interactive, Inc., makers of Media Cleaner Pro.
Jane Hunter et al., SuperNOVA Project, DSTC Technical Report TR97-10, Aug. 1997.
Article: America Online Chooses VDOLive; Showcasing Internet Video and to be Available to All AOL Members, Mar. 13, 1997.
Haakon Bryhni et al., On-demand Regional Television over the Internet, From Proceedings of the Fourth ACM International Multimedia Cofnerence, Nov. 18-22, 1996, Boston, USA.
Olav Sandsta et al., "Design and Implementation of the Elvira Video Server", pp. 259-270. Proceedings of Norsk Informatikkonferanse 1996, pp. 259-270, Nov. 18-20, 1996.
Brett Atwood, "Video 'Netcasting' Is Making Strides Online", The Enter*Active File, Billboard Mar. 2, 1996.
VDOLive, Plug-Ins, Sep. 1997, vol. 5 Issue 9.
VDOLive Servers, Server Updates, VDOLive Servers, Version 3.02, Feb. 5, 1998.
Gus Venditto, Instant Video, Waiting for video files to download becomes virtually a thing of the past, Internet World magazine, Vo. 7, No. 11, (c) 1996, Mecklermedia Corporation.
John F. McGowan, Ph.D., AVI Overview, 1996-1999, http://www.rahul.net/jfm/.
Navin Chaddha et al., "An End to End Software Only Scalable Video Delivery System", Proceedings of the 5th International Conference on Network and Operating System Support for Digital Audio and Video, Durahm, NH, Apr. 1995, pp. 1-12, also in Lecture Notes in Computer Science, T. Little and R. Gusella (Eds), vol. 1018.
Kien A. Hua et al., Skyscraper Broadcasting: A New Broadcasting Scheme for Metropolitan Video-on-Demand Systems, 1997 ACM, 0-89791-905-X/97/0009, pp. 89-100.
Michael Merz et al., "Iterative Transmission of Media Streams", 1997 ACM 0-89791-991-2/97/11, pp. 283-290.
Elan Amir et al., An Application Level Video Gateway, Multimedia '95, Proceedings of the third ACM International conference on Multimedia, 1995.
Andy Hopper, "Pandora—an experimental system for multimedia applications", ORL-90-1, published in 'Operating Systems Review' Jan. 12, 1990, pp. 1-16.
Alan Jones et al., "Handling Audio and Video Streams in a Distributed Environment", 1993, 13 pages.
Jens Meggers et al., "A Video Gateway to Support Video Streaming to Mobile Clients", ACTS Mobile Summit '97.
Shanwei Cen et al., A Distributed Real-Time MPEG Video Audio Player, NOSSDAV '95 Proceedigns of the 5th International Workshop on network and Operating System Support for Digital Audio and Video, 1995.
Ching-Chih Han et al., Scheduling MPEG-Compressed Video Streams with Firm Deadline Constraints, Proceedings ACM Multimedia Nov. 5-9, 1995, pp. 411-422.
Laurence Crutcher, "The Networked Video Jukebox", IEEE Transactions on Circuits and Systems for Video Technology, vol. 4, No. 2, Apr. 1994, pp. 105-120.
Hang Liu et al., "Adaptive source rate control for real-time wireless video transmission", Mobile Networks and Applications 3 (1998), pp. 49-60.
Emblaze Full Motion Animation, Israel.news.admin, downloaded Sep. 9, 2010.
Real time video streaming with java!!!!, comp.lang.java.programmer, downloaded Sep. 9, 2010.
Real Time video, comp.lang.java.programmer, downloaded Sep. 9, 2010.
Dwight Silverman, Hullaballoo.caneck.caneck: Aggies burn up Internet/A&M fans can view bonfire via computer link, Oct. 29, 1994.
Alon Cohen, "Innovation in the Network DVR space", Alon Cohen's Blog, Nov. 8, 2008.
Zhigang Chen et al., "Real Time Video and Audio in the World Wide Web", Dec. 12, 1995.
Lawrence A. Rowe, "The Berkeley Distributed Video-on Demand System", Report No. UCB/CSD-97-959, Oct. 1995.
Marilyn A. Gillen, "High-Quality, Real-Time Music A Reality", The Enter*Active File, Billboard, Sep. 30, 1995.
Michael Carreira et al., "Capture-Time Indexing Paradigm, Authoring Tool, and Browsing Environment for Digital Broadcast Video", MCL Technical Report, Jan. 8, 1995, In Proc. Multimedia Computing and Networking, IS&T/SPIE Symposium on Electronic Imaging Science and Technology, SPIE vol. 2417, Feb. 1995, pp. 380-388.
Zhigang Chen et al., Video and Audio: Organization and Retrieval in the WWW (1996).
Michael Y. M. Chiu et al., "Partial Video Sequence Caching Scheme for VOD Systems with Heterogeneous Clients", IEEE Transactions on Industrial Electronics, vol. 45, No. 1, Feb. 1998, pp. 44-51.
M. Reha Civanlar et al., A practical system for MPEG-2-based video-on-demand over ATM packet networks and the WWW, Signal Processing: Image Communication 8 (1996), pp. 221-227.
Steven Ray McCanne, "Scalable Compression and Transmission of Internet Multicast Video", Report No. UCB/CSD-96-928, Dec. 16, 1996.
Marcel Dasen et al., "An Error Tolerant, Scalable Video Stream Encoding and Compression for Mobile Computing", In Proceedings of ACTS Mobile Summit 96, pp. 762-771, Nov. 1996.
Tom Davey, "Smoother Video", Intranets Internet, Information Week; Mar. 24, 1997, 623; ABI/INFORM Global, p. 83.
Edmund X. DeJesus, "How the Internet will Replace Broadcasting", pp. 1-8, from Byte Magazine, Feb. 1996, pp. 51-54, 56, 60, 62, 64.
Sean Fulton, "An Evolving Competitor", Communications Week, Manhasset: Jul. 22, 1996, p. 55.
Justin Hibbard, "Streaming Speeds Up", InformationWeek; Sep. 29, 1997; 650; ABI/INFORM Global, p. 98.
Joseph Y. Hui, "Client-Server Synchronization and Buffering for Variable Rate Multimedia Retrievals", IEEE Journal on Selected Areas in Communications, vol. 14, No. 1, Jan. 1996, pp. 226-237.
Anonymous, "Intense Java hype leaving a path of confusion, uncertainty: Study", Computing Canada, Jan. 6, 1997; 23, 1; ABI/INFORM Global p. S10.
Real-Time Digital Video Multicasts to PC Desktops via Existing LANs, WANs, and the Internet, IP/TV, Precept Software, Inc., 1996.
Richard Karpinski, "Easy Audio on the World Wide Web—Sprucing up a home page with audio can be simple, and the best part is, it's free", Communications Week, Manhasset: Apr. 15, 1996, p. IA.03.
Peter T. Kirstein et al., Multimedia Integrated Conferencing for Europe (MICE-II), The Final Report on Esprit Project 7606, University College London, Jan. 1996, pp. 1-18.
M. Handley et al., SDP: Session Description Protocol, Apr. 1998, pp. 1-42.
"Synchronized Multimedia Integration Language", W3C Working Draft, Feb. 2, 1998, pp. 1-33.
See-Mong Tan et al., "Adaptation and Synchronization in Bandwidth-Constrained Internet Video and Audio", World Wide Web Consortium Workshiop on Real Time Multimedia in the WWW (RTMW '96), INRIA Sophia Antipolis, France, Oct. 1996.
K. Jonas et al., "Get a KISS-communication infrastructure for streaming services in a heterogeneous environment", MULTIMEDIA '98 Proceedings of the sixth ACM international conference eon Multimedia, 1998.
Ranga S. Ramanujan et al., Adaptive Streaming of MPEG Video over IP Networks, 1997 IEEE, pp. 398-409.
Asit Dan et al., "A dynamic policy of segment replication for load-balancing in video-on-demand servers", Multimedia Systems (1995) 3: 93-103.
Mark Handley/Van Jacobson, "SDP: Session Description Protocol", Jan. 22, 1997.
Maja Matijasevic, "An Overview of Multicast-based Multimedia and Virtual Reality Applications for Multi-user Collaborative Environments", Dec. 2, 1996.
Guide to the VDOLive Broadcast Server, Software Release 1.0, Documentation Version 1.1, Dec. 5, 1996.

(56) References Cited

OTHER PUBLICATIONS

Guide to the VDOLive Video Server, Software Version 2.1, Manual Version 2.1, Dec. 24, 1996.
Guide to the VDOLive Tools, Software Version 2.1, Manual Version 2.1, Dec. 26, 1996.
Making your VDOLive Content available on the World Wide Web, Documentation Version 2.3, Dec. 26, 1996.
Guide to VDOPhone Internet, Software Version 2.0, Documentation Version 2.01, Dec. 8, 1996.
Vocaltec introduces Internet wave for high-quality music and voice broadcasting over the internet, available for free download, IWave sets the standard for internet broadcasting by enabling organizations, individuals to broadcast shows, lectures, discussions, music and more in outstanding audio quality to Internet users worldwide, Northvale, NJ, Sep. 22, 1995.
Anonymous, "Vosaic Debuts VOSAIC Audio for Java", Information Today: Apr. 1997; 14, 4; ABI/INFORM Global, pp. 44.
M. H. Willebeek-LeMair et al., Bamba—Audio and video streaming over the Internet, IBM J. Res. Develop, vol. 42, No. 2, Mar. 1998, pp. 269-280.
Louis C. Yun et al., "Digital Video in a Fading Interference Wireless Environment", 1996 IEEE, pp. 1069-1072.
PCT International Preliminary Report on Patentability for PCT/US2009/069624 filed Dec. 28, 2009, mailed Jul. 14, 2011.
PCT International Search Report and Written Opinion of the International Searching Authority for PCT/US2011/064346, mailed Aug. 24, 2012.
Singapore Examination Report for Singapore Patent Application No. 201104810-5, mailed Sep. 14, 2012.
PCT International Search Report and Written Opinion of the International Searching Authority for PCT/US2012/040031, mailed Sep. 5, 2012.
PCT International Search Report and Written Opinion of the International Searching Authority for PCT/US2012/040027, mailed Sep. 12, 2012.
PCT Invitation to Pay Additional Fees and, Where Application, Protest Fee, for PCT/US2012/040027, mailed Jul. 17, 2012.
Blu-Ray Disc: "White paper Blu-ray Disc Format. 2.B Audio Visual Application Formal Specificaitons for BD-ROM", Internet Citation, Mar. 2005, XP007903517, retrieved from the Internet: URL: http://www.blu-ravdisc.com/assets/downloadablefile/2b_bdrom_audiovisualapplication_0305-12955-13403.pdf [retrieved on Nov. 16, 2007].
Paul England, Robert Allen, Ron Underwood, "RAVE: Real-time services for the Weg", Computer Networks and ISDN Systems 28 (1996) pp. 1547-1558.
Youtube Embedded Player, Santa Claus is Coming to Town (Animagic Version), downloaded Nov. 10, 2011, http://www.youtube.com/watch?v=MB3TCiA1rgI&ob=av2n.
Francisco Valverde, Oscar Pastor, "Dealing with REST Services in Model-driven Web Engineering Methods", www.programmableweb.com/apis, 8 pages, 2005.
U.S. Patent Application and Figures filed Mar. 23, 2005, U.S. Appl. No. 11/088,326, "Approach for Downloading Data Over Networks Using Automatic Bandwidth Detection".
R. Pantos Ed., HTTP Live Streaming, May 1, 2009, Internet Engineering Task Force.
PCT Invitation to Pay Additional Fees and, Where Applicable, Protest Fee, for PCT/US2012/040027, mailed Jul. 17, 2012.
PCT International Search Report and Written Opinion of the Searching Authority for PCT/US2012/020837, mailed May 31, 2012, (12 pgs.).
European Search Report for EP Application EP 12 16 2824, dated Feb. 19, 2013, 5 pages.
PCT International Preliminary Report on Patentability for PCT/US2012/020837, mailed Jul. 25, 2013.
Jim Batson et al., "HTTP Live Streaming Protocol Specification: HTTP Live Streaming", Mar. 15, 2009, pp. 1-9.
Dave Nelson, "Getting Started with IIS Live Smooth Streaming", Mar. 18, 2009, pp. 1-12.

Andrew Fecheyr-Lippens, "A Review of HTTP Live Streaming", Jan. 2010, pp. 1-30.
Extended Search Report Application No. EP 10176485.0, mailed Oct. 23, 2012, 8 pages.
International Preliminary Report on Patentability or PCT/US2011/064346, mailed Jun. 27, 2013.
PCT International Preliminary Report on Patentability issued on Dec. 4, 2013 for PCT/US2012/040031.
PCT International Preliminary Report on Patentability issued on Dec. 4, 2013 for PCT/US2012/040027.
PCT International Search Report and Written Opinion of the International Searching Authority, PCT/US2011/031000, mailed Jul. 15, 2011.
Paolillo et al., "The Social Structure of tagging Internet Video on del.icio.us", 40th Hawaii International Conference on System Sciences, 2007, Jan. 1, 2007 (pp. 1-10).
Gebhard et al., "Virtual Internet Broadcasting", IEEE Communications Magazine, vol. 39, No. 6, Jun. 1, 2001, (pp. 182-188).
Jensen et al., "A Data and Query Model for Dynamic Playlist Generation", Data Engineering Workshop, 2007 IEEE 23rd Int'l Conference, Apr. 1, 2007, ( pp. 65-74).
Lee et al., "A Scalable Video Codec Design for Streaming Over Distributed Peer to Peer Network", vol. 1, Globecom '02, IEEE Global Telecommunications Conference, Nov. 17, 2002, (pp. 539-543).
Zhang et al., "Profile Based Focused Crawler for Social Media Sharing Websites", 20th IEEE Int'l Conference on Tools with Artificial Intelligence, Nov. 3, 2008, ( pp. 317-324).
Pantos, R., "HTTP Live Streaming", May 1, 2009, (pp. 1-17), located on the internet http://tools.ietf.org/html/draft-pantos-http-live-streaming-00.
PCT Notification of Transmittal of the International Search Report and the Written Opinion of the International Searching Authority, or the Declaration, mailed Nov. 26, 2010, ( 40 Pages).
RFC 1951—Deutsch, P., "DEFLATE Compressed Data Format Specification Version 1.3", Network Working Group, May 1996, http://www.ietf.org/rfc/rfc1951.txt.
RFC 1952—Deutsch, P., "GZIP File Format Specification Version 4.3", Network Working Group, May 1996, http://www.ietf.org/rfc/rfc1952.txt.
RFC 2046—Freed, N., et al., "Multipurpose Internet Mail Extensions (MIME) Part Two: Media Types", Network Working Group, Nov. 1996.
RFC 2119—Bradner, S., "Key words for use in RFCs to Indicate Requirements Levels", Network Working Group, Mar. 1997.
RFC 2279—Yergeau, F., "UTF-8, a transformation format of Unicode and ISO-10646", Network Working Group, Jan. 1998.
RFC 2396—Berners-Lee, T., et al., "Uniform Resource Identifiers (URI): Generic Syntax and Semantics", Network Working Group, Aug. 1998.
RFC 2616—Fielding, R., et al., "Hypertext Transfer Protocol—HTTP/1.1", Network Working Group, Jun. 1999.
RFC 2964—Moore, K., et al., "Use of HTTP State Management", Network Working Group, Oct. 2000.
RFC 2965—Kristol, D., et al., "HTTP State Management Mechanism", Network Working Group, Oct. 2000.
RFC 3629—Yergeau, F., "UTF-8, a transformation format of ISO 10646", Network Working Group, Nov. 2003.
RFC 3852—Housley, R., "Cryptographic Message Syntax (CMS)", Network Working Group, Jul. 2004.
RFC 3986—Berners-Lee, T., et al., "Uniform Resource Identifier (URI): Generic Syntax", Network Working Group, Jan. 2005.
RFC 4281—Gellens, R., et al., "The Codecs Parameter for 'Bucket' Media Types", Network Working Group, Nov. 2005.
RFC 5246—Dierks, T., et al., "The Transport Layer Security (TLS) Protocol Version 1.2", Network Working Group, Aug. 2008.
RFC 5652—Housley, R., "Cryptographic Message Syntax (CMS)", Network Working Group, Sep. 2009.

(56) References Cited

OTHER PUBLICATIONS

ISO 8601—International Organization for Standardization, "ISO 8601:2004: Data elements and interchange formats—Information interchange—Representation of dates and times", 40 pages, Dec. 2004.

AES 128—U.S. Department of Commerce / National Institute of Standards and Technology, "Advanced Encryption Standard (AES)", Federal Information Processing Standards Publication 197, http://csrc.nist.gov/publications/fips/fips197/fips-197.pdf, Nov. 26, 2001.

M3U—Nullsoft, Inc., "The M3U Playlist format, originally invented for the Winamp media player", http:wikipedia.org/wiki/M3U.

ID3—ID3.ORG, "The ID3 audio file data tagging format", http:www.id3.org/Developer_Information.

US ASCII—American National Standards Institute, "ANSI X3.4-1986, Information Systems—Coded Character Sets 7-Bit American National Standard Code for Information Interchange (7-Bit ASCII)", Dec. 1986.

PCT Invitation to Pay Additional Fees and, where applicable, Protest Fee for PCT/US2009/069624 containing Communication relating to the Results of the Partial International Search, Jul. 20, 2010, 7 pages.

Shahin, "Streaming over HTTP with JavaScript: AJAX video player", http://www.codeproject.com/kb/Ajax/AJAXVideoPlayer.aspx, Oct. 24, 2006, 8 pages, XP 002583453.

Slein, J., et al., "WebDAV Ordered Collections Protocol", Network Working Group, Feb. 28, 2003, 43 pages, XP 15029917.

Hydrogenaudio, "Request: Playlist Compression", http://www.hydrogenaudio.org/forums, Apr. 3 and Apr. 5, 2004, 2 pages.

PCT International Search Report and Written Opinion of the International Searching Authority, PCT/US2011/031623, mailed May 27, 2011.

PCT International Search Report and Written Opinion of the International Searching Authority, PCT/US2009/069624, mailed Nov. 26, 2010.

\* cited by examiner

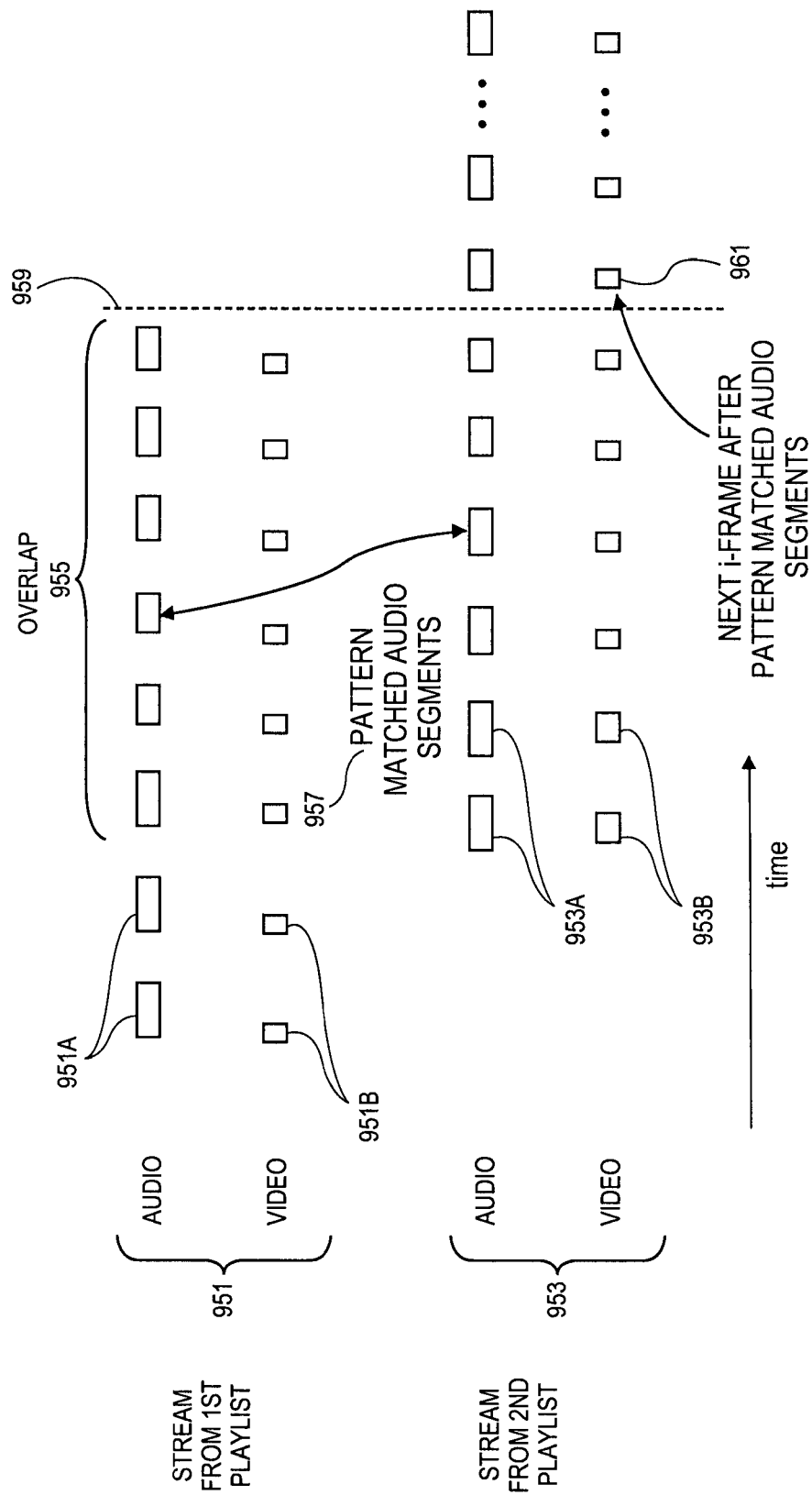

PLAYLISTS FOR REAL-TIME OR NEAR REAL-TIME STREAMING

RELATED APPLICATIONS

This application claims the benefit of the filing date, under 35 U.S.C. §119(e), of U.S. Provisional Application No. 61/493,324 filed on Jun. 3, 2011. The present U.S. Patent application is also related to the following U.S. Patent applications, each of which is incorporated herein by reference:

(1) application Ser. No. 12/479,690, filed Jun. 5, 2009, entitled "REAL-TIME OR NEAR REAL-TIME STREAMING;"

(2) application Ser. No. 12/479,698, filed Jun. 5, 2009, entitled "VARIANT STREAMS FOR REAL-TIME OR NEAR REAL-TIME STREAMING," now issued as U.S. Pat. No. 8,099,473;

(3) application Ser. No. 12/479,732, filed Jun. 5, 2009, entitled "UPDATABLE REAL-TIME OR NEAR REAL-TIME STREAMING," now issued as U.S. Pat. No. 8,099,476; and (4) application Ser. No. 12/479,735, filed Jun. 5, 2009, entitled "PLAYLISTS FOR REAL-TIME OR NEAR REAL-TIME STREAMING."

TECHNICAL FIELD

Embodiments of the invention relate to data transmission techniques. More particularly, embodiments of the invention relate to techniques that allow streaming of data using non-streaming protocols such as, for example, HyperText Transfer Protocol (HTTP).

BACKGROUND

Streaming of content generally refers to multimedia content that is constantly transmitted from a server device and received by a client device. The content is usually presented to an end-user while it is being delivered by the streaming server. The name refers to the delivery method of the medium rather than to the medium itself.

Current streaming services generally require specialized servers to distribute "live" content to end users. In any large, scale deployment, this can lead to great cost, and requires specialized skills to set up and run. This results in a less than desirable library of content available for streaming.

SUMMARY OF THE DESCRIPTION

In one embodiment, an HTTP streaming system can use a variant playlist that identifies different audio playlists, such as one in English and another in Spanish and another in Chinese, for the same video program which also has a playlist for the video content. For example, a live sports event, such as a baseball game can have a video playlist that is transmitted from a server to a client and the same live sports event can have a variant audio playlist that specifies different audio playlists that correspond to either different languages or different coverage perspectives (such as a local broadcaster who broadcasts the game versus a national broadcaster who broadcasts the game). A client device can download from a server a video playlist and also download the variant audio playlist, and then the client device can select the appropriate audio program from the variant audio playlist and download the appropriate audio playlist corresponding to that selected appropriate audio program. With both the video playlist and the selected audio playlist downloaded, the client can begin processing both playlists concurrently and, in one embodiment, independently, to create and present the video and audio at the client device.

A method in one embodiment at a client device can include the operations of: receiving a variant audio playlist for a program, wherein the variant audio playlist contains a set of URLs for different audio content for the program and each of the URLs in the set of URLs refers to an audio playlist corresponding to one of the different audio content for the program; selecting a first URL of the set of URLs for one of the different audio content, the first URL referring to a first playlist; transmitting the first URL which refers to the first playlist; receiving the first playlist; and processing the first playlist to retrieve audio content for the program. In one embodiment, the method can further include determining an audio preference, and this audio preference can be set by a user, such as a setting in a user preference, and this audio preference can cause the selection of the first URL in the method. The method, in one embodiment can further include receiving a video playlist for the program; the video playlist can contain URLs for video content for the program, and each of the URLs for the video content are associated with or referred to a portion in time of the video content. This portion of time matches the portion of time for the audio playlist being concurrently processed by the client device while the video playlist is being processed. The method can also include switching between URLs for the audio content by using the variant audio playlist to select a different audio playlist; in one embodiment, the switching between audio playlists in the variant audio playlist can be performed independently of playback of the video playlist. The method can further include, in one embodiment, processing the audio playlist and the video playlist concurrently and independently; for example, a first software component which is a player for audio can process the audio playlist independently of a second software component which processes the video playlist. Moreover, in one embodiment, an audio download module can independently download and process audio content while a video download module can separately download and process video content. In one embodiment, timestamps in audio content retrieved through the audio playlist and timestamps in the video content retrieved through the video playlist specify the same period of time. Moreover, each of the URLs. in the set of URLs which refer to different audio content, include timestamps which specify the same time period.

A method performed by a server device in one embodiment of the invention can include transmitting, in response to a request from a device, a variant audio playlist containing a set of URLs for different audio content for a program which was requested, wherein each of the URLs in the set of URLs refer to an audio playlist corresponding to one of a different audio content for the program. The method can further include receiving from the device a first URL in the set of URLs and transmitting, in response to receiving the first URL, a first audio playlist to the device, wherein the first URL referred to the first audio playlist.

Other methods are described herein, and machine readable non-transitory storage media are also described herein, and systems which perform these methods are also described herein.

BRIEF DESCRIPTION OF THE DRAWINGS

The present invention is illustrated by way of example and not limitation in the figures of the accompanying drawings in which like references indicate similar elements.

The present invention is illustrated by way of example and not limitation in the figures of the accompanying drawings in which like references indicate similar elements.

FIG. 9D shows diagrammatically how the method of FIG. 9C is implemented with audio pattern matching.

DETAILED DESCRIPTION

Figure 1:
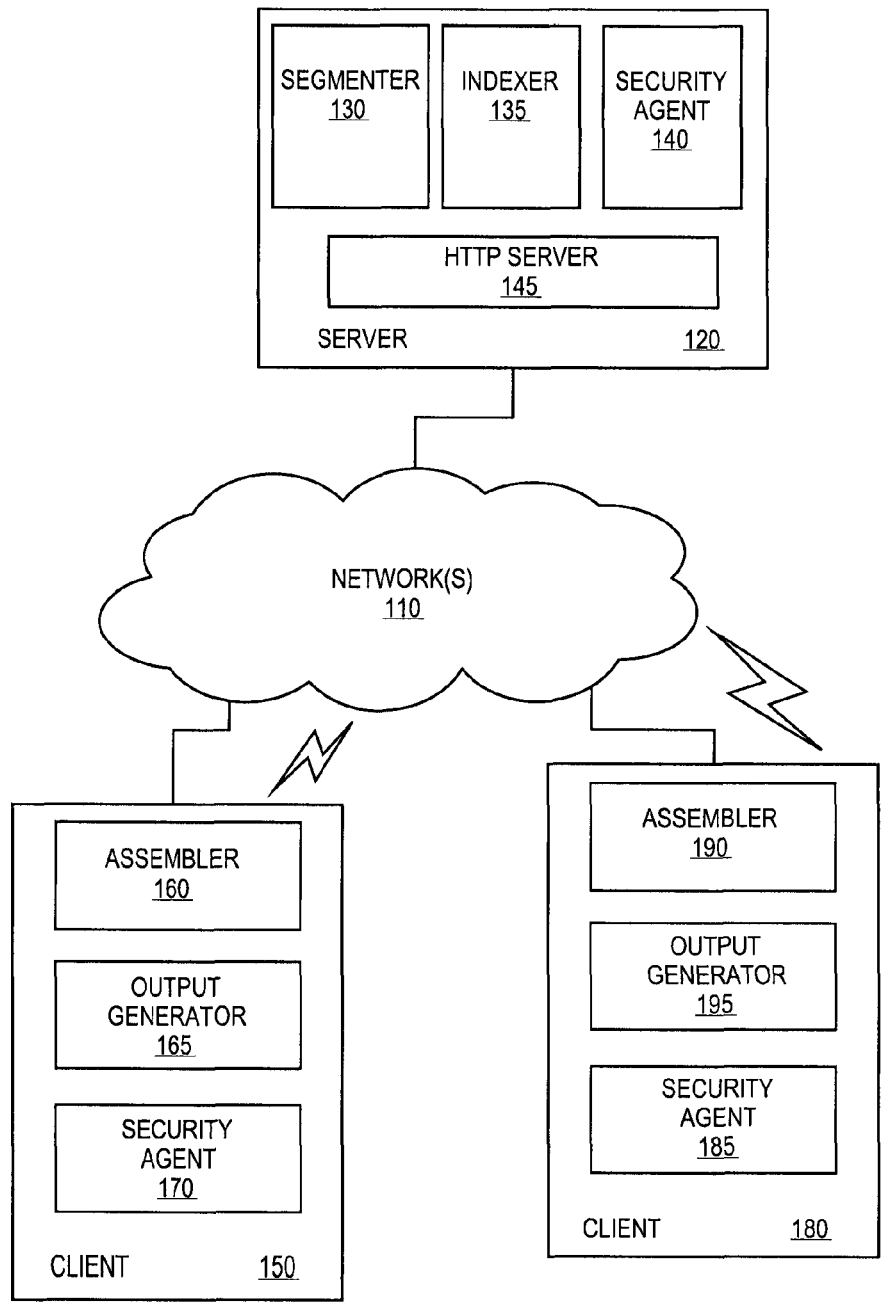
FIG. 1 is a block diagram of one embodiment of a server and clients that can send and receive real-time, or near real-time, content.

In the following description, numerous specific details are set forth. However, embodiments of the invention may be practiced without these specific details. In other instances, well-known circuits, structures and techniques have not been shown in detail in order not to obscure the understanding of this description.

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Inc. 2009.

In one embodiment, techniques and components described herein can include mechanisms to deliver streaming experience using non-streaming protocols (e.g., HTTP) and other technologies (e.g., Motion Picture Expert Group (MPEG) streams). For example, near real-time streaming experience can be provided using HTTP to broadcast a "live" musical or sporting event, live news, a Web camera feed, etc. In one embodiment, a protocol can segment incoming media data into multiple media files and store those segmented media files on a server. The protocol can also build a playlist file that includes Uniform Resource Identifiers (URIs) that direct the client to the segmented media files stored on a server. When the segmented media files are played back in accordance with the playlist file(s), the client can provide the user with a near real-time broadcast of a "live" event. Pre-recorded content can be provided in a similar manner.

One aspect of this description relates to the use of audio playlist that provides variants of audio for a selected program; for example, an audio playlist can provide different playlists in different languages for the same video program which also has a playlist for the video content, wherein that video playlist is separate from the audio playlists in the different languages. These aspects will be described in conjunction with FIGS. 10 through 15 after providing some background information in conjunction with FIGS. 1 through 9D.

In one embodiment, the server can dynamically introduce supplementary or alternative media content (e.g., advertisements, statistics related to a sporting event, additional media content to the main presentation) into the broadcast event. For example, during client playback of a media event, the server can add additional URIs to the playlist file, the URIs may identify a location from which a client can download a supplementary media file. The client can be instructed to periodically retrieve from the server one or more updated playlist file(s) in order to access any supplementary or additional (or both) media content the server has introduced.

In one embodiment, the server can operate in either cumulative mode or in rolling mode. In cumulative mode, the server can create a playlist file and append media file identifiers to the end of the playlist file. The client then has access to all parts of the stream from a single playlist file (e.g., a user can start at the middle of a show) when downloaded. In rolling mode, the server may limit the availability of media files by removing media file identifiers from the beginning of the playlist file on a rolling basis, thereby providing a sliding window of media content accessible to a client device. The server can also add media file identifiers to the playlist and, in rolling mode, the server can limit the availability of media files to those that have been most recently added to the playlist. The client then repeatedly downloads updated copies of the playlist file to continue viewing. The rolling basis for playlist downloading can be useful when the content is potentially unbounded in time (e.g. content from a continuously operated web cam). The client can continue to repeatedly request the playlist in the rolling mode until it finds an end tag in the playlist.

In one embodiment, the mechanism supports bit rate switching by providing variant streams of the same presentation. For example, several versions of a presentation to be served can be stored on the server. Each version can have substantially the same content but be encoded at different bit rates. This can allow the client device to switch between bit rates depending on, for example, a detection of the available bandwidth, without compromising continuity of playback.

In one embodiment, protection features may be provided to protect content against unauthorized use. For example, non-sequential media file numbering may be used to prevent prediction. Encryption of media files may be used. Partial media file lists may be used. Additional and/or different protection features may also be provided.

FIG. 1 is a block diagram of one embodiment of a server and clients that can send and receive real-time, or near real-time, content. The example of FIG. 1 provides a simple server-client connection with two clients coupled with a server via a network. Any number of clients may be supported utilizing the techniques and mechanisms described herein. Further, multiple servers may provide content and/or may operate together to provide content according to the techniques and mechanisms described herein. For example, one server may create the content, create the playlists and create the multiple media (e.g. files) and other servers store and transmit the created content.

Network 110 may be any type of network whether wired, wireless (e.g., IEEE 802.11, 802.16) or any combination thereof. For example, Network 100 may be the Internet or an intranet. As another example, network 110 may be a cellular network (e.g., 3G, CDMA). In one embodiment, client devices 150 and 180 may be capable of communicating over multiple network types (e.g. each device can communicate over a WiFi wireless LAN and also over a wireless cellular telephone network). For example, client devices 150 and 180 may be smart phones or cellular-enabled personal digital assistants that can communicate over cellular radiotelephone networks as well as data networks. These devices may be able to utilize the streaming mechanisms described herein over either type of network or even switch between networks as necessary.

Server 120 may operate as a HTTP server in any manner known in the art. That is server 120 includes a HTTP server agent 145 that provides content using HTTP protocols. While the example of FIG. 1 is described in terms of HTTP, other protocols can be utilized in a similar manner. Segmenter 130 and indexer 135 are agents that reside on server 120 (or multiple servers) to provide content in media files with a playlist file as described herein. These media files and playlist files may be provided over network 110 via HTTP server agent 145 (or via other servers) using HTTP protocols. Agents as discussed herein can be implemented as hardware, software, firmware or a combination thereof.

Segmenter 130 may function to divide the stream of media data into multiple media files that may be transmitted via HTTP protocols. Indexer 135 may function to create a playlist file corresponding to the segmented media files so that client devices can reassemble the media files to provide real-time, or near real-time, transmission of the content provided by server 120. In response to one or more requests from a client device, HTTP server agent 145 (or other servers) may transmit one or more playlist files as generated by indexer 135 and media files of content as generated by segmenter 130. Server 120 may further include optional security agent 140 that provides one or more of the security functions (e.g. encryption) discussed herein. Server 120 may also include additional components not illustrated in FIG. 1.

Client devices 150 and 180 may receive the playlist files and media files from server 120 over network 110. Client devices may be any type of electronic device that is capable of receiving data transmitted over a network and generate output utilizing the data received via the network, for example, wireless mobile devices, PDAs, entertainment devices, consumer electronic devices, etc. The output may be any media type of combination of media types, including, for example, audio, video or any combination thereof.

Client device 150 can include assembler agent 160 and output generator agent 165. Similarly, client device 180 can include assembler agent 190 and output generator agent 195. Assembler agents 160 and 180 receive the playlist files from server 120 and use the playlist files to access and download media files from server 120. Output generator agents 165 and 195 use the downloaded media files to generate output from client devices 150 and 160, respectively. The output may be provided by one or more speakers, one or more display screens, a combination of speakers and display screens or any other input or output device. The client devices can also include memory (e.g. flash memory or DRAM, etc.) to act as a buffer to store the media files (e.g. compressed media files or decompressed media files) as they are received; the buffer can provide many seconds worth of presentable content beyond the time of content currently being presented so that the buffered content can later be displayed while new content is being downloaded. This buffer can provide presentable content while the client device is attempting to retrieve content through an intermittently slow network connection and hence the buffer can hide network latency or connection problems.

Client devices 150 and 180 may further include optional security agents 170 and 185, respectively that provide one or more of the security functions discussed herein. Client devices 150 and 180 may also include additional components not illustrated in FIG. 1.

In one embodiment, the techniques that are described in this application may be used to transmit an unbounded stream of multimedia data over a non-streaming protocol (e.g., HTTP). Embodiments can also include encryption of media data and/or provision of alternate versions of a stream (e.g., to provide alternate bit rates). Because media data can be transmitted soon after creation, the data can be received in near real-time. Example data formats for files as well as actions to be taken by a server (sender) and a client (receiver) of the stream of multimedia data are provided; however, other formats can also be supported.

A media presentation that can be transmitted as a simulated real-time stream (or near real-time stream) is specified by a Universal Resource Indicator (URI) that indicates a playlist file. In one embodiment, the playlist file is an ordered list of additional URIs. Each URI in the playlist file refers to a media file that is a segment of a stream, which may be a single contiguous stream of media data for a particular program.

In order to play the stream of media data, the client device obtains the playlist file from the server. The client also obtains and plays each media data file indicated by the playlist file. In one embodiment, the client can dynamically or repeatedly reload the playlist file to discover additional and/or different media segments.

The playlist files may be, for example, Extended M3U Playlist files. In one embodiment, additional tags that effectively extend the M3U format are used. M3U refers to Moving Picture Experts Group Audio Layer 3 Uniform Resource Locator (MP3 URL) and is a format used to store multimedia playlists. A M3U file is a text file that contains the locations of one or more media files for a media player to play.

The playlist file, in one embodiment, is an Extended M3U-formatted text file that consists of individual lines. The lines can be terminated by either a single LF character or a CR character followed by a LF character. Each line can be a URI, a blank line, or start with a comment character (e.g. '#'). URIs identify media files to be played. Blank lines can be ignored.

Lines that start with the comment character can be either comments or tags. Tags can begin with #EXT, while comment lines can begin with #. Comment lines are normally ignored by the server and client. In one embodiment, playlist files are encoded in UTF-8 format. UTF-8 (8-bit Unicode Transformation Format) is a variable-length character encoding format. In alternate embodiments, other character encoding formats can be used.

In the examples that follow, an Extended M3U format is utilized that includes two tags: EXTM3U and EXTINF. An Extended M3U file may be distinguished from a basic M3U file by a first line that includes "#EXTM3U".

EXTINF is a record marker that describes the media file identified by the URI that follows the tag. In one embodiment, each media file URI is preceded by an EXTINF tag, for example:

EXTINF:<duration>,<title> where "duration" specifies the duration of the media file and "title" is the title of the target media file.

In one embodiment, the following tags may be used to manage the transfer and playback of media files:

EXT-X-TARGETDURATION
 EXT-X-MEDIA-SEQUENCE
 EXT-X-KEY
 EXT-X-PROGRAM-DATE-TIME
 EXT-X-ALLOW-CACHE
 EXT-X-STREAM-INF
 EXT-X-ENDLIST

These tags will each be described in greater detail below. While specific formats and attributes are described with respect to each new tag, alternative embodiments can also be supported with different attributes, names, formats, etc.

The EXT-X-TARGETDURATION tag can indicate the approximate duration of the next media file that will be added to the presentation. It can be included in the playback file and the format can be:

EXT-X-TARGETDURATION:<seconds> where "seconds" indicates the duration of the media file. In one embodiment, the actual duration may differ slightly from the target duration indicated by the tag. In one embodiment, every URI indicating a segment will be associated with an approximate duration of the segment; for example, the URI for a segment may be prefixed with a tag indicating the approximate duration of that segment.

Each media file URI in a playlist file can have a unique sequence number. The sequence number, if present, of a URI is equal to the sequence number of the URI that preceded it, plus one in one embodiment. The EXT-X-MEDIA-SEQUENCE tag can indicate the sequence number of the first URI that appears in a playlist file and the format can be:

EXT-X-MEDIA-SEQUENCE:<number> where "number" is the sequence number of the URI. If the playlist file does not include a #EXT-X-MEDIA-SEQUENCE tag, the sequence number of the first URI in the playlist can be considered 1. In one embodiment, the sequence numbering can be non-sequential; for example, non-sequential sequence numbering such as 1, 5, 7, 17, etc. can make it difficult to predict the next number in a sequence and this can help to protect the content from pirating. Another option to help protect the content is to reveal only parts of a playlist at any given time.

Some media files may be encrypted. The EXT-X-KEY tag provides information that can be used to decrypt media files that follow it and the format can be:

EXT-X-KEY:METHOD=<method>[,URI="<URI>"]

The METHOD parameter specifies the encryption method and the URI parameter, if present, specifies how to obtain the key.

An encryption method of NONE indicates no encryption. Various encryption methods may be used, for example AES-128, which indicates encryption using the Advance Encryption Standard encryption with a 128-bit key and PKCS7 padding [see RFC3852]. A new EXT-X-KEY tag supersedes any prior EXT-X-KEY tags.

An EXT-X-KEY tag with a URI parameter identifies the key file. A key file may contain the cipher key that is to be used to decrypt subsequent media files listed in the playlist file. For example, the AES-128 encryption method uses 16-octet keys. The format of the key file can be a packed array of 16 octets in binary format.

Use of AES-128 normally requires that the same 16-octet initialization vector (IV) be supplied when encrypting and decrypting. Varying the IV can be used to increase the strength of the cipher. When using AES-128 encryption, the sequence number of the media file can be used as the IV when encrypting or decrypting media files.

The EXT-X-PROGRAM-DATE-TIME tag can associate the beginning of the next media file with an absolute date and/or time and can include or indicate a time zone. In one embodiment, the date/time representation is ISO/IEC 8601:2004. The tag format can be:

EXT-X-PROGRAM-DATE-TIME:<YYYY-MM-DDThh:mm:ssZ>

The EXT-X-ALLOW-CACHE tag can be used to indicate whether the client may cache the downloaded media files for later playback. The tag format can be:

EXT-X-ALLOW-CACHE:<YES|NO>

The EXT-X-ENDLIST tag indicates in one embodiment that no more media files will be added to the playlist file. The tag format can be:

EXT-X-ENDLIST

In one embodiment, if a playlist contains the final segment or media file then the playlist will have the EXT-X-ENDLIST tag.

The EXT-X-STREAM-INF tag can be used to indicate that the next URI in the playlist file identifies another playlist file. The tag format can be, in one embodiment:

EXT-X-STREAM-INF:[attribute=value][,attribute=value]*<URI> where the following attributes may be used. The attribute BANDWIDTH=<n> is an approximate upper bound of the stream bit rate expressed as a number of bits per second. The attribute PROGRAM-ID=<i> is a number that uniquely identifies a particular presentation within the scope of the playlist file. A playlist file may include multiple EXT-X-STREAM-INF URIs with the same PROGRAM-ID to describe variant streams of the same presentation. Variant streams and variant playlists are described further in this disclosure (e.g. see FIGS. 9A-9D).

The foregoing tags and attributes can be used by the server device to organize, transmit and process the media files that represent the original media content. The client devices use this information to reassemble and present the media files in a manner to provide a real-time, or near real-time, streaming experience (e.g. viewing of a live broadcast such as a music or sporting event) to a user of the client device.

Each media file URI in a playlist file identifies a media file that is a segment of the original presentation (i.e., original media content). In one embodiment, each media file is formatted as a MPEG-2 transport stream, a MPEG-2 program stream, or a MPEG-2 audio elementary stream. The format can be specified by specifying a CODEC, and the playlist can specify a format by specifying a CODEC. In one embodiment, all media files in a presentation have the same format; however, multiple formats may be supported in other embodiments. A transport stream file should, in one embodiment, contain a single MPEG-2 program, and there should be a Program Association Table and a Program Map Table at the start of each file. A file that contains video SHOULD have at least one key frame and enough information to completely initialize a video decoder. Clients SHOULD be prepared to handle multiple tracks of a particular type (e.g. audio or video) by choosing a reasonable subset. Clients should, in one embodiment, ignore private streams inside Transport Streams that they do not recognize. The encoding parameters for samples within a stream inside a media file and between corresponding streams across multiple media files SHOULD remain consistent. However clients SHOULD deal with encoding changes as they are encountered, for example by scaling video content to accommodate a resolution change.

Figure 2A:
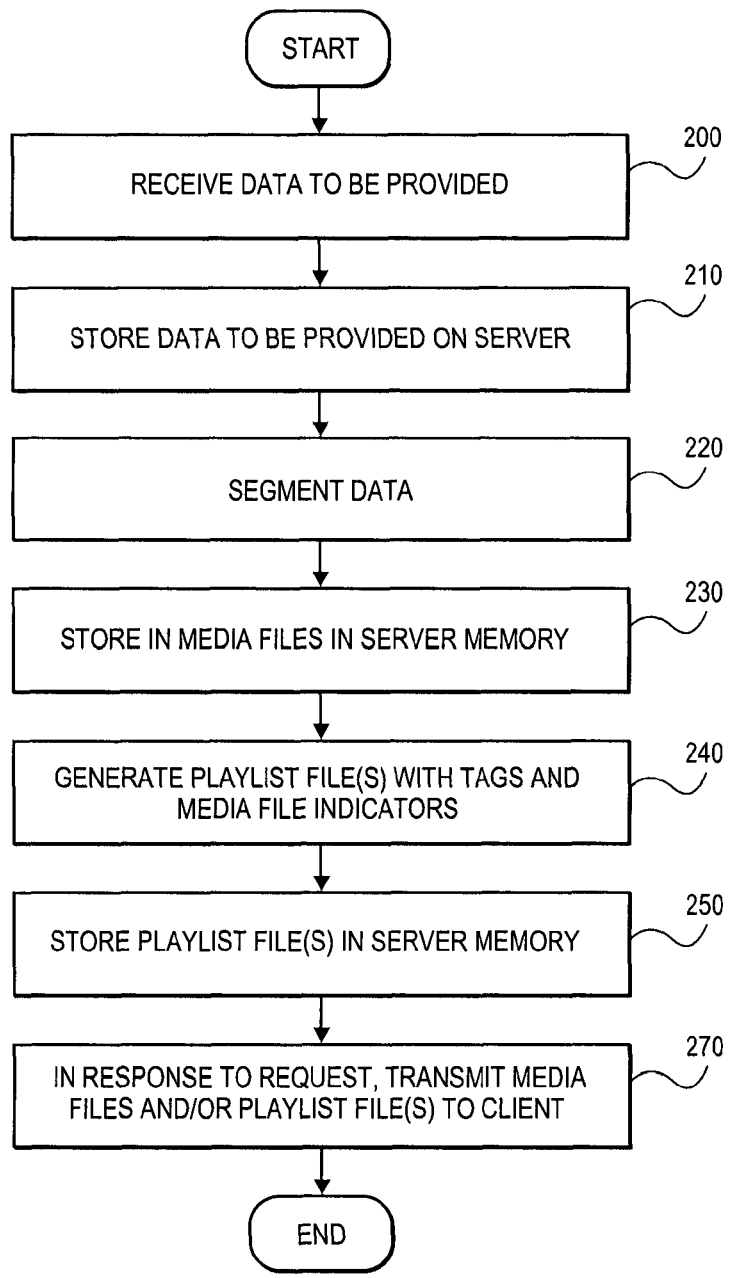
FIG. 2A is a flow diagram of one embodiment of a technique for one or more server devices to support media content using non-streaming protocols.

FIG. 2A is a flow diagram of one embodiment of a technique for one or more server devices to support media content using non-streaming protocols. The example of FIG. 2A is provided in terms of HTTP; however, other non-streaming protocols can be utilized in a similar manner. The example of FIG. 2A is provided in terms of a single server performing certain tasks. However, any number of servers may be utilized. For example, the server that provides media files to client devices may be a different device than a server that segments the content into multiple media files.

The server device receives content to be provided in operation 200. The content may represent live audio and/or video (e.g., a sporting event, live news, a Web camera feed). The content may also represent pre-recorded content (e.g., a concert that has been recorded, a training seminar, etc.). The content may be received by the server according to any format and protocol known in the art, whether streamed or not. In one embodiment, the content is received by the server in the form of a MPEG-2 stream; however, other formats can also be supported.

The server may then store temporarily at least portions of the content in operation 210. The content or at least portions of the content may be stored temporarily, for example, on a storage device (e.g., hard disk in a Storage Area Network, etc.) or in memory. Alternatively, the content may be received as via a storage medium (e.g., compact disc, flash drive) from which the content may be transferred to a storage device or memory. In one embodiment, the server has an encoder that converts, if necessary, the content to one or more streams (e.g., MPEG-2). This conversion can occur without storing permanently the received content, and in some embodiments, the storage operation 210 may be omitted or it may be a longer term storage (e.g. an archival storage) in other embodiments.

The content to be provided is segmented into multiple media files in operation 220. In one embodiment, the server converts a stream into separate and distinct media files (i.e., segments) that can be distributed using a standard web server. In one embodiment, the server segments the media stream at points that support effective decode of the individual media files (e.g., on packet and key frame boundaries such as PES packet boundaries and i-frame boundaries). The media files can be portions of the original stream with approximately equal duration. The server also creates a URI for each media file. These URIs allow client devices to access the media files.

Because the segments are served using HTTP servers, which inherently deliver whole files, the server should have a complete segmented media file available before it can be served to the clients. Thus, the client may lag (in time) the broadcast by at least one media file length. In one embodiment, media file size is based on a balance between lag time and having too many files.

In one embodiment, two session types (live session and event session) are supported. For a live session, only a fixed size portion of the stream is preserved. In one embodiment, content media files that are out of date are removed from the program playlist file, and can be removed from the server. The second type of session is an event session, where the client can tune into any point of the broadcast (e.g., start from the beginning, start from a mid-point). This type of session can be used for rebroadcast, for example.

The media files are stored in the server memory in operation 230. The media files can be protected by a security feature, such as encryption, before storing the files in operation 230. The media files are stored as files that are ready to transmit using the network protocol (e.g., HTTP or HTTPS) supported by the Web server application on the server device (or supported by another device which does the transmission).

One or more playlist files are generated to indicate the order in which the media files should be assembled to recreate the original content in operation 240. The playlist file(s) can utilize Extended M3U tags and the tags described herein to provide information for a client device to access and reassemble the media files to provide a streaming experience on the client device. A URI for each media file is included in the playlist file(s) in the order in which the media files are to be played. The server can also create one or more URIs for the playlist file(s) to allow the client devices to access the playlist file(s).

The playlist file(s) can be stored on the server in operation 250. While the creation and storing of media files and playlist file(s) are presented in a particular order in FIG. 2A, a different order may also be used. For example, the playlist file(s) may be created before the media files are created or stored. As another example, the playlist file(s) and media files may be created before either are stored.

If media files are to be encrypted the playlist file(s) can define a URI that allows authorized client devices to obtain a key file containing an encryption key to decrypt the media files. An encryption key can be transmitted using a secure connection (e.g., HTTPS). As another example, the playlist file(s) may be transmitted using HTTPS. As a further example, media files may be arranged in an unpredictable order so that the client cannot recreate the stream without the playlist file(s).

If the encryption method is AES-128, AES-128 CBC encryption, for example, may be applied to individual media files. In one embodiment, the entire file is encrypted. Cipher block chaining is normally not applied across media files in one embodiment. The sequence of the media files is use as the IV as described above. In one embodiment, the server adds an EXT-X-KEY tag with the key URI to the end of the playlist file. The server then encrypts all subsequent media files with that key until a change in encryption configuration is made.

To switch to a new encryption key, the server can make the new key available via a new URI that is distinct from all previous key URIs used in the presentation. The server also adds an EXT-X-KEY tag with the new key URI to the end of a playlist file and encrypts all subsequent media files with the new key.

To end encryption, the server can add an EXT-X-KEY tag with the encryption method NONE at the end of the playlist file. The tag (with "NONE" as the method) does not include a URI parameter in one embodiment. All subsequent media files are not encrypted until a change in encryption configuration is made as described above. The server does not remove an EXT-X-KEY tag from a playlist file if the playlist file contains a URI to a media file encrypted with that key. The server can transmit the playlist file(s) and the media files over the network in response to client requests in operation 270, as described in more detail with respect to FIG. 3A.

In one embodiment, a server transmits the playlist file to a client device in response to receiving a request from a client device for a playlist file. The client device may access/request the playlist file using a URI that has been provided to the client device. The URI indicates the location of the playlist file on the server. In response, the server may provide the playlist file to the client device. The client device may the utilize tags and URIs (or other identifiers) in the playlist file to access the multiple media files.

In one embodiment, the server may limit the availability of media files to those that have been most recently added to the playlist file(s). To do this, each playlist file can include only one EXT-X-MEDIA-SEQUENCE tag and the value can be incremented by one for every media file URI that is removed from the playlist file. Media file URIs can be removed from the playlist file(s) in the order in which they were added. In one embodiment, when the server removes a media file URI from the playlist file(s) the media file remains available to clients for a period of time equal to the duration of the media file plus the duration of the longest playlist file in which the media file has appeared.

The duration of a playlist file is the sum of the durations of the media files within that playlist file. Other durations can also be used. In one embodiment, the server can maintain at least three main presentation media files in the playlist at all times unless the EXT-X-ENDLIST tag is present.

Figure 2B:
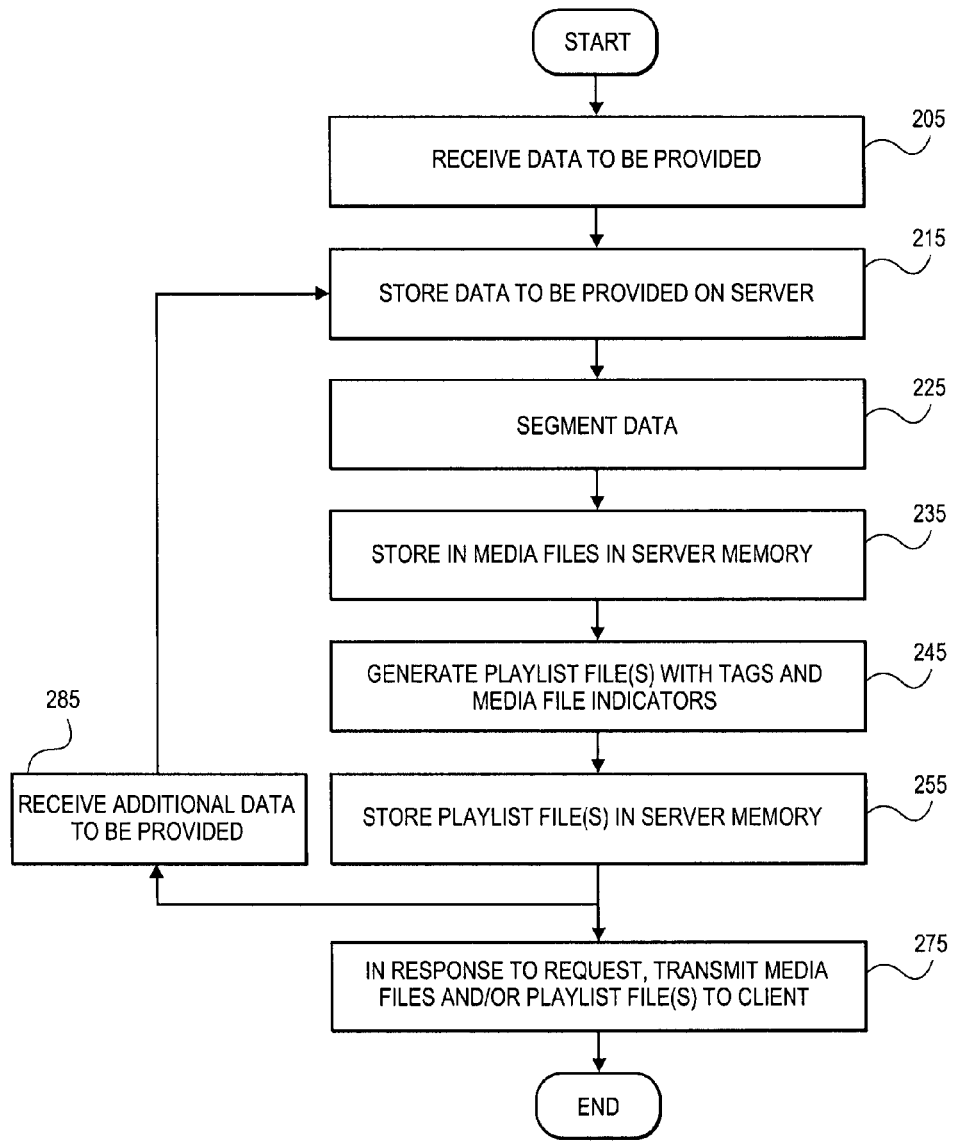
FIG. 2B is a flow diagram of one embodiment of a technique for one or more server devices to provide dynamically updated playlists to one or more client devices.

FIG. 2B is a flow diagram of one embodiment of a technique for one or more server devices to provide dynamically updated playlists to one or more client devices. The playlists can be updated using either of the cumulative mode or the rolling mode described herein. The example of FIG. 2B is provided in terms of HTTP; however, other non-streaming protocols (e.g. HTTPS, etc.) can be utilized in a similar manner. The example of FIG. 2B is provided in terms of a server performing certain tasks. However, any number of servers may be utilized. For example, the server that provides media files to client devices may be a different device than the server that segments the content into multiple media files.

The server device receives content to be provided in operation 205. The server may then temporarily store at least portions of the content in operation 215. Operation 215 can be similar to operation 210 in FIG. 2A. The content to be provided is segmented into multiple media files in operation 225. The media files can be stored in the server memory in operation 235. The media files can be protected by a security feature, such as encryption, before storing the files in operation 235.

One or more playlist files are generated to indicate the order in which the media files should be assembled to recreate the original content in operation 245. The playlist file(s) can be stored on the server in operation 255. While the creation and storing of media files and playlist file(s) are presented in a particular order in FIG. 2B, a different order may also be used.

Figure 3A:
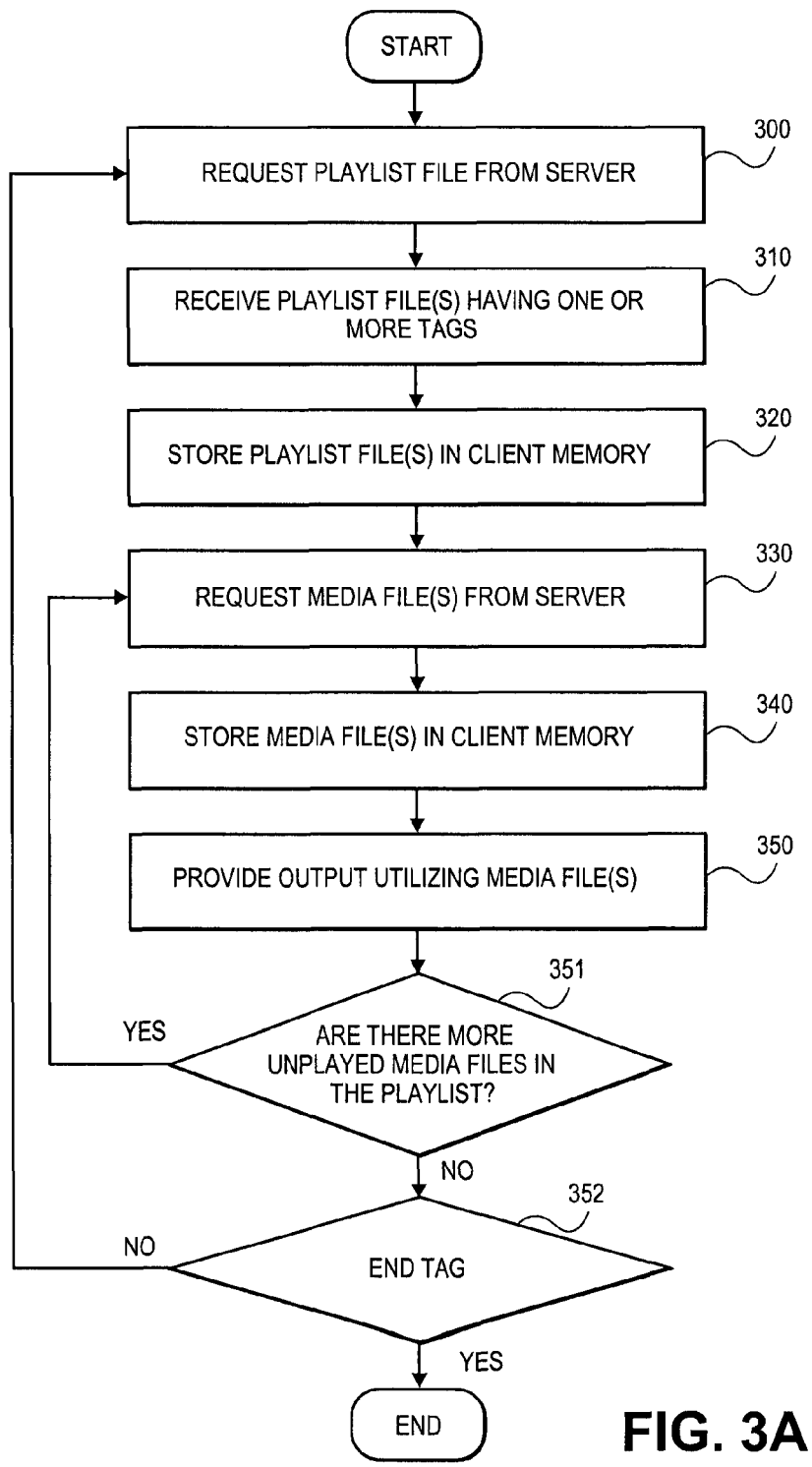
FIG. 3A is a flow diagram of one embodiment of a technique for a client device to support streaming of content using non-streaming protocols.
Figure 3B:
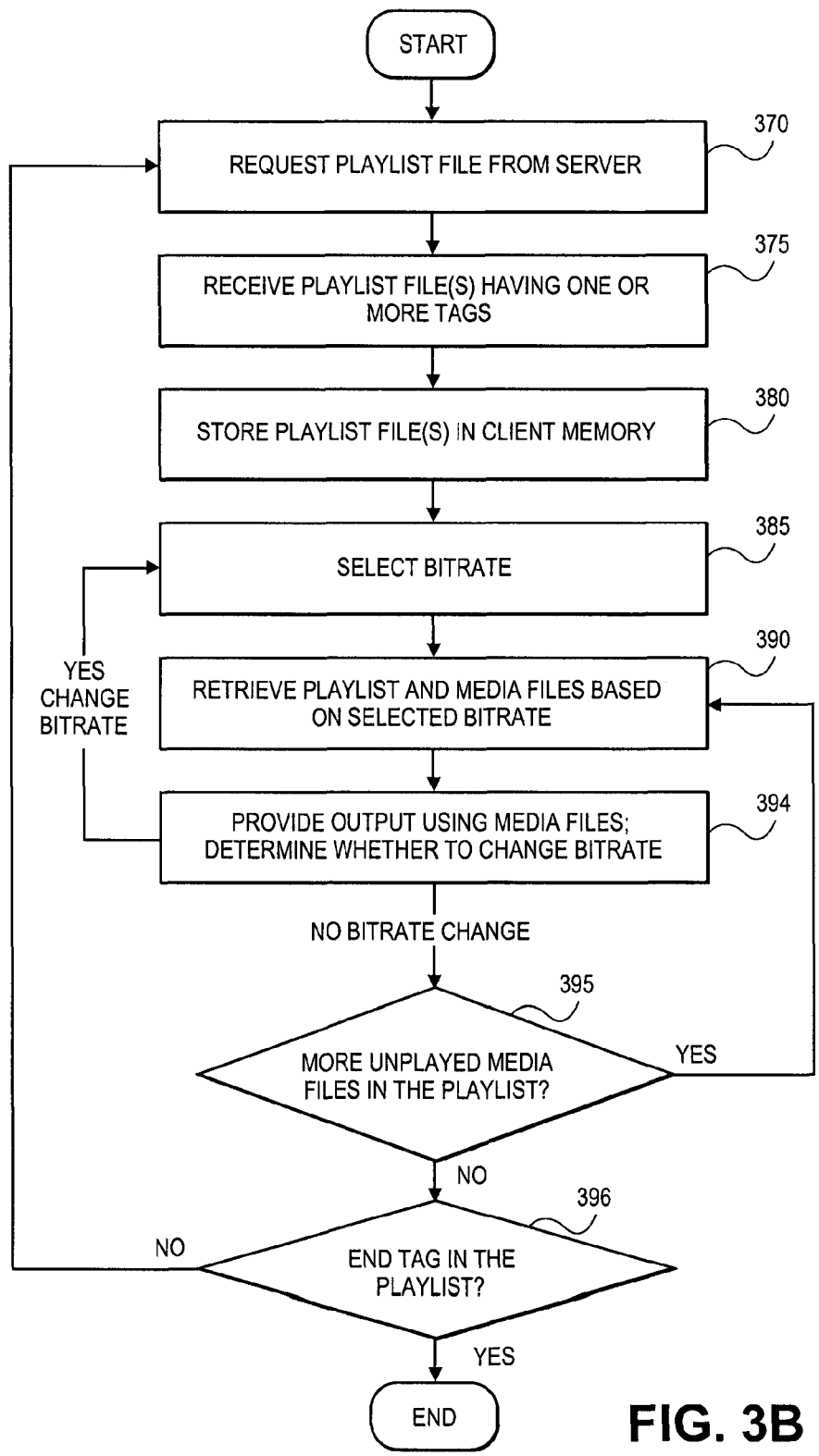
FIG. 3B is a flow diagram of one embodiment of a technique for a client device to support streaming of content using multiple bit rates.

The server (or another server) can transmit the playlist file(s) and the media files over the network in response to client requests in operation 275, as described in more detail with respect to FIGS. 3A-3B.

The playlist file(s) may be updated by a server for various reasons. The server may receive additional data to be provided to the client devices in operation 285. The additional data can be received after the playlist file(s) are stored in operation 255. The additional data may be, for example, additional portions of a live presentation, or additional information for an existing presentation. Additional data may include advertisements or statistics (e.g. scores or data relating to a sporting event). The additional data could be overlaid (through translucency) on the presentation or be presented in a sidebar user interface. The additional data can be segmented in the same manner as the originally received data. If the additional data constitutes advertisements, or other content to be inserted into the program represented by the playlist, the additional data can be stored (at least temporarily) in operation 215, segmented in operation 225 and stored in operation 235; prior to storage of the segmented additional data, the segments of the additional data can be encrypted. Then in operation 245 an updated playlist, containing the program and the additional data, would be generated. The playlist is updated based on the additional data and stored again in operation 255. Changes to the playlist file(s) should be made atomically from the perspective of the client device. The updated playlist replaces, in one embodiment, the previous playlist. As discussed below in greater detail, client devices can request the playlist multiple times. These requests enable the client devices to utilize the most recent playlist. In one embodiment, the additional data may be metadata; in this case, the playlist does not need to be updated, but the segments can be updated to include metadata. For example, the metadata may contain timestamps which can be matched with timestamps in the segments, and the metadata can be added to segments having matching timestamps.

The updated playlist may also result in the removal of media files. In one embodiment, a server should remove URIs, for the media files, from the playlist in the order in which they were added to the playlist. In one embodiment, if the server removes an entire presentation, it makes the playlist file(s) unavailable to client devices. In one embodiment, the server maintains the media files and the playlist file(s) for the duration of the longest playlist file(s) containing a media file to be removed to allow current client devices to finish accessing the presentation. Accordingly, every media file URI in the playlist file can be prefixed with an EXT-X-STREAM-INF tag to indicate the approximate cumulative duration of the media files indicated by the playlist file. In alternate embodiments, the media files and the playlist file(s) may be removed immediately.

Subsequent requests for the playlist from client devices result in the server providing the updated playlist in operation 275. In one embodiment, playlists are updated on a regular basis, for example, a period of time related to the target duration. Periodic updates of the playlist file allow the server to provide access to servers to a dynamically changing presentation.

Figure 2C:
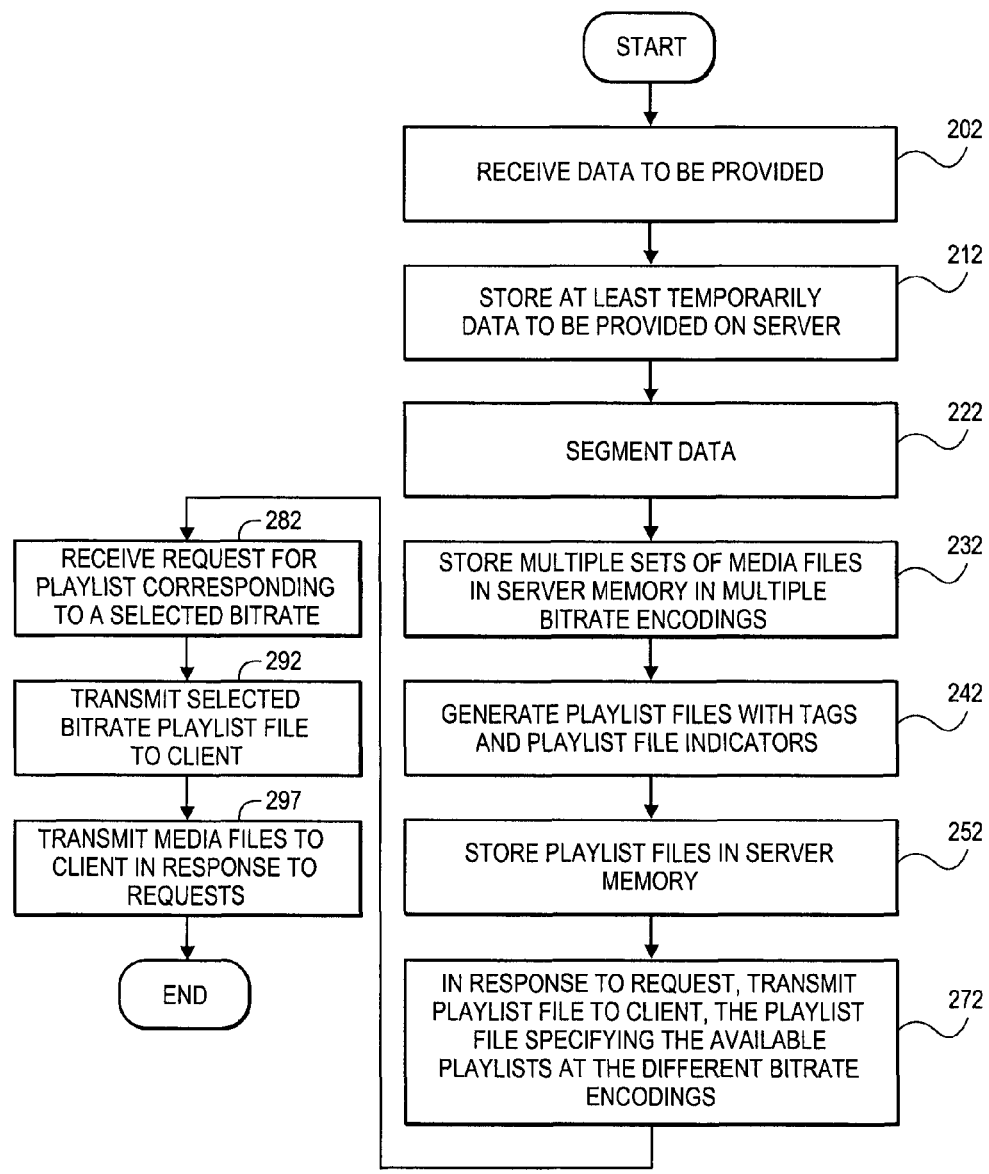
FIG. 2C is a flow diagram of one embodiment of a technique for one or more server devices to provide media content to client devices using multiple bit rates.

FIG. 2C is a flow diagram of one embodiment of a technique for one or more server devices to provide media content to client devices using multiple bit rates, which is one form of the use of alternative streams. The example of FIG. 2C is provided in terms of HTTP; however, other non-streaming protocols can be utilized in a similar manner. The example of FIG. 2C is provided in terms of a server performing certain tasks. However, any number of servers may be utilized. For example, the server that provides media files to client devices may be a different device than a server that segments the content into multiple media files.

In one embodiment, the server can offer multiple playlist files or a single playlist file with multiple media file lists in the single playlist file to provide different encodings of the same presentation. If different encodings are provided, playlist file(s) may include each variant stream providing different bit rates to allow client devices to switch between encodings dynamically (this is described further in connection with FIGS. 9A-9D). Playlist files having variant streams can include an EXT-X-STREAM-INF tag for each variant stream. Each EXT-X-STREAM-INF tag for the same presentation can have the same PROGRAM-ID attribute value. The PROGRAM-ID value for each presentation is unique within the variant streams.

In one embodiment, the server meets the following constraints when producing variant streams. Each variant stream can consist of the same content including optional content that is not part of the main presentation. The server can make the same period of content available for all variant streams within an accuracy of the smallest target duration of the streams. The media files of the variant streams are, in one embodiment, either MPEG-2 Transport Streams or MPEG-2 Program Streams with sample timestamps that match for corresponding content in all variant streams. Also, all variant streams should, in one embodiment, contain the same audio encoding. This allows client devices to switch between variant streams without losing content.

Referring to FIG. 2C, the server device receives content to be provided in operation 202. The server may then at least temporarily store the content in operation 212. The content to be provided is segmented into multiple media files in operation 222. Each media file is encoded for a selected bit rate (or a selected value of other encoding parameters) and stored on the server in operation 232. For example, the media files may be targeted for high-, medium- and low-bandwidth connections. The media files can be encrypted prior to storage. The encoding of the media files targeted for the various types of connections may be selected to provide a streaming experience at the target bandwidth level.

In one embodiment, a variant playlist is generated in operation 242 with tags as described herein that indicate various encoding levels. The tags may include, for example, an EXT-X-STREAM-INF tag for each encoding level with a URI to a corresponding media playlist file.

This variant playlist can include URIs to media playlist files for the various encoding levels. Thus, a client device can select a target bit rate from the alternatives provided in the variant playlist indicating the encoding levels and retrieve the corresponding playlist file. In one embodiment, a client device may change between bit rates during playback (e.g. as described with respect to FIGS. 9A-9D). The variant playlist indicating the various encoding levels is stored on the server in operation 252. In operation 242, each of the playlists referred to in the variant playlist can also be generated and then stored in operation 252.

In response to a request from a client device, the server may transmit the variant playlist that indicates the various encoding levels in operation 272. The server may receive a request for one of the media playlists specified in the variant playlist corresponding to a selected bit rate in operation 282. In response to the request, the server transmits the media playlist file corresponding to the request from the client device in operation 292. The client device may then use the media playlist to request media files from the server. The server provides the media files to the client device in response to requests in operation 297.

FIG. 3A is a flow diagram of one embodiment of a technique for a client device to support streaming of content using non-streaming protocols. The example of FIG. 3A is provided in terms of HTTP; however, other non-streaming protocols can be utilized in a similar manner. The methods shown in FIGS. 3A-3B can be performed by one client device or by several separate client devices. For example, in the case of any one of these methods, a single client device may perform all of the operations (e.g. request a playlist file, request media files using URIs in the playlist file, assemble the media files to generate and provide a presentation/output) or several distinct client devices can perform some but not all of the operations (e.g. a first client device can request a playlist file and request media files using URIs in the playlist file and can store those media files for use by a second client device which can process the media files to generate and provide a presentation/output).

The client device may request a playlist file from a server in operation 300. In one embodiment, the request is made according to an HTTP-compliant protocol. The request utilizes a URI to an initial playlist file stored on the server. In alternate embodiments, other non-streaming protocols can be supported. In response to the request, the server will transmit the corresponding playlist file to the client over a network. As discussed above, the network can be wired or wireless and can be any combination of wired or wireless networks. Further, the network may be a data network (e.g., IEEE 802.11, IEEE 802.16) or a cellular telephone network (e.g., 3G).

The client device can receive the playlist file in operation 310. The playlist file can be stored in a memory of the client device in operation 320. The memory can be, for example, a hard disk, a flash memory, a random-access memory. In one embodiment, each time a playlist file is loaded or reloaded from the playlist URI, the client checks to determine that the playlist file begins with a #EXTM3U tag and does not continue if the tag is absent. As discussed above, the playlist file includes one or more tags as well as one or more URIs to media files.

The client device can include an assembler agent that uses the playlist file to reassemble the original content by requesting media files indicated by the URIs in the playlist file in operation 330. In one embodiment, the assembler agent is a plug-in module that is part of a standard Web browser application. In another embodiment, the assembler agent may be a stand-alone application that interacts with a Web browser to receive and assemble the media files using the playlist file(s). As a further example, the assembler agent may be a special-purpose hardware or firmware component that is embedded in the client device.

The assembler causes media files from the playlist file to be downloaded from the server indicated by the URIs. If the playlist file contains the EXT-X-ENDLIST tag, any media file indicated by the playlist file may be played first. If the EXT-X-ENDLIST tag is not present, any media file except for the last and second-to-last media files may be played first. Once the first media file to play has been chosen, subsequent media files in the playlist file are loaded, in one embodiment, in the order that they appear in the playlist file (otherwise the content is presented out of order). In one embodiment, the client device attempts to load media files in advance of when they are required (and stores them in a buffer) to provide uninterrupted playback and to compensate for temporary variations in network latency and throughput.

The downloaded media file(s) can be stored in a memory on the client device in operation 340. The memory in which the content can be stored may be any type of memory on the client device, for example, random-access memory, a hard disk, or a video buffer. The storage may be temporary to allow playback or may be permanent. If the playlist file contains the EXT-X-ALLOW-CACHE tag and its value is NO, the client does not store the downloaded media files after they have been played. If the playlist contains the EXT-X-ALLOW-CACHE tag and its value is YES, the client device may store the media files indefinitely for later replay. The client device may use the value of the EXT-X-PROGRAM-DATE-TIME tag to display the program origination time to the user. In one embodiment, the client can buffer multiple media files so that it is less susceptible to network jitter, in order to provide a better user experience.

In one embodiment, if the decryption method is AES-128, then AES-128 CBC decryption is applied to the individual media files. The entire file is decrypted. In one embodiment, cipher block chaining is not applied across media files. The sequence number of the media file can be used as the initialization vector as described above.

From the memory, the content can be output from the client device in operation 350. The output or presentation may be, for example, audio output via built-in speakers or head phones. The output may include video that is output via a screen or projected from the client device. Any type of output known in the art may be utilized. In operation 351, the client device determines whether there are any more media files in the stored, current playlist which have not been played or otherwise presented. If such media files exist (and if they have not been requested) then processing returns to operation 330 in which one or more media files are requested and the process repeats. If there are no such media files (i.e., all media files in the current playlist have been played), then processing proceeds to operation 352, which determines whether the playlist file includes an end tag.

If the playlist includes an end tag (e.g., EXT-X-ENDLIST) in operation 352, playback ceases when the media files indicated by the playlist file have been played. If the end tag is not in the playlist, then the client device requests a playlist again from the server and reverts back to operation 300 to obtain a further or updated playlist for the program.

As discussed in greater detail with respect to FIG. 2B, a server may update a playlist file to introduce supplementary content (e.g., additional media file identifiers corresponding to additional media content in a live broadcast) or additional content (e.g. content further down the stream). To access the supplementary content or additional content, a client can reload the updated playlist from the server. This can provide a mechanism by which playlist files can be dynamically updated, even during playback of the media content associated with a playlist file. A client can request a reload of the playlist file based on a number of triggers. The lack of an end tag is one such trigger.

In one embodiment, the client device periodically reloads the playlist file(s) unless the playlist file contains the EXT-X-ENDLIST tag. When the client device loads a playlist file for the first time or reloads a playlist file and finds that the playlist file has changed since the last time it was loaded, the client can wait for a period of time before attempting to reload the playlist file again. This period is called the initial minimum reload delay. It is measured from the time that the client began loading the playlist file.

In one embodiment, the initial minimum reload delay is the duration of the last media file in the playlist file or three times the target duration, whichever is less. The media file duration is specified by the EXTINF tag. If the client reloads a playlist file and finds that it has not changed then the client can wait for a period of time before retrying. The minimum delay in one embodiment is three times the target duration or a multiple of the initial minimum reload delay, whichever is less. In one embodiment, this multiple is 0.5 for a first attempt, 1.5 for a second attempt and 3.0 for subsequent attempts; however, other multiples may be used.

Each time a playlist file is loaded or reloaded, the client device examines the playlist file to determine the next media file to load. The first file to load is the media file selected to play first as described above. If the first media file to be played has been loaded and the playlist file does not contain the EXT-X-MEDIA-SEQUENCE tag then the client can verify that the current playlist file contains the URI of the last loaded media file at the offset where it was originally found, halting playback if the file is not found. The next media file to load can be the first media file URI following the last-loaded URI in the playlist file.

If the first file to be played has been loaded and the playlist file contains the EXT-X-MEDIA-SEQUENCE tag, then the next media file to load can be the one with the lowest sequence number that is greater than the sequence number of the last media file loaded. If the playlist file contains an EXT-X-KEY tag that specifies a key file URI, the client device obtains the key file and uses the key inside the key file to decrypt the media files following the EXT-X-KEY tag until another EXT-X-KEY tag is encountered.

In one embodiment, the client device utilizes the same URI as previously used to download the playlist file. Thus, if changes have been made to the playlist file, the client device may use the updated playlist file to retrieve media files and provide output based on the media files.

Changes to the playlist file may include, for example, deletion of a URI to a media file, addition of a URI to a new media file, replacement of a URI to a replacement media file. When changes are made to the playlist file, one or more tags may be updated to reflect the change(s). For example, the duration tag may be updated if changes to the media files result in a change to the duration of the playback of the media files indicated by the playlist file.

FIG. 3B is a flow diagram of one embodiment of a technique for a client device to support streaming of content using multiple bit rates which is one form of alternative streams. The example of FIG. 3B is provided in terms of HTTP; however, other non-streaming protocols can be utilized in a similar manner.

The client device can request a playlist file in operation 370. As discussed above, the playlist file may be retrieved utilizing a URI provided to the client device. In one embodiment, the playlist file includes listings of variant streams of media files to provide the same content at different bit rates; in other words, a single playlist file includes URIs for the media files of each of the variant streams. The example shown in FIG. 3B uses this embodiment. In another embodiment, the variant streams may be represented by multiple distinct playlist files separately provided to the client that each provide the same content at different bit rates, and a variant playlist can provide a URI for each of the distinct playlist files. This allows the client device to select the bit rate based on client conditions.

The playlist file(s) can be retrieved by the client device in operation 375. The playlist file(s) can be stored in the client device memory in operation 380. The client device may select the bit rate to be used in operation 385 based upon current network connection speeds. Media files are requested from the server utilizing URIs included in the playlist file corresponding to the selected bit rate in operation 390. The retrieved media files can be stored in the client device memory. Output is provided by the client device utilizing the media files in operation 394 and the client device determines whether to change the bit rate.

In one embodiment, a client device selects the lowest available bit rate initially. While playing the media, the client device can monitor available bandwidth (e.g. current network connection bit rates) to determine whether the available bandwidth can support use of a higher bit rate for playback. If so, the client device can select a higher bit rate and access the media files indicated by the higher bit rate media playlist file. The reverse can also be supported. If the playback consumes too much bandwidth, the client device can select a lower bit rate and access the media files indicated by the lower bit rate media playlist file.

If the client device changes the bit rate in operation 394, for example, in response to a change in available bandwidth or in response to user input, the client device may select a different bit rate in operation 385. In one embodiment, to select a different bit rate the client device may utilize a different list of URIs included in the playlist file that corresponds to the new selected bit rate. In one embodiment, the client device may change bit rates during access of media files within a playlist.

If the bit rate does not change in operation 394, then the client device determines whether there are any more unplayed media files in the current playlist which have not been retrieved and presented. If such media files exist, then processing returns to operation 390 and one or more media files are retrieved using the URIs for those files in the playlist. If there are no such media files (i.e. all media files in the current playlist haven been played), then processing proceeds to operation 396 in which it is determined whether the playlist includes an end tag. If it does, the playback of the program has ended and the process has completed; if it does not, then processing reverts to operation 370, and the client device requests to reload the playlist for the program, and the process repeats through the method shown in FIG. 3B.

Figure 4:
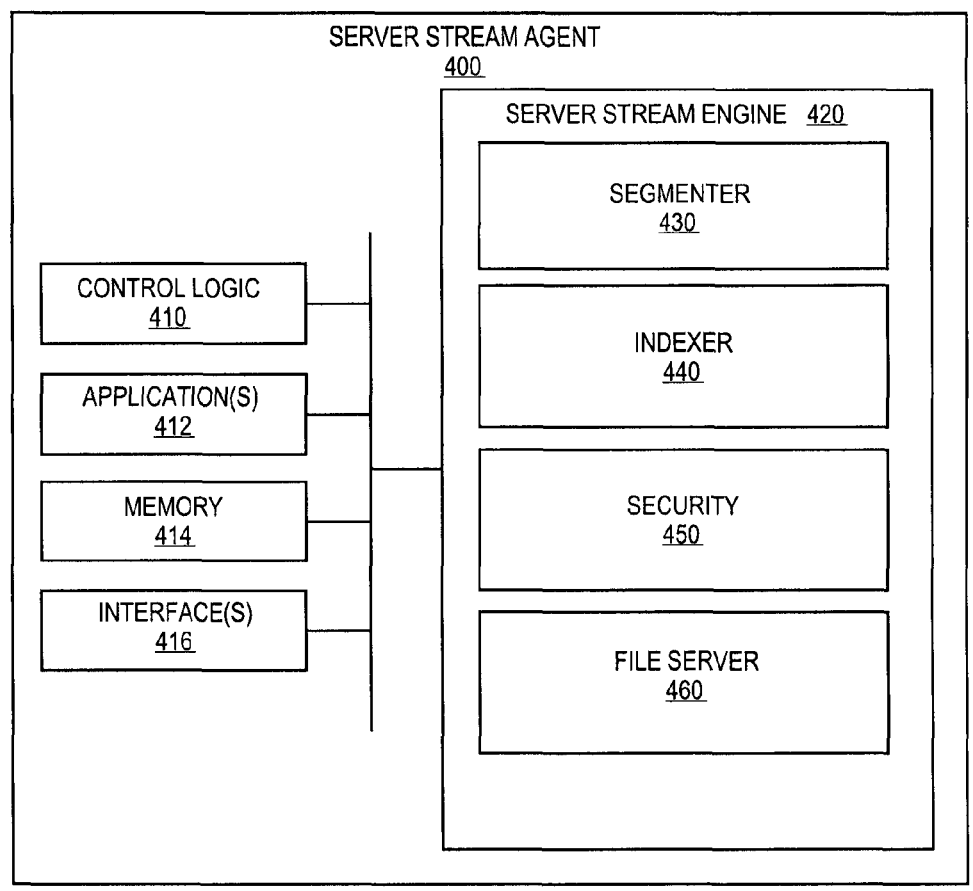
FIG. 4 is a block diagram of one embodiment of a server stream agent.

FIG. 4 is a block diagram of one embodiment of a server stream agent. It will be understood that the elements of server stream agent 400 can be distributed across several server devices. For example, a first server device can include the segmenter 430, the indexer 440 and security 450 but not the file server 460 and a second server device can include the file server 450 but not the segmenter 430, the indexer 440 and security 450. In this example, the first server device would prepare the playlists and media files but would not transmit them to client devices while one or more second server devices would receive and optionally store the playlists and media files and would transmit the playlists and media files to the client devices. Server stream agent 400 includes control logic 410, which implements logical functional control to direct operation of server stream agent 400, and hardware associated with directing operation of server stream agent 400. Logic may be hardware logic circuits or software routines or firmware. In one embodiment, server stream agent 400 includes one or more applications 412, which represent code sequence and/or programs that provide instructions to control logic 410.

Server stream agent 400 includes memory 414, which represents a memory device or access to a memory resource for storing data or instructions. Memory 414 may include memory local to server stream agent 400, as well as, or alternatively, including memory of the host system on which server stream agent 400 resides. Server stream agent 400 also includes one or more interfaces 416, which represent access interfaces to/from (an input/output interface) server stream agent 400 with regard to entities (electronic or human) external to server stream agent 400.

Server stream agent 400 also can include server stream engine 420, which represents one or more functions that enable server stream agent 400 to provide the real-time, or near real-time, streaming as described herein. The example of FIG. 4 provides several components that may be included in server stream engine 420; however, different or additional components may also be included. Example components that may be involved in providing the streaming environment include segmenter 430, indexer 440, security 450 and file server 460. Each of these components may further include other components to provide other functions. As used herein, a component refers to routine, a subsystem, etc., whether implemented in hardware, software, firmware or some combination thereof.

Segmenter 430 divides the content to be provided into media files that can be transmitted as files using a Web server protocol (e.g., HTTP). For example, segmenter 430 may divide the content into predetermined, fixed-size blocks of data in a pre-determined file format.

Indexer 440 may provide one or more playlist files that provide an address or URI to the media files created by segmenter 430. Indexer 440 may, for example, create one or more files with a listing of an order for identifiers corresponding to each file created by segmenter 430. The identifiers may be created or assigned by either segmenter 430 or indexer 440. Indexer 440 can also include one or more tags in the playlist files to support access and/or utilization of the media files.

Security 450 may provide security features (e.g. encryption) such as those discussed above. Web server 460 may provide Web server functionality related to providing files stored on a host system to a remote client device. Web server 460 may support, for example, HTTP-compliant protocols.

Figure 5:
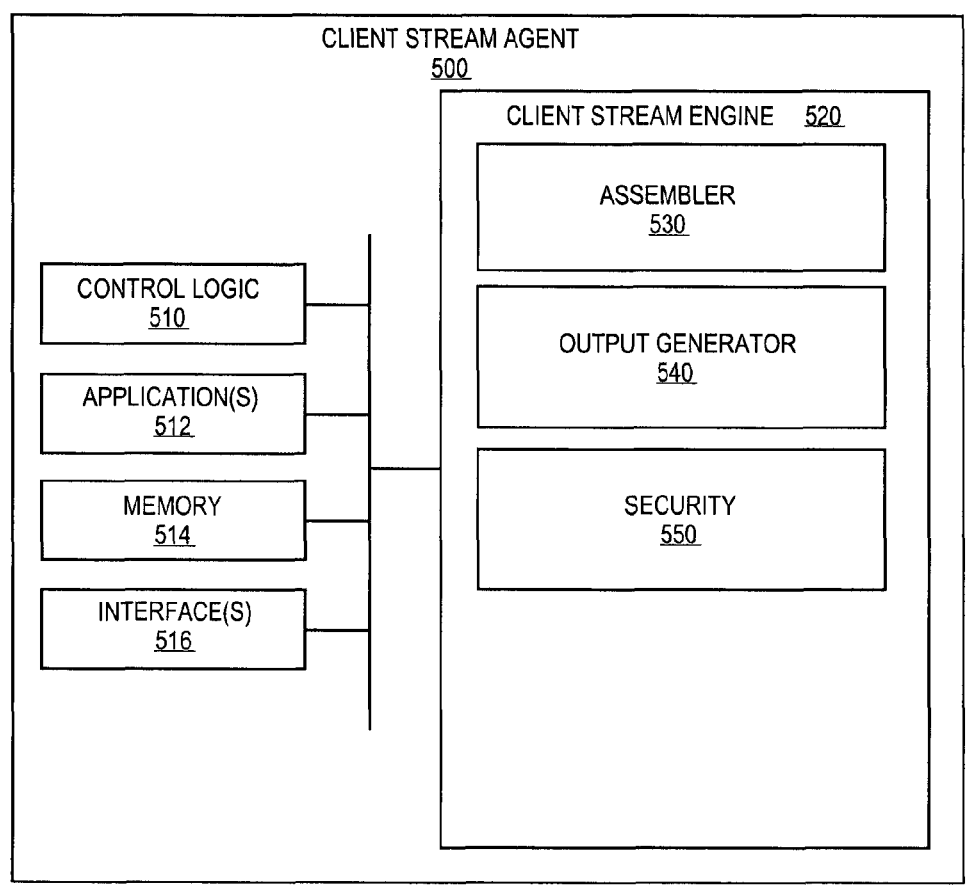
FIG. 5 is a block diagram of one embodiment of a client stream agent.

FIG. 5 is a block diagram of one embodiment of a client stream agent. It will be understood that the elements of a client stream agent can be distributed across several client devices. For example, a first client device can include an assembler 530 and security 550 and can provide a decrypted stream of media files to a second client device that includes an output generator 540 (but does not include an assembler 530 and security 550). In another example, a primary client device can retrieve playlists and provide them to a secondary client device which retrieves media files specified in the playlist and generates an output to present these media files. Client stream agent 500 includes control logic 510, which implements logical functional control to direct operation of client stream agent 500, and hardware associated with directing operation of client stream agent 500. Logic may be hardware logic circuits or software routines or firmware. In one embodiment, client stream agent 500 includes one or more applications 512, which represent code sequence or programs that provide instructions to control logic 510.

Client stream agent 500 includes memory 514, which represents a memory device or access to a memory resource for storing data and/or instructions. Memory 514 may include memory local to client stream agent 500, as well as, or alternatively, including memory of the host system on which client stream agent 500 resides. Client stream agent 500 also includes one or more interfaces 516, which represent access interfaces to/from (an input/output interface) client stream agent 500 with regard to entities (electronic or human) external to client stream agent 500.

Client stream agent 500 also can include client stream engine 520, which represents one or more functions that enable client stream agent 500 to provide the real-time, or near real-time, streaming as described herein. The example of FIG. 5 provides several components that may be included in client stream engine 520; however, different or additional components may also be included. Example components that may be involved in providing the streaming environment include assembler 530, output generator 540 and security 550. Each of these components may further include other components to provide other functions. As used herein, a component refers to routine, a subsystem, etc., whether implemented in hardware, software, firmware or some combination thereof.

Assembler 530 can utilize a playlist file received from a server to access the media files via Web server protocol (e.g., HTTP) from the server. In one embodiment, assembler 530 may cause to be downloaded media files as indicated by URIs in the playlist file. Assembler 530 may respond to tags included in the playlist file.

Output generator 540 may provide the received media files as audio or visual output (or both audio and visual) on the host system. Output generator 540 may, for example, cause audio to be output to one or more speakers and video to be output to a display device. Security 550 may provide security features such as those discussed above.

Figure 6:
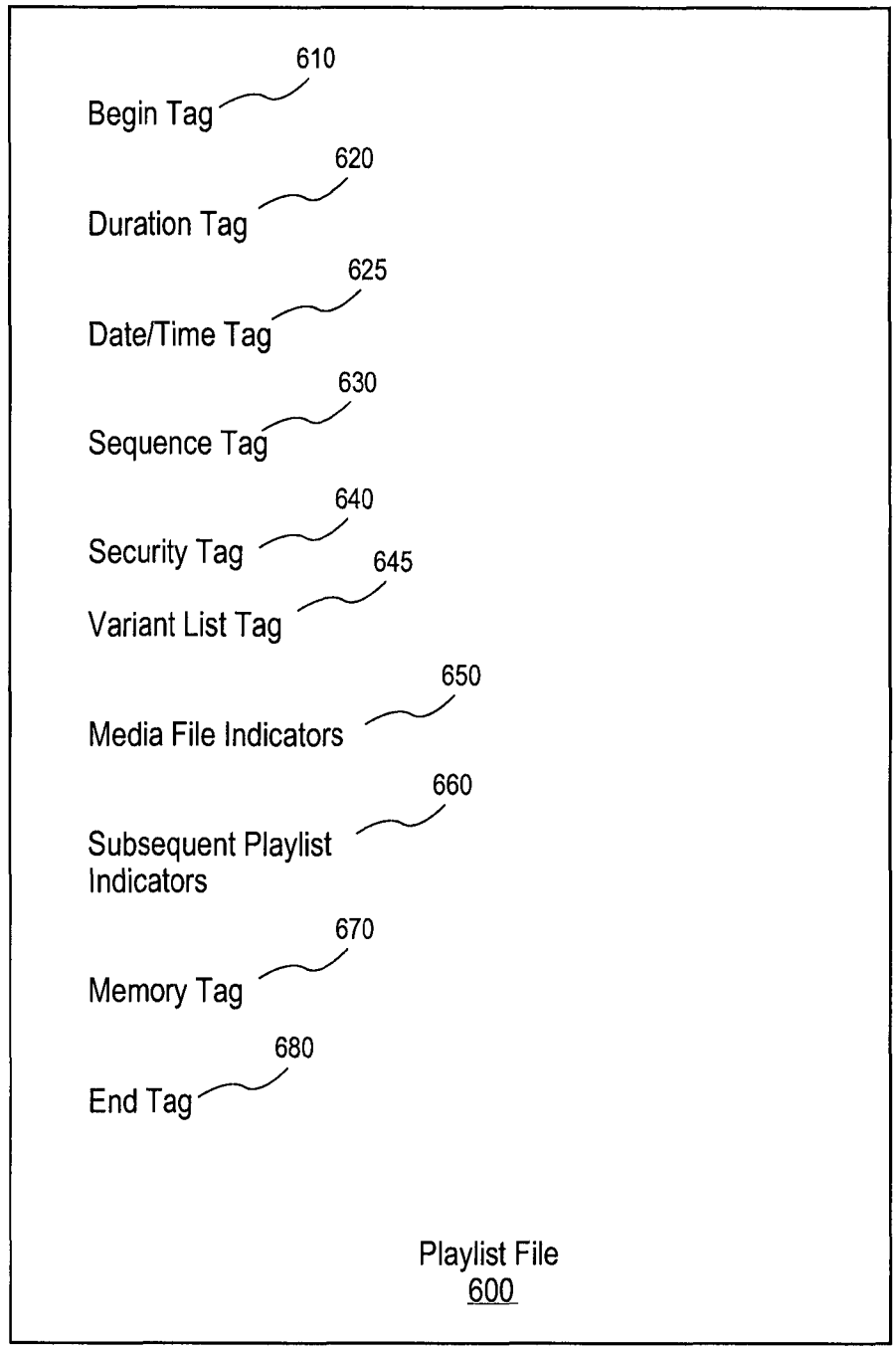
FIG. 6 illustrates on embodiment, of a playlist file with multiple tags.

FIG. 6 illustrates one embodiment of a playlist file with multiple tags. The example playlist of FIG. 6 includes a specific number and ordering of tags. This is provided for description purposes only. Some playlist files may include more, fewer or different combinations of tags and the tags can be arranged in a different order than shown in FIG. 6.

Begin tag 610 can indicate the beginning of a playlist file. In one embodiment, begin tag 610 is a #EXTM3U tag. Duration tag 620 can indicate the duration of the playback list. That is, the duration of the playback of the media files indicated by playback list 600. In one embodiment, duration tag 620 is an EXT-X-TARGETDURATION tag; however, other tags can also be used.

Date/Time tag 625 can provide information related to the date and time of the content provided by the media files indicated by playback list 600. In one embodiment, Date/Time tag 625 is an EXT-X-PROGRAM-DATE-TIME tag; however, other tags can also be used. Sequence tag 630 can indicate the sequence of playlist file 600 in a sequence of playlists. In one embodiment, sequence tag 630 is an EXT-X-MEDIA-SEQUENCE tag; however, other tags can also be used.

Security tag 640 can provide information related to security and/or encryption applied to media files indicated by playlist file 600. For example, the security tag 640 can specify a decryption key to decrypt files specified by the media file indicators. In one embodiment, security tag 640 is an EXT-X-KEY tag; however, other tags can also be used. Variant list tag 645 can indicate whether variant streams are provided by playlist 600 as well as information related to the variant streams (e.g., how many, bit rate). In one embodiment, variant list tag 645 is an EXT-X-STREAM-INF tag.

Media file indicators 650 can provide information related to media files to be played. In one embodiment, media file indicators 650 include URIs to multiple media files to be played. In one embodiment, the order of the URIs in playlist 600 corresponds to the order in which the media files should be accessed and/or played. Subsequent playlist indictors 660 can provide information related to one or more playback files to be used after playback file 600. In one embodiment, subsequent playlist indicators 660 can include URIs to one or more playlist files to be used after the media files of playlist 600 have been played.

Memory tag 670 can indicate whether and/or how long a client device, may store media files after playback of the media file content. In one embodiment, memory tag 670 is an EXT-X-ALLOW-CACHE tag. End tag 680 indicates whether playlist file 600 is the last playlist file for a presentation. In one embodiment, end tag 680 is an EXT-X-ENDLIST tag.

The following section contains several example playlist files according to one embodiment.

---

Simple Playlist file
EXTM3U
EXT-X-TARGETDURATION:10
EXTINF:5220,
http://media.example.com/entire.ts
EXT-X-ENDLIST
Sliding Window Playlist, using HTTPS
EXTM3U
EXT-X-TARGETDURATION:8
EXT-X-MEDIA-SEQUENCE:2680
EXTINF:8,
https://priv.example.com/fileSequence2680.ts
EXTINF:8,
https://priv.example.com/fileSequence2681.ts
EXTINF:8,
https://priv.example.com/fileSequence2682.ts
Playlist file with encrypted media files
EXTM3U
EXT-X-MEDIA-SEQUENCE:7794
EXT-X-TARGETDURATION:15
EXT-X-KEY:METHOD=AES-128,URI="
https://priv.example.com/key.php?r=52"
EXTINF:15,
http://media.example.com/fileSequence7794.ts
EXTINF:15,
http://media.example.com/fileSequence7795.ts
EXTINF:15,
http://media.example.com/fileSequence7796.ts
EXT-X-KEY:METHOD=AES-128,URI="
https://priv.example.com/key.php?r=53"
EXTINF:15,
http://media.example.com/fileSequence7797.ts
Variant Playlist file
EXTM3U
EXT-X-STREAM-INF:PROGRAM-ID=1,BANDWIDTH=1280000
http://example.com/low.m3u8
EXT-X-STREAM-INF:PROGRAM-ID=1,BANDWIDTH=2560000
http://example.com/mid.m3u8
EXT-X-STREAM-INF:PROGRAM-ID=1,BANDWIDTH=7680000
http://example.com/hi.m3u8
EXT-X-STREAM-INF:PROGRAM-ID=1,BANDWIDTH=65000,CODECS="mp4a.40.5"
http://example.com/audio-only.m3u8

---

Figure 7:
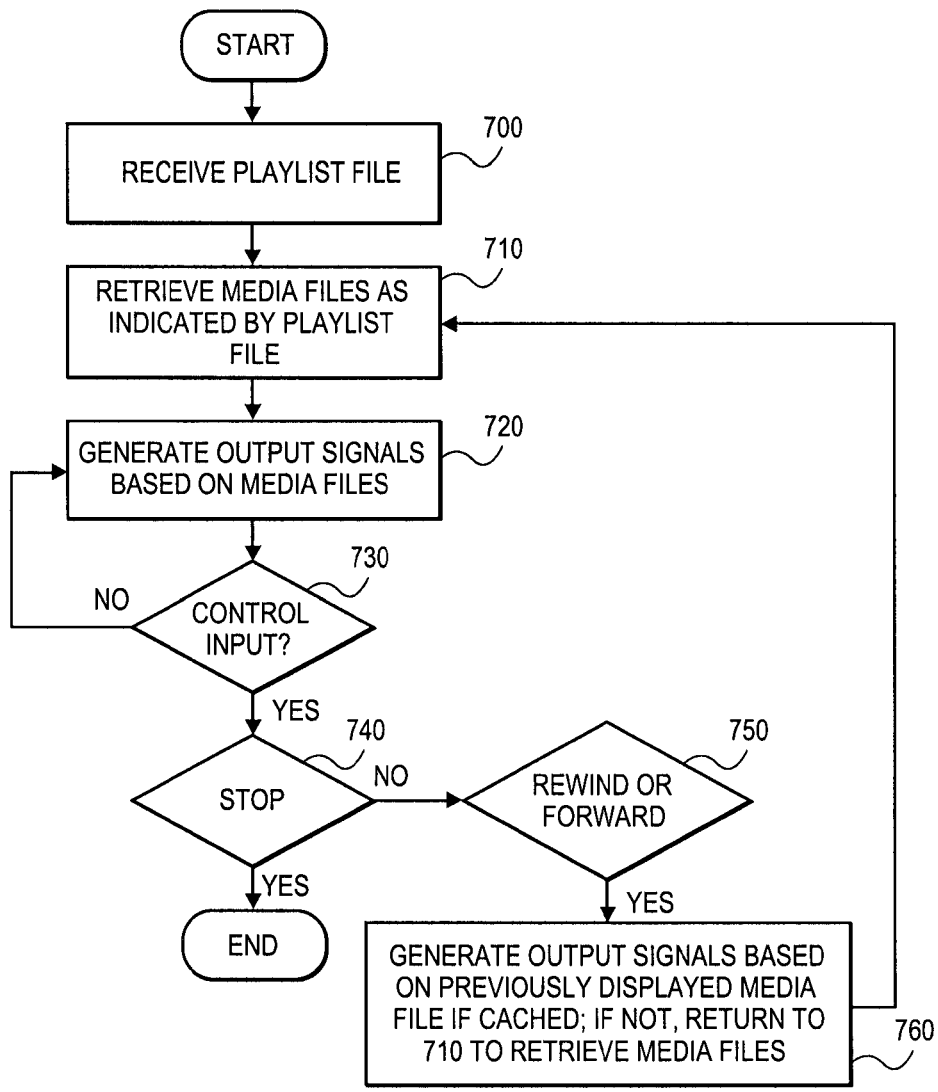
FIG. 7 is a flow diagram of one embodiment of a playback technique for assembled streams as described herein.

FIG. 7 is a flow diagram of one embodiment of a playback technique for assembled streams as described herein. In one embodiment, playback of the received media files can be controlled by the user to start, stop, rewind, etc. The playlist file is received by the client device in operation 700. The media files indicated by the playlist file are retrieved in operation 710. Output is generated based on the received media files in operation 720. Receiving and generating output based on media files can be accomplished as described above.

If control input is detected in operation 730, the client device can determine if the input indicates a stop in operation 740. If the input is a stop, the process concludes and playback stops. If the input indicates a rewind or forward request in operation 750, the client device can generate output based on previously played media files still stored in memory in operation 760. If these files are no longer in a cache, then processing reverts to operation 710 to retrieve the media files and repeats the process. In an alternate embodiment, playback can support a pause feature that halts playback without concluding playback as with a stop input.

Figure 9A:
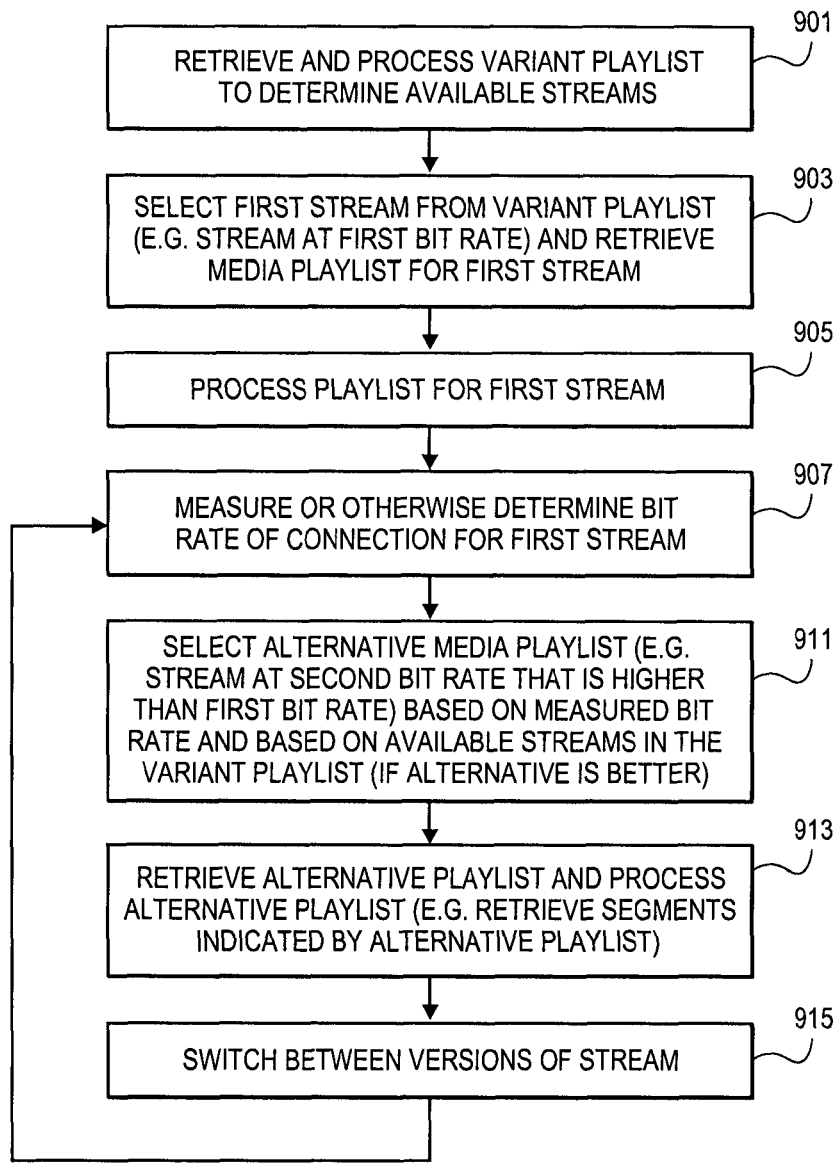
FIG. 9A is a flowchart showing an example of how a client device can switch between alternative content in a variant playlist.

Methods for transitioning from one stream to another stream are further described with reference to FIGS. 9A-9D. One client device can perform each of these methods or the operations of each of these methods can be distributed across multiple client devices as described herein; for example, in the distributed case, one client device can retrieve the variant playlist and the two media playlists and provide those to another client device which retrieves media files specified by the two media playlists and switches between the two streams provided by the retrieved media files. It will also be understood that, in alternative embodiments, the order of the operations shown may be modified or there can be more or fewer operations than shown in these figures. The methods can use a variant playlist to select different streams. A variant playlist can be retrieved and processed in operation 901 to determine available streams for a program (e.g. a sporting event). Operation 901 can be done by a client device. A first stream can be selected from the variant playlist in operation 903, and a client device can then retrieve a media playlist for the first stream. The client device can process the media playlist for the first stream in operation 905 and also measure or otherwise determine a bit rate of the network connection for the first stream in operation 907. It will be appreciated that the sequence of operations may be performed in an order which is different than what is shown in FIG. 9A; for example, operation 907 may be performed during operation 903, etc. In operation 911 the client device selects an alternative media playlist from the variant playlist based on the measured bit rate from operation 907; this alternative media playlist may be at a second bit rate that is higher than the existing bit rate of the first stream. This typically means that alternative stream will have a higher resolution than the first stream. The alternative media playlist can be selected if it is a better match than the current playlist for the first stream based on current conditions (e.g. the bit rate measured in operation 907). In operation 913, the alternative media playlist for an alternate stream is retrieved and processed. This typically means that the client device can be receiving and processing both the first stream and the alternative stream so both are available for presentation; one is presented while the other is ready to be presented. The client device then selects a transition point to switch between the versions of the streams in operation 915 and stops presenting the first stream and begins presenting the alternative stream. Examples of how this switch is accomplished are provided in conjunction with FIGS. 9B-9D. In some embodiments, the client device can stop receiving the first stream before making the switch.

Figure 9B:
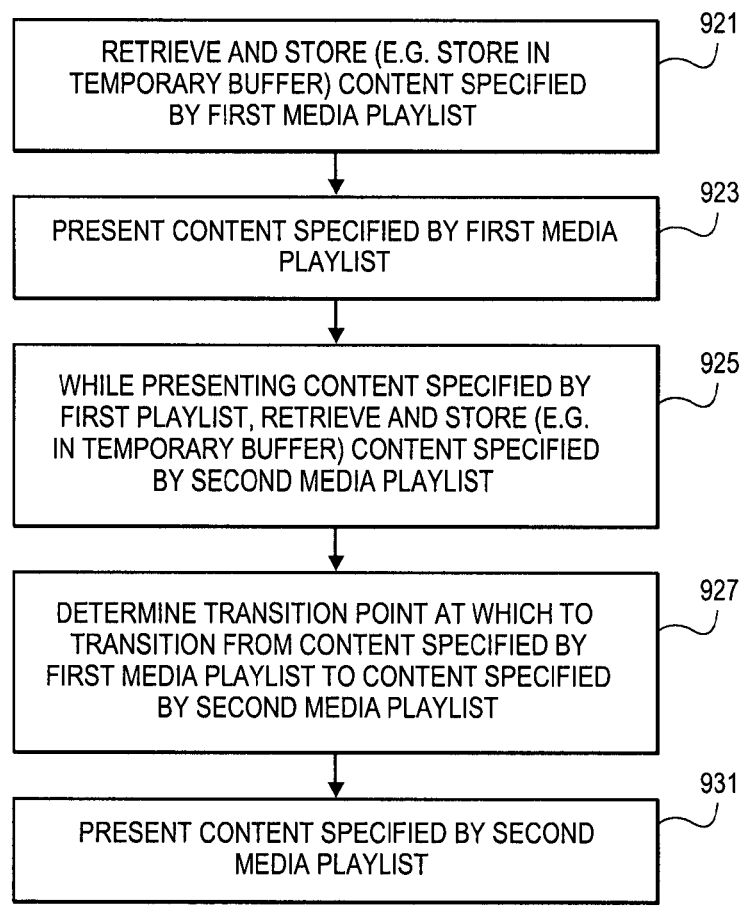
FIG. 9B is a further flowchart showing how a client device can switch between content in two playlists.

FIG. 9B shows that the client device retrieves, stores and presents content specified by the first media playlist (e.g. the first stream) in operations 921 and 923, and while the content specified by the first playlist is being presented the client device in operation 925 also retrieves and stores content specified by the second media playlist (e.g. the second stream). The retrieval and storage (e.g. in a temporary buffer) of the content specified by the second media playlist while presenting the content obtained from the first media playlist creates an overlap 955 in time of the program's content (shown in FIG. 9D) that allows the client device to switch between the versions of the program without a substantial interruption of the program. In this way, the switch between the versions of the program can be achieved in many cases without the user noticing that a switch has occurred (although the user may notice a higher resolution image after the switch in some cases) or without a substantial interruption in the presentation of the program. In operation 927, the client device determines a transition point at which to switch from content specified by the first media playlist to content specified by the second media playlist; an example of a transition point (transition point 959) is shown in FIG. 9D. The content specified by the second media playlist is then presented in operation 931 after the switch.

Figure 9C:
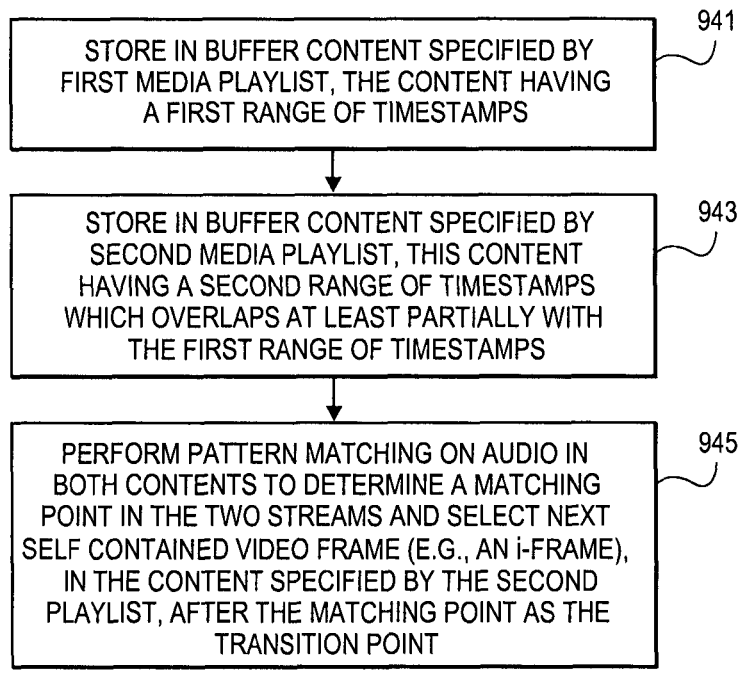
FIG. 9C is a further flowchart showing an example of how a client device can switch between content using audio pattern matching.

The method shown in FIGS. 9C and 9D represents one embodiment for determining the transition point; this embodiment relies upon a pattern matching on audio samples from the two streams 951 and 953 to determine the transition point. It will be appreciated that alternative embodiments can use pattern matching on video samples or can use the timestamps in the two streams, etc. to determine the transition point. The method can include, in operation 941, storing content (e.g. stream 951) specified by the first media playlist in a buffer; the buffer can be used for the presentation of the content and also for the pattern matching operation. The stream 951 includes both audio samples 951A and video samples 951B. The video samples can use a compression technique which relies on i-frames or key frames which have all necessary content to display a single video frame. The content in stream 951 can include timestamps specifying a time (e.g. time elapsed since the beginning of the program), and these timestamps can mark the beginning of each of the samples (e.g. the beginning of each of the audio samples 951A and the beginning of each of the video samples 951B). In some cases, a comparison of the timestamps between the two streams may not be useful in determining a transition point because they may not be precise enough or because of the difference in the boundaries of the samples in the two streams; however, a comparison of the timestamps ranges can be used to verify there is an overlap 955 in time between the two streams. In operation 943, the client device stores in a buffer content specified by the second media playlist; this content is for the same program as the content obtained from the first media playlist and it can include timestamps also. In one embodiment, timestamps, if not present in a stream, can be added to a playlist for a stream; for example, in one embodiment an ID3 tag which includes one or more timestamps can be added to an entry in a playlist, such as a variant playlist or a media playlist. The entry may, for example, be in a URI for a first sample of an audio stream. FIG. 9D shows an example of content 953 obtained from the second media playlist, and this includes audio samples 953A and video samples 9538. In operation 945, the client device can perform a pattern matching on the audio samples in the two streams 951 and 953 to select from the overlap 955 the transition point 959 which can be, in one embodiment, the next self contained video frame (e.g. i-frame 961) after the matched audio segments (e.g. segments 957). Beginning with i-frame 961 (and its associated audio sample), presentation of the program uses the second stream obtained from the second media playlist. The foregoing method can be used in one embodiment for both a change from a slower to a faster bit rate and for a change from a faster to a slower bit rate, but in another embodiment the method can be used only for a change from a slower to a faster bit rate and another method (e.g. do not attempt to locate a transition point but attempt to store and present content from the slower bit rate stream as soon as possible) can be used for a change from a faster to a slower bit.

Figure 10:
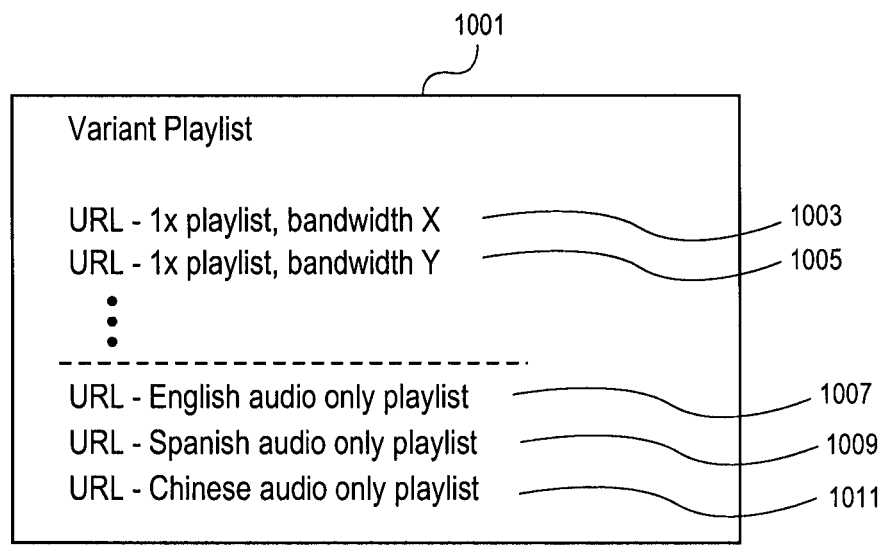
FIG. 10 shows an example of a variant playlist which can include URLs for different audio content for the same program.

An aspect of the invention relating to variant audio playlists and their use in conjunction with an HTTP live streaming system will now be described in conjunction with FIGS. 10 through 15. A variant playlist 1001 is shown in FIG. 10, and it can include a plurality of URLs for a corresponding plurality of different audio content for the same program, such as the same live sports event or video on demand or movie, etc. Moreover, the variant playlist 1001 can also include a plurality of URLs for the video content, where each of these playlists is for the same program but for different bandwidth or quality levels. The URLs for the video content can also include audio content, and if a client device selects an alternative audio content from the variant audio playlist, then that selected alternative content will override the presentation of any audio retrieved or retrievable from the video playlist. The use of a variant playlist or a variant audio playlist allows the content provider to give options for a client device to choose from a variety of different audio content which can override the main presentation. In one embodiment, the client device can play only the audio from a selected audio playlist which was selected from the variant audio playlist and will suppress any audio from other playlists, such as a video playlist which could be used to retrieve audio from a file containing both audio and video which has been multiplexed together in the file of the content. This allows the presentation to offer multiple versions of audio without requiring that the content provider store duplicate video which contains the alternative audio content or requiring that the client download all audio variants when it only needs one. This also allows additional audio to be offered subsequently without remastering the original content.

It can be seen that the variant playlist 1001 in FIG. 10 includes both URLs for video playlists, such as the URLs 1003 and 1005 and also includes three URLs for three different audio versions (1007, 1009 and 1011) for the audio content of the program provided by the video playlists 1003 and 1005. In the example shown in FIG. 10, the variant playlist 1001 includes URLs for the video content as well as URLs for the alternative audio content; it will also be appreciated that in other embodiments, two separate variant playlists can be provided to a client device, one containing the URLs for the video content and another separate variant playlist containing variant audio playlist URLs rather than having a single variant playlist which includes both as shown in FIG. 10. In one embodiment, each audio only playlist is a self contained playlist that meets all of the constraints of section 6.2.4 of the specification in the attached appendix.

In another embodiment, a new tag is defined for a variant playlist that can provide either alternative audio (such as different languages for the same program) or alternative video (such as different camera angles or positions for the same program) or a combination of both alternative audio and alternative video. In this embodiment, the new tag can have the following syntax:

```
#EXT-X-MEDIA:TYPE=<type>, GROUP-ID=<group-id>,
NAME=<name>[, LANGUAGE=<language-tag>],
[,AUTOSELECT=<yes or no>] [, DEFAULT=<yes or no>], URI=<url>
``` where type is AUDIO or VIDEO, GROUP-ID is a string that defines the "group", and where name is a descriptive string, language-tag is an rfc 4646 language tag, AUTOSELECT indicates to the client if the stream is to be autoselected, DEFAULT is used to choose the initial entry in a group (e.g., the initial entry in an alternative audio group or the initial entry in an alternative video group), and URI is the URI of the playlist, such as an alternative audio playlist or an alternative video playlist. An example of a variant playlist using this type of new tag is:

```
#EXTM3U
#EXT-X-MEDIA:TYPE=AUDIO, GROUP-ID="aac",
LANGUAGE="eng", NAME="English",  AUTOSELECT=YES,
DEFAULT=YES, URI="OCEANS11_20min_English_Stereo/
prog_index.m3u8"
#EXT-X-MEDIA:TYPE=AUDIO, GROUP-ID="aac",
LANGUAGE="eng", NAME="Commentary1", AUTOSELECT=NO,
DEFAULT=NO, URI="OCEANS11_20min_Commentary1_Stereo/
prog_index.m3u8"
#EXT-X-MEDIA:TYPE=AUDIO, GROUP-ID="aac",
LANGUAGE="eng", NAME="Commentary2", AUTOSELECT=NO,
DEFAULT=NO, URI="OCEANS11_20min_Commentary2_Stereo/
prog_index.m3u8"
#EXT-X-MEDIA:TYPE=AUDIO, GROUP-ID="aac",
LANGUAGE="fre", NAME="French",  AUTOSELECT=YES,
DEFAULT=NO, URI="OCEANS11_20min_French_Stereo/
prog_index.m3u8"
#EXT-X-STREAM-INF:PROGRAM-
ID=1,BANDWIDTH=1233110,CODECS="mp4a.40.2,
avc1.4d401e",AUDIO="aac"
OCEANS11_20min_Audio_Video_500Kbs/prog_index.m3u8
#EXT-X-STREAM-INF:PROGRAM-
ID=1,BANDWIDTH=2027440,CODECS="mp4a.40.2,
avc1.4d4014",AUDIO="aac"
OCEANS11_20min_Audio_Video_1Mbs/prog_index.m3u8
#EXT-X-STREAM-INF:PROGRAM-
ID=1,BANDWIDTH=5334235,CODECS="mp4a.40.2,
avc1.4d401e",AUDIO="aac"
OCEANS11_20min_Audio_Video_3Mbs/prog_index.m3u8
#EXT-X-STREAM-INF:PROGRAM-
ID=1,BANDWIDTH=9451601,CODECS="mp4a.40.2,
avc1.4d401e",AUDIO="aac"
OCEANS11_20min_Audio_Video_6Mbs/prog_index.m3u8
#EXT-X-STREAM-INF:PROGRAM-
ID=1,BANDWIDTH=16090967,CODECS="mp4a.40.2,
avc1.64001e",AUDIO="aac"
OCEANS11_20min_Audio_Video_12Mbs/prog_index.m3u8
```

The new attributes of EXT-X-STREAMINF are the <type> values of either AUDIO=<group-id> or VIDEO=<group-id>; it will be appreciated that other media types could be specified (such as subtitles). In this embodiment, the type and name values form a tuple. If desired, there could be multiple groups to allow changes in codecs or bit rates, and in this embodiment, the group-id is changed to provide the multiple groups; an example of a variant playlist with different group-IDs (to allow for multiple groups) is:

```
#EXT-X-MEDIA:TYPE=AUDIO, GROUP-ID="aac",
LANGUAGE="eng", NAME="English",  AUTOSELECT=YES,
DEFAULT=YES, URI="OCEANS11_20min_English_Stereo/
prog_index.m3u8"
#EXT-X-MEDIA:TYPE=AUDIO, GROUP-ID="aac",
LANGUAGE="eng", NAME="Commentary1", AUTOSELECT=NO,
DEFAULT=NO, URI="OCEANS11_20min_Commentary1_Stereo/
prog_index.m3u8"
#EXT-X-MEDIA:TYPE=AUDIO, GROUP-ID="aac",
LANGUAGE="eng", NAME="Commentary2", AUTOSELECT=NO,
DEFAULT=NO, URI="OCEANS11_20min_Commentary2_Stereo/
prog_index.m3u8"
#EXT-X-MEDIA:TYPE=AUDIO, GROUP-ID="aac",
LANGUAGE="fre", NAME="French",  AUTOSELECT=YES,
DEFAULT=NO, URI="OCEANS11_20min_French_Stereo/
prog_index.m3u8"
#EXT-X-MEDIA:TYPE=AUDIO, GROUP-ID="AC3",
LANGUAGE="eng", NAME="English",  AUTOSELECT=YES,
DEFAULT=YES, URI="OCEANS11_20min_English_AC3/
prog_index.m3u8"
#EXT-X-MEDIA:TYPE=AUDIO, GROUP-ID="AC3",
LANGUAGE="eng", NAME="Commentary1", AUTOSELECT=NO,
DEFAULT=NO, URI="OCEANS11_20min_Commentary1_AC3/
prog_index.m3u8"
#EXT-X-MEDIA:TYPE=AUDIO, GROUP-ID="AC3",
LANGUAGE="eng", NAME="Commentary2", AUTOSELECT=NO,
DEFAULT=NO, URI="OCEANS11_20min_Commentary2_AC3/
prog_index.m3u8"
#EXT-X-MEDIA:TYPE=AUDIO, GROUP-ID="AC3",
LANGUAGE="fre", NAME="French",  AUTOSELECT=YES,
DEFAULT=NO, URI="OCEANS11_20min_French_AC3/
prog_index.m3u8"
```

Here is an example of a variant video playlist (with different camera angles for the same program which is a Rolling Stones video):

```
#EXT-X-MEDIA:TYPE=VIDEO, GROUP-ID="4Mbs",
NAME="Angle1-Mick", AUTOSELECT=YES, DEFAULT=NO,
URI="Mick-4Mbs/prog_index.m3u8"
#EXT-X-MEDIA:TYPE=VIDEO, GROUP-ID="4Mbs",
NAME="Angle2-Keith", AUTOSELECT=YES, DEFAULT=NO,
URI="Keith-4Mbs/prog_index.m3u8"
#EXT-X-MEDIA:TYPE=VIDEO, GROUP-ID="4Mbs",
NAME="Angle3-Ronnie", AUTOSELECT=YES, DEFAULT=NO,
URI="Ronnie-4Mbs/prog_index.m3u8"
#EXT-X-MEDIA:TYPE=VIDEO, GROUP-ID="4Mbs",
NAME="Angle4-Charlie", AUTOSELECT=YES, DEFAULT=NO,
URI="Charlie-4Mbs/prog_index.m3u8"
#EXT-X-MEDIA:TYPE=VIDEO, GROUP-ID="4Mbs",
NAME="Angle5-All", AUTOSELECT=YES, DEFAULT=YES
#EXT-X-MEDIA:TYPE=AUDIO, GROUP-ID="aac",
LANGUAGE="eng", NAME="English AAC", AUTOSELECT=YES,
DEFAULT=YES, URI="Stones_Angie_Audio_AAC_140kbs/
prog_index.m3u8"
#EXT-X-MEDIA:TYPE=AUDIO, GROUP-ID="AC3",
LANGUAGE="eng", NAME="English AC3", AUTOSELECT=YES,
DEFAULT=YES, URI="Stones_Angie_Audio_AC3_640kbs/
prog_index.m3u8"
#EXT-X-STREAM-INF:PROGRAM-
ID=1,BANDWIDTH=4742970,CODECS="mp4a.40.2,
avc1.4d401e",VIDEO="4Mbs",AUDIO="aac"
All-4Mbs/prog_index.m3u8
#EXT-X-STREAM-INF:PROGRAM-
ID=1,BANDWIDTH=5215970,CODECS="ac-3,
avc1.4d401e",VIDEO="4Mbs",AUDIO="AC3"
All-4Mbs/prog_index.m3u8
```

While this variant video playlist has only one bit rate, more variants with more bit rates could be added to this playlist.

Figure 11:
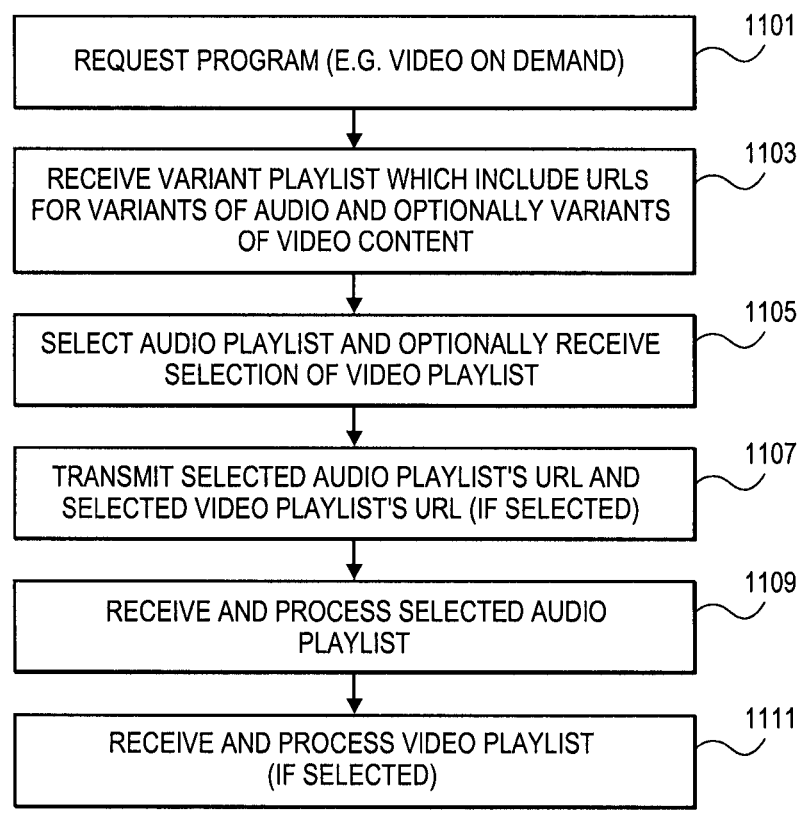
FIG. 11 is a flowchart which shows a method in one embodiment for using a variant playlist that includes URLs for variants of audio content for the same program.
Figure 12:
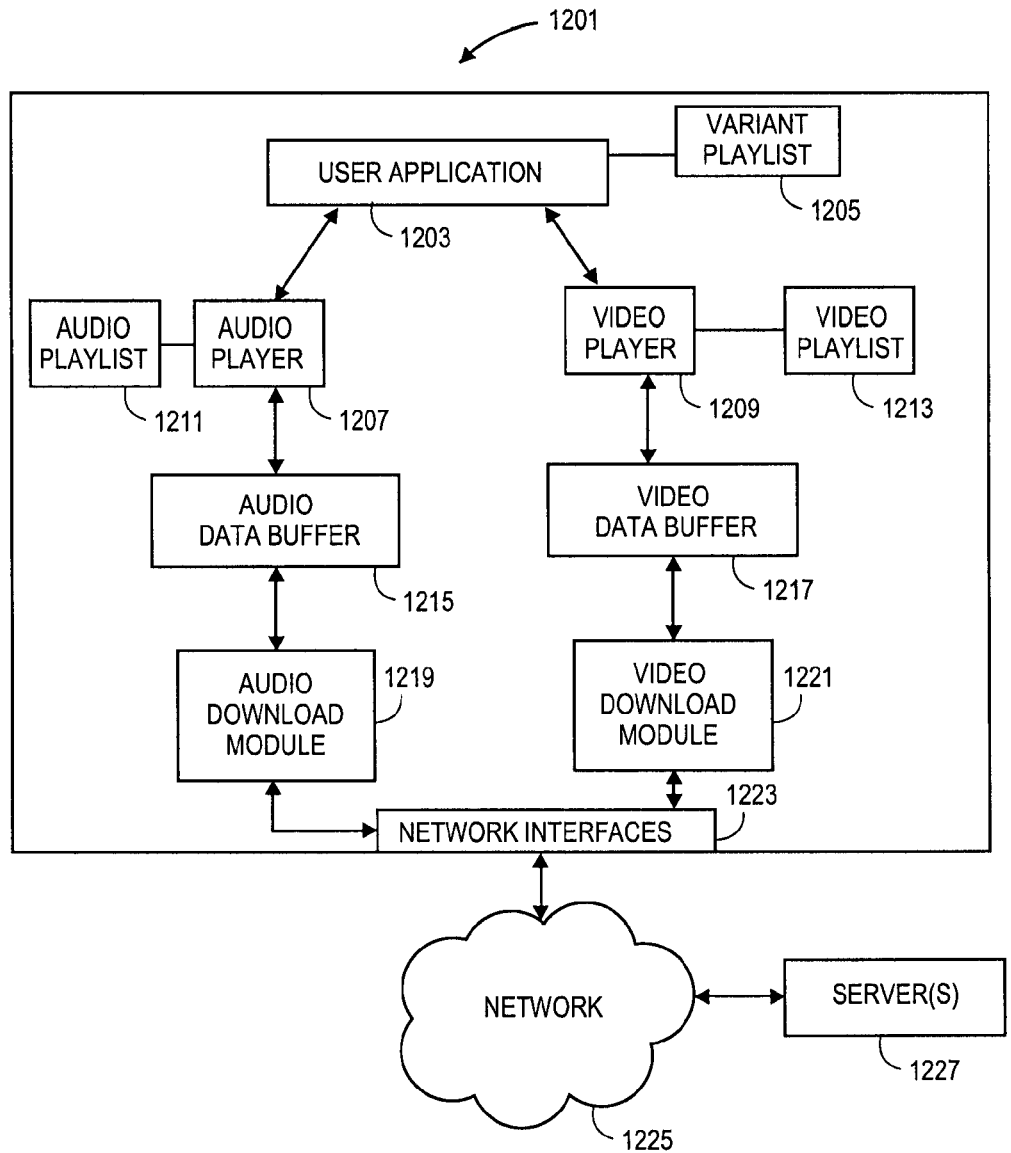
FIG. 12 shows an example of a client device having various components which can be used in one or more of the embodiments described herein.

FIG. 11 shows an example of a method which can be performed by client device which processes a variant audio playlist, such as the variant playlist 1001 in FIG. 10 or the variant playlists described above. In one embodiment, the client device which performs the method of FIG. 11 can be a hardware device such as that shown in FIG. 8 and can include a software architecture such as that shown in FIG. 12. In operation 1101, the client device can request a program, such as a video on demand program or a live sports event, or a recorded sports event or a movie, or other content having audio content. The request of a particular program can come through a user application, such as user application 1203 which, in one embodiment, could be an app from Netflix or an app from Major League Baseball or other apps designed to allow a user to browse through a catalogue of content and select one of the programs from the catalogue of content. In response to the request in operation 1101, the client device can receive in operation 1103 a variant playlist which includes one or more URLs for variants of audio content and optionally also includes one or more URLs for variants of video content. A variant playlist received in operation 1103 can be the variant playlist 1205 (stored in memory in device 1201) which can be processed by the user application 1203 in order to present a user interface to the user to allow the user to select a particular audio program from the variants of audio programs that are available. In another embodiment, a user preference set by a user can set a default language, such as English as a default or Chinese as a default or Spanish as a default, etc. and that selection can be used automatically when the user application processes the variant playlist to select the particular audio playlist. Then in operation 1105, the client system can select a particular audio playlist from the variant audio playlist and optionally also select a particular video playlist (from that same playlist or another variant playlist); these selections may occur through user interaction with a user interface of the client device or through the operation of the client device without user input through default settings or user preferences previously set by the user, etc. Then in operation 1107, the client device can transmit the selected audio playlist's URL and the selected video playlist's URL if one was selected in operation 1105. In response to these transmitted URLs, the client device in operation 1109 receives and processes the selected audio playlist; the processing of the audio playlist can be performed in a manner which is similar to processing of other audio playlists under the existing HTTP live streaming protocol. If a selected video playlist's URL was also selected in operation 1107 then, the client device will, in operation 1111 receive and process the selected video playlist. In one embodiment, the processing of the audio playlist is separate and distinct from the processing of the video playlist, but they are performed concurrently. In one embodiment, a software download module for the audio playlist can be separate from a video download module for the video playlist as shown in the architecture of FIG. 12. In one embodiment, the video playlist will refer to a media file which also includes audio, and that audio may be the default or main presentation audio for the program, in which case the client device will suppress playback of that default audio. The suppression of the playback of that default audio referred to by the video playlist can be performed by not downloading the audio if it is a separate portion of the file or by not processing the downloaded audio if the downloading of the audio cannot be avoided in one embodiment.

FIG. 12 shows an example of an architecture for a client device which can implement the method shown in FIG. 11 or other methods described in conjunction with variant audio playlists. The components shown in client device 1201 can be software components (running on a data processing system such as the system shown in FIG. 8) or hardware components or a combination of software and hardware components. In one embodiment, the user application 1203 is a software application run by the user to display a movie or a baseball game or to listen to a radio show, etc. For example, in one embodiment, the user application can be an app provided by Netflix to view movies or an app provided by major league baseball to view live baseball games or recorded baseball games. The user application 1203 can process the variant playlist 1205 to present the user with a user interface to allow the user to select from the various different audio content specified by the variant audio playlist; alternatively, the user application 1203 can automatically without user interaction select a particular audio content based upon a previously established user preference by searching through the variant audio playlist, such as variant playlist 1205, to select and define the appropriate audio content. User application 1203 can interact with audio player 1207 and video player 1209 in order to receive and present the content from each of these players. Audio player 1207 can process audio playlist 1211 independently from the processing of video player 1209 which processes the video playlist 1213. Video playlist 1213 can be a conventional video playlist as described herein while the audio playlist 1211 is a playlist providing audio only content. If the video playlist 1213 includes URLs that contain audio data, then the video player 1209 should suppress the audio from the video playlist by either not downloading the audio data or by discarding the audio data which is downloaded. Audio player 1207 and video player 1209 each have their own data buffers in one embodiment and each have their own download modules in one embodiment. In particular, audio player 1207 is coupled to audio data buffer 1215 which in turn is coupled to audio download module 1219. The audio download module 1219 can be a software module which, through an API, causes the downloading of audio data through one or more network interfaces 1223 (e.g. a cellular telephone modem or a WiFi radio, etc.) in the client device. The one or more network interfaces 1223 are in turn coupled to one or more networks 1225, such as the Internet which is also coupled to one or more servers 1227 which store and provide the playlists and content. The audio data downloaded through the network 1225 is stored in the audio data buffer 1215 and then provided as output through a speaker or other transducer to the user. Video download module 1221 causes the download of video data from one or more servers 1227 through the network or networks 1225 and through the network interface 1223. The downloaded video data can be stored in the video data buffer 1217 where it can be decoded and processed for display on a display device by the video player or other components of the client device. The audio player 1207 and the video player 1209 can operate concurrently and independently such that the audio content can be switched between different audio content for the same program by switching between different URLs in the variant audio playlist; this switching can be performed independently of playback of the video playlist in one embodiment. Audio player 1207 and video player 1209 can process each of their respective playlists and synchronize playback by the use of timestamps either in the content itself or in the playlists. In one embodiment, the timestamps referred to in the audio content or in the playlists for the audio content can occupy the same period of time as timestamps in the video content or video playlists such the playback of audio and video is synchronized. It will be appreciative that the audio player 1207 and the video player 1209 keep track of movie time or real time or both in one embodiment to allow for the synchronization of audio and video during playback of both.

Figure 13:
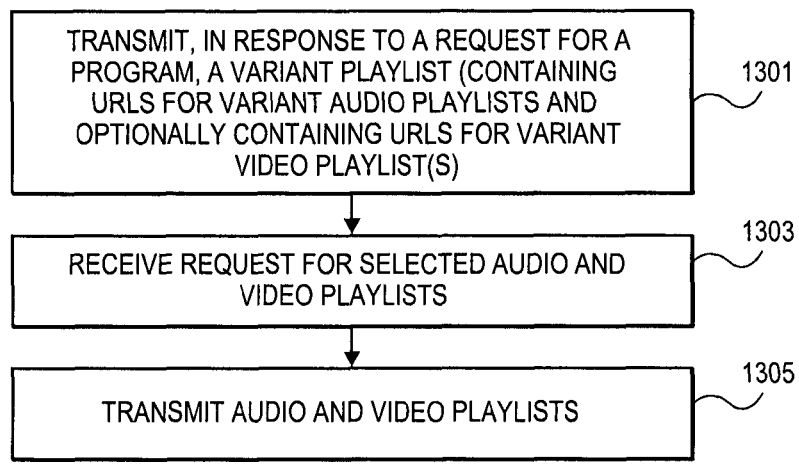
FIG. 13 is a flowchart which shows a method according to one embodiment performed by a server device or a set of server devices.

A method for operating a server according to one embodiment of the present invention will now be described in conjunction with FIG. 13. It will be appreciated that one or more servers may perform each of the operations shown in FIG. 13; for example, one server can perform all the operations in FIG. 13 or one server can perform one operation while another server performs other operations. For example, one server could provide the variant playlists while another server could provide and transmit the audio or video playlists that are used during playback after a particular playlist was selected from the variant playlist. In operation 1301, a server can transmit, in response to a request for a program, a variant playlist which can contain URLs for different audio playlists and optionally also contain URLs for one or more video playlists. In operation 1303, the same server device or another server device receives a request for a selected audio and video playlist and transmits, in operation 1305, the audio and/or video playlists. Further, the same server or a different server(s) can respond to requests from those playlists transmitted in operation 1305 to provide actual content.

Figure 8:
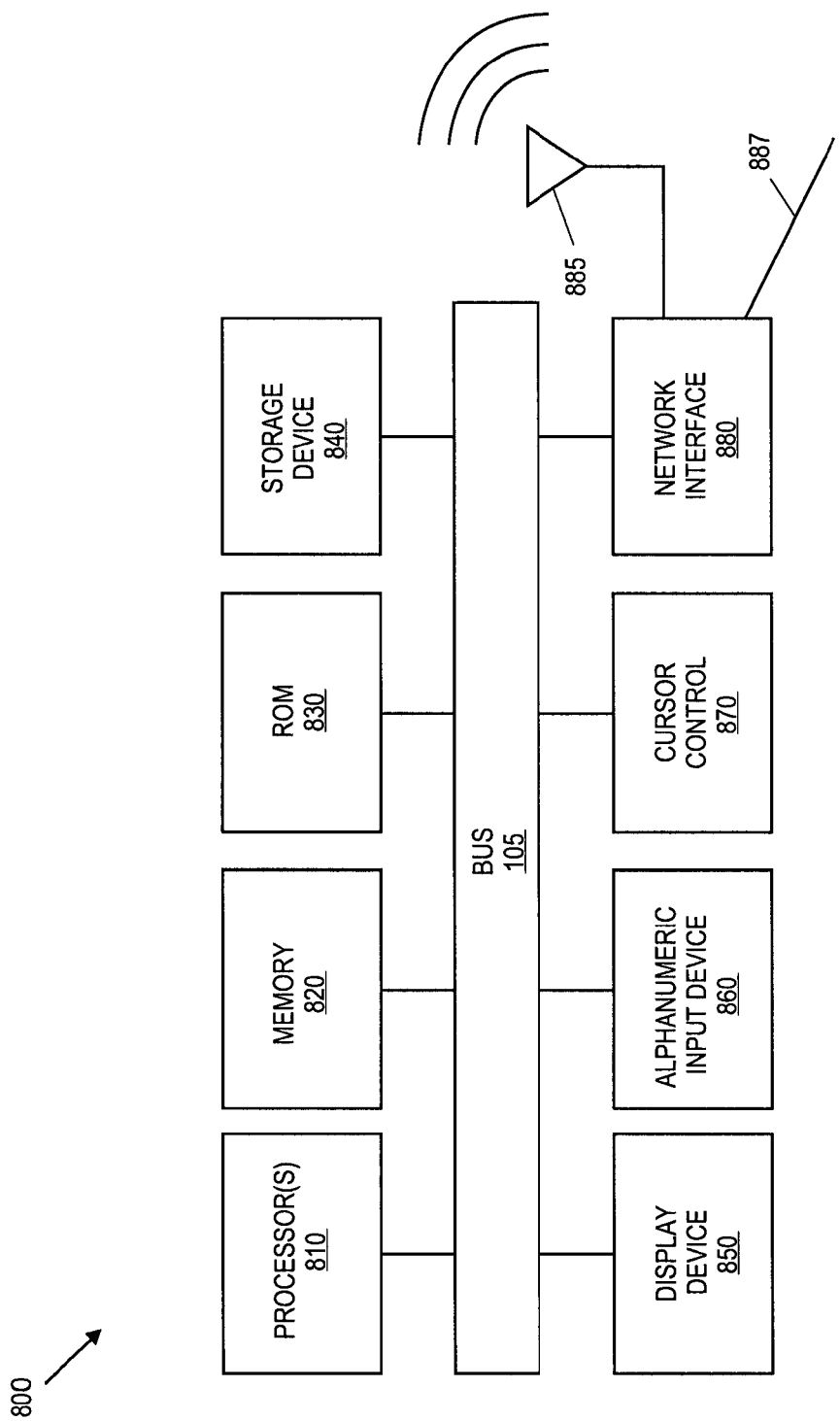
FIG. 8 is a block diagram of one embodiment of an electronic system.

FIG. 8 is a block diagram of one embodiment of an electronic system. The electronic system illustrated in FIG. 8 is intended to represent a range of electronic systems (either wired or wireless) including, for example, desktop computer systems, laptop computer systems, cellular telephones, personal digital assistants (PDAs) including cellular-enabled PDAs, set top boxes, entertainment systems or other consumer electronic devices. Alternative electronic systems may include more, fewer and/or different components. The electronic system of FIG. 8 may be used to provide the client device and/or the server device.

Electronic system 800 includes bus 805 or other communication device to communicate information, and processor 810 coupled to bus 805 that may process information. While electronic system 800 is illustrated with a single processor, electronic system 800 may include multiple processors and/or co-processors. Electronic system 800 further may include random access memory (RAM) or other dynamic storage device 820 (referred to as main memory), coupled to bus 805 and may store information and instructions that may be executed by processor 810. Main memory 820 may also be used to store temporary variables or other intermediate information during execution of instructions by processor 810.

Electronic system 800 may also include read only memory (ROM) and/or other static storage device 830 coupled to bus 805 that may store static information and instructions for processor 810. Data storage device 840 may be coupled to bus 805 to store information and instructions. Data storage device 840 such as flash memory or a magnetic disk or optical disc and corresponding drive may be coupled to electronic system 800.

Electronic system 800 may also be coupled via bus 805 to display device 850, such as a cathode ray tube (CRT) or liquid crystal display (LCD), to display information to a user. Electronic system 800 can also include an alphanumeric input device 860, including alphanumeric and other keys, which may be coupled to bus 805 to communicate information and command selections to processor 810. Another type of user input device is cursor control 870, such as a touchpad, a mouse, a trackball, or cursor direction keys to communicate direction information and command selections to processor 810 and to control cursor movement on display 850.

Electronic system 800 further may include one or more network interface(s) 880 to provide access to a network, such as a local area network. Network interface(s) 880 may include, for example, a wireless network interface having antenna 885, which may represent one or more antenna(e). Electronic system 800 can include multiple wireless network interfaces such as a combination of WiFi, Bluetooth and cellular telephony interfaces. Network interface(s) 880 may also include, for example, a wired network interface to communicate with remote devices via network cable 887, which may be, for example, an Ethernet cable, a coaxial cable, a fiber optic cable, a serial cable, or a parallel cable.

In one embodiment, network interface(s) 880 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported.

In addition to, or instead of, communication via wireless LAN standards, network interface(s) 880 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

One or more Application Programming Interfaces (APIs) may be used in some embodiments. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embodiment, call APIs from different providers such as a set of APIs from an OS provider and another set of APIs from a plug-in provider and another set of APIs from another provider (e.g. the provider of a software library) or creator of the another set of APIs.

Figure 14:
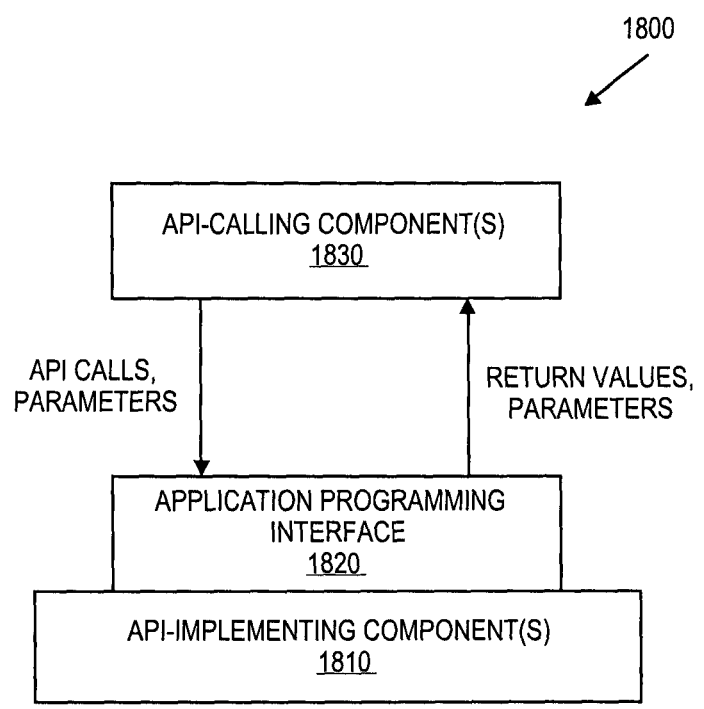
FIG. 14 illustrates a block diagram of an exemplary API architecture which is usable in some embodiments of the invention.

FIG. 14 is a block diagram illustrating an exemplary API architecture, which may be used in some embodiments of the invention. As shown in FIG. 14, the API architecture 1800 includes the API-implementing component 1810 (e.g., an operating system, a library, a device driver, an API, an application program, software or other module) that implements the API 1820. The API 1820 specifies one or more functions, methods, classes, objects, protocols, data structures, formats and/or other features of the API-implementing component that may be used by the API-calling component 1830. The API 1820 can specify at least one calling convention that specifies how a function in the API-implementing component receives parameters from the API-calling component and how the function returns a result to the API-calling component. The API-calling component 1830 (e.g., an operating system, a library, a device driver, an API, an application program, software or other module), makes API calls through the API 1820 to access and use the features of the API-implementing component 1810 that are specified by the API 1820. The API-implementing component 1810 may return a value through the API 1820 to the API-calling component 1830 in response to an API call.

It will be appreciated that the API-implementing component 1810 may include additional functions, methods, classes, data structures, and/or other features that are not specified through the API 1820 and are not available to the API-calling component 1830. It should be understood that the API-calling component 1830 may be on the same system as the API-implementing component 1810 or may be located remotely and accesses the API-implementing component 1810 using the API 1820 over a network. While FIG. 14 illustrates a single API-calling component 1830 interacting with the API 1820, it should be understood that other API-calling components, which may be written in different languages (or the same language) than the API-calling component 1830, may use the API 1820.

The API-implementing component 1810, the API 1820, and the API-calling component 1830 may be stored in a machine-readable non-transitory storage medium, which includes any mechanism for storing information in a form readable by a machine (e.g., a computer or other data processing system). For example, a machine-readable medium includes magnetic disks, optical disks, random access memory; read only memory, flash memory devices, etc.

Figure 15:
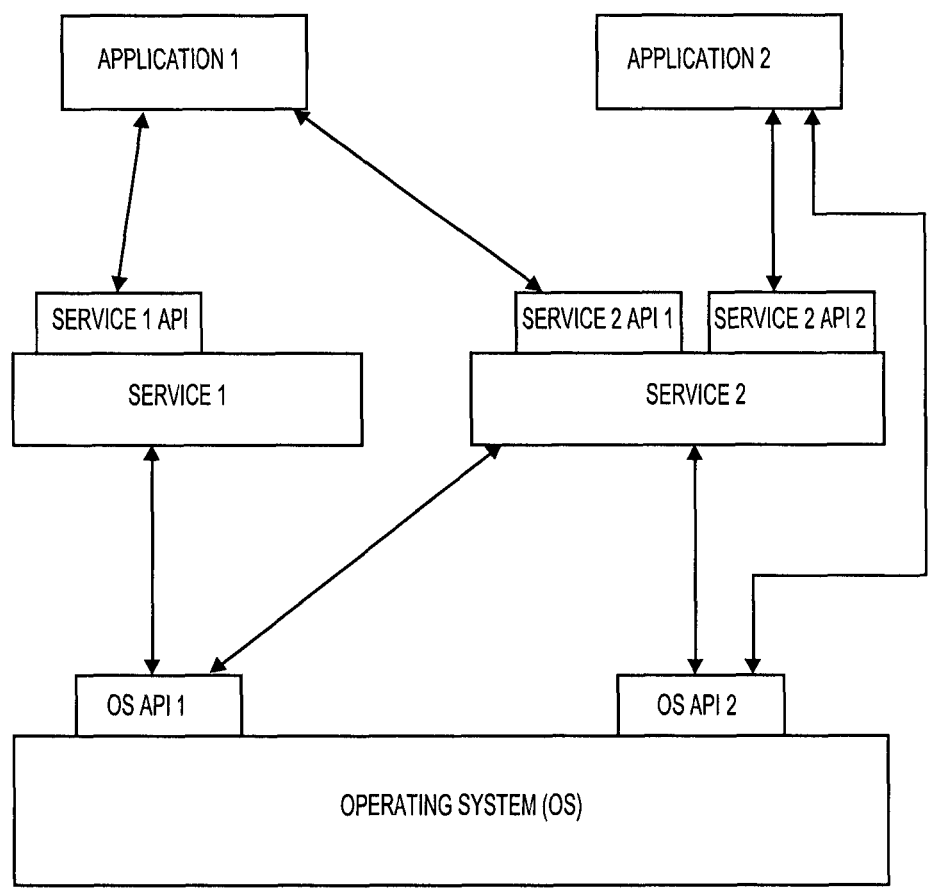
FIG. 15 shows an exemplary embodiment of a software stack usable in some embodiments of the invention.

In FIG. 15 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

APPENDIX

The following Appendix is a draft specification of a protocol according to a particular embodiment of the invention. It will be understood that the use of certain key words (e.g. MUST, MUST NOT. SHALL. SHALL NOT, etc.) in this Appendix apply to this particular embodiment and do not apply to other embodiments described in this disclosure.

HTTP Live Streaming draft-pantos-http-live-streaming-06

Abstract

This document describes a protocol for transferring unbounded streams of multimedia data. It specifices the data formal of the files and the actions to be taken by the server (sender) and the clients (receivers) of the streams. It describes version 3 of this protocol.

Table of Contents
1. Introduction
2. Summary
3. The Playlist file
   3.1. Introduction
   3.2. Attribute Lists
   3.3. New Tags
      3.3.1. EXT-X-TARGETDURATION
      3.3.2. EXT-X-MEDIA-SEQUENCE
      3.3.3. EXT-X-KEY
      3.3.4. EXT-X-PROGRAM-DATE-TIME
      3.3.5. EXT-X-ALLOW-CACHE
      3.3.6. EXT-X-PLAYLIST-TYPE
      3.3.7. EXT-X-ENDLIST
      3.3.8. EXT-X-STREAM-INF
      3.3.9. EXT-X-DISCONTINUITY
      3.3.10. EXT-X-VERSION
4. Media files
5. Key files
   5.1. Introduction
   5.2. IV for AES-128
6. Client/Server Actions
   6.1. Introduction
   6.2. Server Process
      6.2.1. Introduction
      6.2.2. Sliding Window Playlists
      6.2.3. Encrypting media files
      6.2.4. Providing variant streams
   6.3. Client Process
      6.3.1. Introduction
      6.3.2. Loading the Playlist file
      6.3.3. Playing the Playlist file
      6.3.4. Reloading the Playlist file
      6.3.5. Determining the next file to load
      6.3.6. Decrypting encrypted media files
7. Protocol version compatibility
8. Examples
   8.1. Introduction
   8.2. Simple Playlist file
   8.3. Sliding Window Playlist, using HTTPS
   8.4. Playlist file with encrypted media files
   8.5. Variant Playlist file
9. Security Considerations
10. References
   10.1. Normative References
   10.2. Informative References

1. INTRODUCTION

This document describes a protocol for transferring unbounded streams of multimedia data. The protocol supports the encryption of media data and the provision of alternate versions (e.g. citrates) of a stream. Media data can be transferred soon after it is created, allowing it to be played in near real-time. Data is usually carried over HTTP [RFC2616].

External references that describe related standards such as HTTP are listed in Section 11.

2. SUMMARY

A multimedia presentation is specified by a URI [RFC3986] to a Playlist file, which is an ordered list of media URIs and informational tags. Each media URI refers to a media file which is a segment of a single contiguous stream.

To play the stream, the client first obtains the Playlist file and then obtains and plays each media file in the Playlist. It reloads the Playlist file as described in this document to discover additional segments.

The key words "MUST", "MUST NOT", "REQUIRED", "SHALL", "SHALL NOT", "SHOULD", "SHOULD NOT", "RECOMMENDED", "MAY", and "OPTIONAL" in this document are to be interpreted as described in RFC 2119 [RFC2119].

3. THE PLAYLIST FILE

3.1. Introduction

Playlists MUST be Extended M3U Playlist files [M3U]. This document extends the M3U file format by defining additional tags.

An M3U Playlist is a text file that consists of individual lines. Lines are terminated by either a single LF character or a CR character followed by an LF character. Each line is a URI, a blank, or starts with the comment character '#'. Blank lines are ignored. White space MUST NOT be present, except for elements in which it is explicitly specified.

A URI line identifies a media file or a variant Playlist file (see Section 3.3.8).

URIs MAY be relative. A relative URI MUST be resolved against the URI of the Playlist file that contains it.

Lines that start with the comment character '#' are either comments or tags. Tags begin with #EXT. All other lines that begin with '#' are comments and SHOULD be ignored.

The duration of a Playlist file is the sum of the durations of the media files within it.

M3U Playlist files whose names end in .m3u8 and/or have the HTTP Content-Type "application/vnd.apple.mpegurl" are encoded in UTF-8 [RFC3629]. Files whose names end with .m3u and/or have the HTTP Content-Type [RFC2616] "audio/mpegurl" are encoded in US-ASCII [US_ASCII].

Playlist files MUST have names that end in .m3u8 and/or have the Content-Type "application/vnd.apple.mpegurl" (if transferred over HTTP), or have names that end in .m3u and/or have the HTTP Content-Type type "audio/mpegurl" (for compatibility).

The Extended M3U file format defines two lags: EXTM3U and EXTINF. An Extended M3U file is distinguished from a basic M3U file by its first line, which MUST be #EXTM3U.

EXTINF is a record marker that describes the media file identified by the URI that follows it. Each media file URI MUST be preceded by an EXTINF tag. Its format is:
EXTINF:<duration>,<title>
"duration" is an integer or floating-point number that specifies the duration of the media file in seconds. Integer durations SHOULD be rounded to the nearest integer. Durations MUST be integers if the protocol version of the Playlist file is less than 3. The remainder of the line following the comma is the title of the media file, which is an optional human-readable informative title of the media segment This document defines the following new tags: EXT-X-TARGETDURATION. EXT-X-MEDIA-SEQUENCE, EXT-X KEY, EXT-X-PROGRAM-DATE-TIME, EXT-X-ALLOW-CACHE, EXT-X-PLAYLIST-TYPE, EXT-X-STREAM-INF, EXT-X-ENDLIST, EXT-X DISCONTINUITY, and EXT-X-VERSION.

3.2 Attribute List

Certain extended M3U tags have values which are Attribute Lists. An Attribute List is a comma-separated list of attribute/value pairs with no whitespace.

An attribute/value pair has the following syntax:
AttributeName=AttributeValue
An AttributeName is an unquoted string containing characters from the set [A-Z].
An Attribute Value is one of the following:
decimal-integer an unquoted wing of characters from the set [0-9] expressing an integer in base-10 arithmetic.
hexadecimal-integer: an unquoted string of characters from the set [0-9] and [A-F] that is prefixed with 0x or 0X and which expresses an integer in base-16 arithmetic.
decimal-floating-point: an unquoted string of characters from the set [0-9] and '.' which expresses a floating-point number in base-10 arithmetic.
quoted-string: a string of characters within a pair of double-quotes ("). The set of characters allowed in the string and any rules for escaping special characters are specified by the Attribute definition, but any double-quote (") character and any carriage-return or linefeed will always be replaced by an escape sequence.
enumerated-string: an unquoted character string from a set which is explicitly defined by the Attribute. An enumerated-siring will never contain double-quotes ("), commas (,), or whitespace.
decimal-resolution: two decimal-integers separated by the "x" character, indicating horizontal and vertical pixel dimensions.
The type of the AttributeValue for a given AttributeName is specified by the Attribute definition.

A given AttributeName MUST NOT appear more than once in a given Attribute List.

An Attribute/value pair with an unrecognized AttributeName MUST be ignored by the client.

Attribute/value pairs of type enumerated-string that contain unrecognized values SHOULD be ignored by the client.

3.3. New Tags

3.3.1. EXT-X-TARGETDURATION

The EXT-X-TARGETDURATION tag specifies the maximum media file duration. The EXTINF duration of each media file in the Playlist file MUST be less than or equal to the target duration. This tag MUST appear once in the Playlist file. Its format is:
EXT-X-TARGETDURATION<s>
where s is an integer indicating the target duration in seconds.

3.3.2. EXT-X-MEDIA-SEQUENCE

Each media file URI in a Playlist has a unique integer sequence number. The sequence number of a URI is equal to the sequence number of the URI that preceded it plus one. The EXT-X-MEDIA-SEQUENCE tag indicates the sequence number of the first URI that appears in a Playlist file. Its format is:

EXT-X-MEDIA-SEQUENCE:<number>

A Playlist file MUST NOT contain more than one EXT-X-MEDIA-SEQUENCE tag. If the Playlist file does not contain an EXT-X-MEDIA-SEQUENCE tag then the sequence number of the first URI in the playlist SHALL be considered to be 0.

A media file's sequence number is not required to appear in its URI.

See Section 6.3.2 and Section 6.3.5 for information on handling the EXT-X-MEDIA-SEQUENCE tag.

3.3.3. EXT-X-KEY

Media files MAY be encrypted. The EXT-X-KEY tag provides information necessary to decrypt media files that follow it. Its format is:

EXT-X-KEY:<attribute-list>

The following attributes are defined:

The METHOD attribute specifies the encryption method. It is of type enumerated-string. Two methods are defined: NONE and AES-128.

An encryption method of NONE means that media files are not encrypted. If the encryption method is NONE, the URI and the IV attributes MUST NOT be present.

An encryption method of AES-128 means that media files are encrypted using the Advanced Encryption Standard [AES_128] with a 128-bit key and PKCS7 padding [RFC5652]. If the encryption method is AES-128, the URI attribute MUST be present. The IV attribute MAY be present; see Section 5.2.

The URI attribute specifies how to obtain the key. Its value is a quoted-string that contains a URI [RFC3986] for the key.

The IV attribute, if present, specifies the Initialization Vector to be used with the key. Its value is a hexadecimal-integer. The IV attribute appeared in protocol version 2.

A new EXT-X-KEY supersedes any prior EXT-X-KEY.

If the Playlist file does not contain an EXT-X-KEY lag then media files are not encrypted.

See Section 5 for the format of the key file, and Section 5.2, Section 6.2.3 and Section 6.3.6 for additional information on media file encryption.

3.3.4. EXT-X-PROGRAM-DATE-TIME

The EXT-X-PROGRAM-DATE-TIME tag associates the beginning of the next media file with an absolute date and/or time. The date/time representation is ISO/IEC 8601:2004 [ISO_8601] and SHOULD indicate a time zone. For example:

EXT-X-PROGRAM-DATE-TIME:<YYYY-MMD-DThh:mm:ssZ>

See Section 6.2.1 and Section 6.3.3 for more information on the EXT-X-PROGRAM-DATE-TIME tag.

3.3.5. EXT-X-ALLOW-CACHE

The EXT-X-ALLOW-CACHE tag indicates whether the client MAY or MUST NOT cache downloaded media files for later replay. It MAY occur anywhere in the Playlist file; it MUST NOT occur more than once. The EXT-X-ALLOW-CACHE tag applies to all segments in the playlist. Its format is:

EXT-X-ALLOW-CACHE:<YES|NO>

See Section 6.33 for more information on the EXT-X-ALLOW-CACHE tag.

3.3.6. EXT X-PLAYLIST-TYPE

The EXT-X-PLAYLIST-TYPE tag provides mutability information about the Playlist file. It is optional. Its format is:

EXT-X-PLAYLIST-TYPE:<EVENT|VOD>

Section 6.2.1 defines the implications of the EXT-X-PLAYLIST-TYPE tag

3.3.7. EXT-X-ENDLIST

The EXT-X-ENDLIST tag indicates that no more media files will be added to the Playlist file. It MAY occur anywhere in the Playlist file; it MUST NOT occur more than once. Its format is:

EXT-X-ENDLIST

3.3.8. EXT-X-STREAM-INF

The EXT-X-STREAM-INF tag indicates that the next URI in the Playlist file identifies another Playlist file. Its format is:

EXT-X-STREAM-INF:<attribute-list>
<URI>

The following attributes are defined:

Bandwidth

The value is a decimal-integer of bits per second. It MUST be an upper bound of the overall bitrate of each media file, calculated to include container overhead, that appears or will appear in the Playlist.

Every EXT-X-STREAM-INF lag MUST include the BANDWIDTH attribute.

PROGRAM-ID

The value is a decimal-integer that uniquely identifies a particular presentation within the scope of the Playlist file.

A Playlist file MAY contain multiple EXT-X-STREAM-INF tags with the same PROGRAM-ID to identify different encodings of the same presentation. These variant playlists MAY contain additional EXT-X-STREAM-INF tags.

CODECS

The value is a quoted-string containing a comma-separated list of formats, where each format specifies a media sample type that is present in a media file in the Playlist file. Valid format identifiers are those in the ISO File Format Name Space defined by RFC 4281 [RFC4281].

Every EXT-X-STREAM-INF tag SHOULD include a CODECS attribute.

Resolution

The value is a decimal-resolution describing the approximate encoded horizontal and vertical resolution of video within the stream.

3.3.9. EXT-X-DISCONTINUITY

The EXT-X-DISCONTINUITY tag indicates an encoding discontinuity between the media file that follows it and the one that preceded it. The set of characteristics that MAY change is:

file formal
number and type of tracks
encoding parameters
encoding sequence
timestamp sequence Its format is:

EXT-X-DISCONTINUITY

See Section 4, Section 6.2.1, and Section 6.3.3 for more information about the EXT-X-DISCONTINUITY tag.

3.3.10. EXT-X-VERSION

The EXT-X-VERSION lag indicates the compatibility version of the Playlist file. The Playlist file, its associated media, and its server MUST comply with all provisions of the most-recent version of this document describing the protocol version indicated by the tag value.

Its format is:
EXT-X-VERSION:<n>
where n is an integer indicating the protocol version.

A Playlist file MUST NOT contain more than one EXT-X-VERSION tag. A Playlist file that docs not contain an EXT-X-VERSION tag MUST comply with version 1 of this protocol.

4. MEDIA FILES

Each media file URI in a Playlist file MUST identify a media file which is a segment of the overall presentation. Each media file MUST be formatted as an MPEG-2 Transport Stream or an MPEG-2 audio elementary stream [ISO_13818].

Transport Stream files MUST contain a single MPEG-2 Program. There SHOULD be a Program Association Table and a Program Map Table at the start of each file. A file that contains video SHOULD have at least one key frame and enough information to completely initialize a video decoder.

A media file in a Playlist MUST be the continuation of the encoded stream at the end of the media file with the previous sequence number unless it was the first media file ever to appear in the Playlist file or it is prefixed by an EXT-X-DISCONTINUITY tag.

Clients SHOULD be prepared to handle multiple tracks of a particular type (e.g. audio or video). A client with no other preference SHOULD choose the one with the lowest numerical PID that it can play.

Clients MUST ignore private streams inside Transport Streams that they do not recognize.

The encoding parameters for samples within a stream inside a media file and between corresponding streams across multiple media files SHOULD remain consistent. However clients SHOULD deal with encoding changes as they are encountered, for example by scaling video content to accommodate a resolution change.

5. KEY FILES

5.1. Introduction

An EXT-X-KEY lag with the URI attribute identifies a Key file. A Key file contains the cipher key that MUST be used to decrypt subsequent media files in the Playlist.

The AES-128 encryption method uses 16-octet keys. The format of the Key file is simply a packed array of these 16 octets in binary format.

5.2. IV for AES-128

128-bit AES requires the same 16-octet Initialization Vector (IV) to be supplied when encrypting and decrypting. Varying this IV increases the strength of the cipher.

If the EXT-X-KEY tag has the IV attribute, implementations MUST use the attribute value as the IV when encrypting or decrypting with that key. The value MUST be interpreted as a 128-bit hexadecimal number and MUST be prefixed with 0x or 0X.

If the EXT-X-KEY tag does not have the IV attribute, implementations MUST use the sequence number of the media file as the IV when encrypting or decrypting that media file. The big-endian binary representation of the sequence number SHALL be placed in a 16-octet buffer and padded (on the left) with zeros.

6. CLIENT/SERVER ACTIONS

6.1. Introduction

This section describes how the server generates the Playlist and media files and how the client should download and play them.

6.2. Server Process

6.2.1. Introduction

The production of the MPEG-2 stream is outside the scope of this document, which simply presumes a source of a continuous stream containing the presentation.

The server MUST divide the stream into individual media files whose duration is less than or equal to a constant target duration. The server SHOULD attempt to divide the stream at points that support effective decode of individual media files, e.g. on packet and key frame boundaries.

The server MUST create a URI for each media file that will allow its clients to obtain the file.

The server MUST create a Playlist file. The Playlist file MUST conform to the format described in Section 3. A URI for each media file that the server wishes to make available MUST appear in the Playlist in the order in which it is to be played. The entire media file MUST be available to clients if its URI is in the Playlist file.

The Playlist file MUST contain an EXT-X-TARGETDURATION tag. Us value MUST be equal to or greater than the EXTINF value of any media file that appears or will appear in the Playlist file. Its value MUST NOT change. A typical target duration is 10 seconds.

The Playlist file SHOULD contain one EXT-X-VERSION tag which indicates the compatibly version of the stream. Its value MUST be the lowest protocol version with which the server, Playlist file, and associated media files all comply.

The server MUST create a URI for the Playlist file that will allow its clients to obtain the file.

If the Playlist file is distributed by HTTP, the server SHOULD support client requests to use the "gzip" Content-Encoding.

Changes to the Playlist file MUST be made atomically from the point of view of the clients.

The server MUST NOT change the Playlist file, except to:
  Append lines to it (Section 6.2.1).
  Remove media file URIs from the Playlist in the order that they appear, along with any tags that apply only to those media files (Section 6.2.2).
  Change the value of the EXT-X-MEDIA-SEQUENCE tag (Section 6.2.2).
  Add or remove EXT-X-STREAM-INF tags (Section 6.2.4). Note that clients are not required to reload variant Playlist files, so changing them may not have immediate effect.
  Add an EXT-X-ENDLIST tag to the Playlist (Section 6.2.1).

Furthermore, the Playlist file MAY contain an EXT-X-PLAYLIST-TYPE lag with a value of either EVENT or VOD. If the tag is present and has a value of EVENT, the server MUST NOT change or delete any part of the Playlist file (although it MAY append lines to it). If the tag is present and has a value of VOD, the Playlist file MUST NOT change.

Every media file URI in a Playlist MUST be prefixed with an EXTINF tag indicating the duration of the media file.

The server MAY associate an absolute date and time with a media file by prefixing its URI with an EXT-X-PROGRAM-DATE-TIME tag. The value of the date and time provides an informative mapping of the timeline of the media to an appropriate wall-clock time, which may be used as a basis for seeking, for display, or for other purposes. If a server provides this mapping, it SHOULD place an EXT-X-PROGRAM-DATE-TIME lag after every EXT-X-DISCONTINUITY tag in the Playlist file.

If the Playlist contains the final media file of the presentation then the Playlist file MUST contain the EXT-X-ENDLIST tag.

If the Playlist docs not contain the EXT-X-ENDLIST tag, the server MUST make a new version of the Playlist file available that contains at least one new media file URI. It MUST be made available relative to the time that the previous version of the Playlist file was made available: no earlier than one-half the target duration after that time, and no later than 1.5 times the target duration after that time.

If the server wishes to remove an entire presentation, it MUST make the Playlist file unavailable to clients. It SHOULD ensure that alt media files in the Playlist file remain available to clients for at least the duration of the Playlist file at the time of removal.

6.2.2. Sliding Window Playlists

The server MAY limit the availability or media files to those which have been most recently added to the Playlist. To do so the Playlist file MUST ALWAYS contain exactly one EXT-X-MEDIA-SEQUENCE tag. Its value MUST be incremented by 1 for every media file URI that is removed from the Playlist file.

Media file URIs MUST be removed from the Playlist file in the order in which they were added.

The server MUST NOT remove a media file URI from the Playlist file if the duration of the Playlist file minus the duration of the media file is less than three times the target duration.

When the server removes a media file URI from the Playlist, the media file SHOULD remain available to clients for a period of time equal to the duration of the media file plus the duration of the longest Playlist file in which the media file has appeared.

If a server plans to remove a media file after it is delivered to clients over HTTP, it SHOULD ensure that the HTTP response contains an Expires header that reflects the planned time-to-live.

6.2.3. Encrypting Media Files

If media files are to be encrypted the server MUST define a URI which will allow authorized clients to obtain a Key file containing a decryption key. The Key file MUST conform to the format described in Section 5.

The server MAY set the HTTP Expires header in the key response to indicate that the key may be cached.

If the encryption METHOD is AES-128, AES-128 CBC encryption SHALL be applied to individual media files. The entire file MUST be encrypted. Cipher Block Chaining MUST NOT be applied across media files. The IV used for encryption MUST be either the sequence number of the media file or the value of the IV attribute of the EXT-X-KEY tag, as described in Section 5.2.

The server MUST encrypt every media file in a Playlist using the method and other attributes specified by the EXT-X-KEY tag that most immediately precedes its URI in the Playlist file. Media files preceded by an EXT-X-KEY tag whose METHOD is NONE, or not preceded by any EXT-X-KEY tag, MUST NOT be encrypted.

The server MUST NOT remove an EXT-X-KEY tag from the Playlist file if the Playlist file contains a URI to a media file encrypted with that key.

6.2.4. Providing Variant Streams

A server MAY offer multiple Playlist files to provide different encodings of the same presentation. If it docs so it SHOULD provide a variant Playlist file that lists each variant stream to allow clients to switch between encodings dynamically.

Variant Playlists MUST contain an EXT-X-STREAM-INF tag for each variant stream. Each EXT-X-STREAM-INF tag for the same presentation MUST have the same PROGRAM-ID attribute value. The PROGRAM-ID value for each presentation MUST be unique within the variant Playlist.

If an EXT-X-STREAM-INF tag contains the CODECS attribute, the attribute value MUST include every format defined by [RFC4281] that is present in any media file that appears or will appear in the Playlist file.

The server MUST meet the following constraints when producing variant streams:

Each variant stream MUST present the same content, including stream discontinuities.

Each variant Playlist file MUST have the same target duration.

Content that appears in one variant Playlist file but not in another MUST appear either at the beginning or al the end of the Playlist file and MUST NOT be longer than the target duration Matching content in variant streams MUST have matching timestamps. This allows clients to synchronize the streams.

Elementary Audio Stream files MUST signal the timestamp of the first sample in the file by prepending an ID3 PRIV tag [ID3] with an owner identifier of "com.apple.streaming.transportStreamTimestamp". The binary data MUST be a 33-bit MPEG-2 Program Elementary Stream timestamp expressed as a big-endian eight-octet number, with the upper 31 bits set to zero.

In addition, all variant streams SHOULD contain the same encoded audio bitstream. This allows clients to switch between streams without audible glitching.

6.3. Client Process

6.3.1. Introduction

How the client obtains the URI to the Playlist file is outside the scope of this document; it is presumed to have done so.

The client MUST obtain the Playlist file from the URI. If the Playlist file so obtained is a variant Playlist, the client MUST obtain the Playlist file from the variant Playlist.

This document does not specify the treatment of variant streams by clients.

6.3.2. Loading the Playlist file

Every time a Playlist file is loaded or reloaded from the Playlist URI:

The client MUST ensure that the Playlist file begins with the EXTM3U tag and that the EXT-X-VERSION tag, if present, specifies a protocol version supported by the client; if not, the client MUST NOT attempt to use the Playlist.

The client SHOULD ignore any tags and attributes it docs not recognize.

The client MUST determine the next media file to load as described in Section 6.3.5.

If the Playlist contains the EXT-X-MEDIA-SEQUENCE tag, the client SHOULD assume that each media Hie in it will become unavailable at the time that the Playlist file was loaded plus the duration of the Playlist file. The duration of a Playlist file is the sum of the durations of the media files within it.

6.3.3. Playing the Playlist file

The client SHALL choose which media file to play first from the Playlist when playback starts. If the EXT-X-ENDLIST tag is not present and the client intends to play the media regularly (i.e. in playlist order at the nominal playback rate), the client SHOULD NOT choose a file which starts less than three target durations from the end of the Playlist file. Doing so can trigger playback stalls.

To achieve regular playback, media files MUST be played in the order that they appear in the Playlist file. The client MAY present the available media in any way it wishes, including regular playback, random access, and trick modes.

The client MUST be prepared to reset its parser(s) and decoder(s) before playing a media file that is preceded by an EXT-X-DISCONTINUITY tag.

The client SHOULD attempt to load media files in advance of when they will be required for uninterrupted playback to compensate for temporary variations in latency and throughput.

If the Playlist file contains the EXT-X-ALLOW-CACHE lag and its value is NO, the client MUST NOT cache downloaded media files after they have been played. Otherwise the client MAY cache downloaded media files indefinitely for later replay.

The client MAY use the value of the EXT-X-PROGRAM-DATE-TIME tag to display the program origination time to the user. If the value includes time zone information the client SHALL take it into account, but if it does not the client MUST NOT infer an originating time zone.

The client MUST NOT depend upon the correctness or the consistency of the value of the EXT-X-PROGRAM-DATE-TIME tag.

6.3.4. Reloading the Playlist File

The client MUST periodically reload the Playlist file unless it contains the EXT-X-ENDLIST tag.

However the client MUST NOT attempt to reload the Playlist file more frequently than specified by this section.

When a client loads a Playlist file for the first time or reloads a Playlist file and finds that it has changed since the last time it was loaded, the client MUST wait for a period of time before attempting to reload the Playlist file again. This period is called the initial minimum reload delay. It is measured from the time that the client began loading the Playlist file.

The initial minimum reload delay is the duration of the last media file in the Playlist. Media file duration is specified by the EXTINF lag.

If the client reloads a Playlist file and finds that it has not changed then it MUST wait for a period of time before retrying. The minimum delay is a multiple of the target duration. This multiple is 0.5 for the first attempt, 1.5 for the second, and 3.0 thereafter.

In order to reduce server load, the client SHOULD NOT reload the Playlist files of variant streams that are not currently being played. If it decides to switch playback to a different variant, it SHOULD stop reloading the Playlist of the old variant and begin loading the Playlist of the new variant. It can use the EXTINF durations and the constraints in Section 6.2.4 to determine the approximate location of corresponding media. Once media from the new variant has been loaded, the timestamps in the media files can be used to synchronize the old and new timelines precisely.

6.3.5. Determining the Next File to Load

The client MUST examine the Playlist file every time it is loaded or reloaded to determine the next media file to load.

The first file to load MUST be the file that the client has chosen to play first, as described in Section 6.3.3.

If the first file to be played has been loaded and the Playlist file docs not contain the EXT-X-MEDIA-SEQUENCE lag then the client MUST verify that the current Playlist file contains the URI of the last loaded media file at the offset it was originally found at, halting playback if it does not. The next media file to load MUST be the first media file URI following the last-loaded URI in the Playlist.

If the first file to be played has been loaded and the Playlist file contains the EXT-X-MEDIA-SEQUENCE tag then the next media file to load SHALL be the one with the lowest sequence number that is greater than the sequence number of the last media file loaded.

6.3.6. Decrypting Encrypted Media Files

If a Playlist file contains an EXT-X-KEY tag that specifies a Key file URI, the client MUST obtain that key file and use the key inside it to decrypt all media files following the EXT-X-KEY tag until another EXT-X-KEY lag is encountered.

If the encryption METHOD is AES-128, AES-128 CBC decryption SHALL be applied to individual media files. The entire file MUST be decrypted. Cipher Block Chaining MUST NOT be applied across media files. The IV used for decryption MUST be either the sequence number of the media file or the value of the IV attribute of the EXT-X-KEY lag, as described in Section 5.2

If the encryption METHOD is NONE, the client MUST treat all media files following the EXT-X-KEY lag as cleartext (not encrypted) until another EXT-X-KEY tag is encountered.

7. PROTOCOL VERSION COMPATIBILITY

Clients and servers MUST implement protocol version 2 or higher to use:

The IV attribute of the EXT-X-KEY tag.

Clients and servers MUST implement protocol version 3 or higher to use:

Floating-point EXTINF duration values.

8. EXAMPLES

8.1. Introduction

This section contains several example Playlist files.

8.2. Simple Playlist File

EXTM3U
EXT-X-TARGETDURATION:5220
EXTINF:5220, http://media.example.com/entire.ts
EXT-X-ENDLIST

8.3 Sliding Window Playlist, Using HTTPS

EXTM3U
EXT-X-TARGETDURATION:8
EXT-X MEDIA-SEQUENCE:2680
EXTINF:8, https://priv.example.com/fileSequence2680.ts
EXTINF:8, https://priv.example.com/fileSequence2681.ts
EXTINF:8, https://priv.example.com/fileSequence2682.ts

8.4 Playlist File with Encrypted Media Files

EXTM3U
EXT-X-MEDIA-SEQUENCE:7794
EXT-X-TARGETDURATION:15
EXT-X-KEY:METHOD=AES-128,URI="https://priv.example.com/key.php?r=52"
EXTINF:15, http://media.example.com/fileSequence52-1.ts
EXTINF:15, http://media.example.com/fileSequence52-2.ts
EXTINF:15, http://media.example.com/fileSequence52-3.ts
EXT-X-KEY:METHOD=AES-128,URI="https://priv.example.com/key.php?r=53"
EXTINF:15, http://media.example.com/fileSequence53-1.ts

8.5. Variant Playlist File

EXTM3U
EXT-X-STREAM-INF:PROGRAM-ID=1,BANDWIDTH=1280000 http://example.com/low.m3u8
EXT-X-STREAM-INF:PROGRAM-ID=1,BANDWIDTH=2560000 http://example.com/mid.m3u8
EXT-X-STREAM-INF:PROGRAM-ID=1,BANDWIDTH=7680000 http://example.com/hi.m3u8
EXT-X-STREAM-INF:PROGRAM-ID=1, BANDWIDTH=65000.CODECS="mp4a.40.5" http://example.com/audio-only.m3u8

9. SECURITY CONSIDERATIONS

Since the protocol generally uses HTTP to transfer data, most of the same security considerations apply. See section 15 of RFC 2616 [RFC2616].

Media file parsers are typically subject to "fuzzing" attacks. Clients SHOULD take care when parsing files received from a server so that non-compliant files are rejected.

Playlist files contain URIs, which clients will use to make network requests of arbitrary entities. Clients SHOULD range-check responses to prevent buffer overflows. See also the Security Considerations section of RFC 3986 [RFC3986].

Clients SHOULD load resources identified by URI lazily to avoid contributing to denial-of-service attacks.

HTTP requests often include session state ("cookies"), which may contain private user data. Implementations MUST follow cookie restriction and expiry rules specified by RFC 2965 [RFC2965]. See also the Security Considerations section of RFC 2965, and RFC 2964 [RFC2964].

Encryption keys are specified by URI. The delivery of these keys SHOULD be secured by a mechanism such as HTTP over TLS [RFC5246] (formerly SSL) in conjunction with a secure realm or a session cookie.

10. REFERENCES

10.1. Normative References

[AES_128] U.S. Department of Commerce/National Institute of Standards and Technology, "Advanced Encryption Standard (AES), FIPS PUB 197", November 2001, <http://csrc.nist.gov/publications/fips/fips197/fips-197.pdf<http://csrc.nist.gov/publications/fips/fips197/fips-197.pdf>>.

[ISO_13818] International Organization for Standardization. "ISO/IEC International Standard 13818; Generic coding of moving pictures and associated audio information", October 2007, <http://www.iso.org/iso/catalogue_detail?csnumber=44169>.

[ISO_8601] International Organization for Standardization, "ISO/IEC International Standard 8601:2004; Data elements and interchange formats—Information interchange—Representation of dates and times", December 2004, <http://www.iso.org/iso/catalogue_detail?csnumber=40874>.

[RFC2046] Freed, N. and N. Borenstein, "Multipurpose Internet Mail Extensions (MIME) Pan Two: Media Types", RFC 2046, November 1996.

[RFC2119] Bradner, S., "Key words for use in RFCs to Indicate Requirement Levels", BCP 14, RFC 2119, March 1997.

[RFC2616] Fielding, R., Gettys, J., Mogul, J., Frystyk, H., Masinter, L., Leach, P., and T. Berners-Lee, "Hypertext Transfer Protocol—HTTP/1.1", RFC 2616, June 1999.

[RFC2964] Moore, K. and N. Freed, "Use of HTTP State Management", BCP 44, RFC 2964, October 2000.

[RFC2965] Kristol, D. and L. Montulli, "HTTP State Management Mechanism", RFC 2965, October 2000.

[RFC3629] Yergeau, F., "UTF-8, a transformation format of ISO 10646", STD 63, RFC 3629, November 2003.

[RFC3986] Berners-Lee, T., Fielding, R., and L. Masinter, "Uniform Resource Identifier (URI): Generic Syntax", STD 66, RFC 3986, January 2005.

[RFC4281] Gellens, R., Singer, D., and P. Frojdh, "The Codecs Parameter for "Bucket" Media Types", RFC 4281, November 2005.

[RFC5246] Dierks, T. and E. Rescorla, "The Transport Layer Security (TLS) Protocol Version 1.2", RFC 5246. August 2008.

[RFC5652] Housley, R., "Cryptographic Message Syntax (CMS)", STD 70, RFC 5652, September 2009.

[US_ASCII] American National Standards Institute, "ANSI X3.4-1986, Information Systems—Coded Character Sets 7-Bit American National Standard Code for Information Interchange (7-Bit ASCII)", December 1986.

10.2. Informative References

[ID3] ID3.org<http://ID3.org/>, "The ID3 audio file data tagging format",<http://www.id3.org/Developer_Information>.

[M3U] Nullsoft, Inc., "The M3U Playlist format, originally invented for the Winamp media player", <http://wikipedia.org/wiki/M3U>.

What is claimed is:

1. A machine readable non-transitory storage medium storing executable program instructions which when executed by a data processing system cause the data processing system to perform a method comprising:
  receiving, in response to a request for a program, a variant audio playlist for the program, the variant audio playlist generated prior to receiving the request for the program, the variant audio playlist containing a plurality of URLs for different audio content for the program, each of the URLs in the plurality of URLs referring to an audio playlist corresponding to one of the different audio content for the program, each audio playlist referred to by a URL in the plurality of URLs comprising one or more tags and a plurality of Universal Resource Indicators (URIs) indicating an ordering of a plurality of audio files divided from a corresponding one of the different audio content for the program to recreate the audio content for the program;
  selecting a first URL of the plurality of URLs for one of the different audio content, the first URL referring to a first playlist;
  transmitting the first URL which refers to the first playlist;
  receiving the first playlist; and
  processing the first playlist to retrieve audio content for the program.

2. The medium as in claim 1, wherein the method further comprises:
  determining an audio preference; and
  wherein the selecting of the first URL is based on the audio preference which is set by a user preference.

3. The medium as in claim 2, wherein the method further comprises:
  receiving a video playlist for the program, the video playlist containing URLs for video content for the program, each of the URLs for the video content referring to a portion in time of the video content.

4. The medium as in claim 3, wherein the method further comprises:
  switching between URLs, for audio content, in the variant audio playlist, wherein the switching is performed independently of playback of the video playlist.

5. The medium as in claim 4, wherein the first playlist and the video playlist are processed concurrently by a first software component and by a second software component respectively, wherein the first software component retrieves audio content referred to by URLs in the first playlist and wherein the second software component retrieves video content referred to by URLs in the video playlist, and wherein the first software component and the second software component operate independently to retrieve their respective content.

6. The medium as in claim 4, wherein timestamps in the audio content retrieved through the first playlist and timestamps in the video content retrieved through the video playlist specify the same period of time.

7. The medium as in claim 4, wherein each of the URLs in the plurality of URLs refer to different audio content, and wherein each of the different audio content comprise timestamps which specify the same time period, and wherein the variant audio playlist and the video playlist are received in response to a single request for the program.

8. A machine implemented method comprising:
  receiving, in response to a request for a program, a variant audio playlist for the program, the variant audio playlist generated prior to receiving the request for the program, the variant audio playlist containing a plurality of URLs for different audio content for the program, each of the URLs in the plurality of URLs referring to an audio playlist corresponding to one of the different audio content for the program, each audio playlist referred to by a URL in the plurality of URLs comprising one or more tags and a plurality of Universal Resource Indicators (URIs) indicating an ordering of a plurality of audio files divided from a corresponding one of the different audio content for the program to recreate the audio content for the program;
  selecting a first URL of the plurality of URLs for one of the different audio content, the first URL referring to a first playlist;
  transmitting the first URL which refers to the first playlist;
  receiving the first playlist; and
  processing the first playlist to retrieve audio content for the program.

9. The method as in claim 8, wherein the method further comprises:
  determining an audio preference; and
  wherein the selecting of the first URL is based on the audio preference which is set by a user preference.

10. The method as in claim 9, wherein the method further comprises:
  receiving a video playlist for the program, the video playlist containing URLs for video content for the program, each of the URLs for the video content referring to a portion in time of the video content.

11. The method as in claim 10, wherein the method further comprises:
  switching between URLs, for audio content, in the variant audio playlist, wherein the switching is performed independently of playback of the video playlist.

12. The method as in claim 11, wherein the first playlist and the video playlist are processed concurrently by a first software component and by a second software component respectively, wherein the first software component retrieves audio content referred to by URLs in the first playlist and wherein the second software component retrieves video content referred to by URLs in the video playlist, and wherein the first software component and the second software component operate independently to retrieve their respective content.

13. The method as in claim 11, wherein timestamps in the audio content retrieved through the first playlist and timestamps in the video content retrieved through the video playlist specify the same period of time.

14. The method as in claim 11, wherein each of the URLs in the plurality of URLs refer to different audio content, and wherein each of the different audio content comprise timestamps which specify the same time period, and wherein the variant audio playlist and the video playlist are received in response to a single request for the program.

15. A data processing system comprising:
  a processing device programmed with executable instructions that, when executed, perform a method comprising:
  receiving, in response to a request for a program, a variant audio playlist for the program, the variant audio playlist generated prior to receiving the request for the program, the variant audio playlist containing a plurality of URLs for different audio content for the program, each of the URLs in the plurality of URLs referring to an audio playlist corresponding to one of the different audio content for the program, each audio playlist referred to by a URL in the plurality of URLs comprising one or more tags and a plurality of Universal Resource Indicators (URIs) indicating an ordering of a plurality of audio files divided from a corresponding one of the different audio content for the program to recreate the audio content for the program;
selecting a first URL of the plurality of URLs for one of the different audio content, the first URL referring to a first playlist;
transmitting the first URL which refers to the first playlist;
receiving the first playlist; and
processing the first playlist to retrieve audio content for the program.

16. A machine readable non-transitory storage medium storing executable program instructions which when executed by a data processing system cause the data processing system to perform a method comprising:
transmitting, in response to a request, from a device, for a program, a variant audio playlist containing a plurality of URLs for different audio content for the program, each of the URLs in the plurality of URLs referring to an audio playlist corresponding to one of the different audio content for the program, the variant audio playlist generated prior to receiving the request for the program, each audio playlist referred to by a URL in the plurality of URLs comprising one or more tags and a plurality of Universal Resource Indicators (URIs) indicating an ordering of a plurality of audio files divided from a corresponding one of the different audio content for the program to recreate the audio content for the program;
receiving from the device a first URL in the plurality of URLs and transmitting, in response to receiving the first URL, a first audio playlist to the device, the first URL referring to the first audio playlist.

17. The medium as in claim 16, wherein the method further comprises:
transmitting, in response to the request from the device, a video playlist for the program, the video playlist containing URLs for video content for the program, each of the URLs for the video content referring to a portion in time of the video content.

18. The medium as in claim 17, wherein the method further comprises:
receiving, from the device, a second URL in the plurality of URLs for different audio content;
transmitting, in response to receiving the second URL, a second audio playlist, wherein the second URL refers to the second audio playlist and wherein the second audio playlist provides alternative audio content for the program.

19. The medium as in claim 18, wherein timestamps in the audio content retrieved through the first audio playlist and timestamps in the alternative audio content specify the same period of time.

20. A machine implemented method comprising:
transmitting, in response to a request, from a device, for a program, a variant audio playlist containing a plurality of URLs for different audio content for the program, each of the URLs in the plurality of URLs referring to an audio playlist corresponding to one of the different audio content for the program, the variant audio playlist generated prior to receiving the request for the program, each audio playlist referred to by a URL in the plurality of URLs comprising one or more tags and a plurality of Universal Resource Indicators (URIs) indicating an ordering of a plurality of audio files divided from a corresponding one of the different audio content for the program to recreate the audio content for the program;
receiving from the device a first URL in the plurality of URLs and transmitting, in response to receiving the first URL, a first audio playlist to the device, the first URL referring to the first audio playlist.

21. The method as in claim 20, wherein the method further comprises:
transmitting, in response to the request from the device, a video playlist for the program, the video playlist containing URLs for video content for the program, each of the URLs for the video content referring to a portion in time of the video content.

22. The method as in claim 21, wherein the method further comprises:
receiving, from the device, a second URL in the of URLs for different audio content;
transmitting, in response to receiving the second URL, a second audio playlist, wherein the second URL refers to the second audio playlist and wherein the second audio playlist provides alternative audio content for the program.

23. The method as in claim 22, wherein timestamps in the audio content retrieved through the first audio playlist and timestamps in the alternative audio content specify the same period of time.

24. A data processing system comprising:
a processing device programmed with executable instructions that, when executed, perform a method comprising:
transmitting, in response to a request, from a device, for a program, a variant audio playlist containing a plurality of URLs for different audio content for the program, each of the URLs in the plurality of URLs referring to an audio playlist corresponding to one of the different audio content for the program, the variant audio playlist generated prior to receiving the request for the program, each audio playlist referred to by a URL in the plurality of URLs comprising one or more tags and a plurality of Universal Resource Indicators (URIs) indicating an ordering of a plurality of audio files divided from a corresponding one of the different audio content for the program to recreate the audio content for the program;
receiving from the device a first URL in the plurality of URLs and transmitting, in response to receiving the first URL, a first audio playlist to the device, the first URL referring to the first audio playlist.

25. The medium of claim 2, wherein the audio preference comprises a language preference and wherein the selecting the audio preference is performed automatically by the data processing system.

26. The method of claim 9, wherein the audio preference comprises a language preference and wherein selecting the audio preference is performed automatically by the machine implementing the method.

27. The system of claim 15, wherein the method further comprises:
determining an audio preference; and
wherein the selecting of the first URL is based on the audio preference which is set by a user preference, the audio preference comprises a language preference, and the selecting is performed automatically by the system.

* * * * *